United States Patent
Shibao

(10) Patent No.: US 7,957,029 B2
(45) Date of Patent: Jun. 7, 2011

(54) IMAGE PROCESSING APPARATUS, IMAGE PROCESSING APPARATUS ADMINISTRATION INFORMATION DISPLAY METHOD, SYSTEM, PROGRAM AND STORAGE MEDIUM

(75) Inventor: Kouki Shibao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 12/186,455

(22) Filed: Aug. 5, 2008

(65) Prior Publication Data

US 2008/0297821 A1  Dec. 4, 2008

Related U.S. Application Data

(63) Continuation of application No. 10/649,957, filed on Aug. 28, 2003, now Pat. No. 7,710,596.

(30) Foreign Application Priority Data

Aug. 29, 2002 (JP) ................................. 2002-250425

(51) Int. Cl.
  *G06F 15/00* (2006.01)
  *G06K 1/00* (2006.01)
  *G06K 15/00* (2006.01)
(52) U.S. Cl. ........... 358/1.9; 358/1.2; 358/1.13; 358/2.1
(58) Field of Classification Search .................. 358/1.1, 358/1.9, 1.11–1.18, 1.2, 2.1
   See application file for complete search history.

(56) References Cited

U.S. PATENT DOCUMENTS

| | | |
|---|---|---|
| 6,661,527 B1 | 12/2003 | Shibao |
| 6,724,492 B1 | 4/2004 | Iwase et al. |
| 2002/0107817 A1* | 8/2002 | Nakajima ..................... 705/400 |
| 2003/0137682 A1* | 7/2003 | Sakai et al. .................. 358/1.13 |

* cited by examiner

*Primary Examiner* — Thierry L Pham
(74) *Attorney, Agent, or Firm* — Fitzpatrick, Cella, Harper & Scinto

(57) ABSTRACT

To enable for a user to easy recognize plural counter information notifications even when plural image input and output processes performed by using plural input and output paths are administrated by plural kinds of counter information, any of counters that a remaining number is necessary for a setting mode is selected by an administration apparatus from among plural counters (independently administrating plural kinds of number-of-image information representing the number of scanner-read images, the number of own-apparatus-output images, the number of externally received output images, and the like) administrated in regard to each ID, the selected counter is displayed on an operation unit, and it is controlled by a CPU to notify the user of impossibility of process continuation with alert when the counter reaches an upper limit value.

6 Claims, 53 Drawing Sheets

FIG. 10
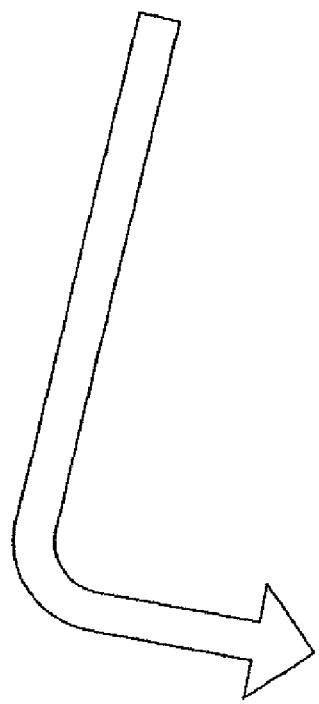
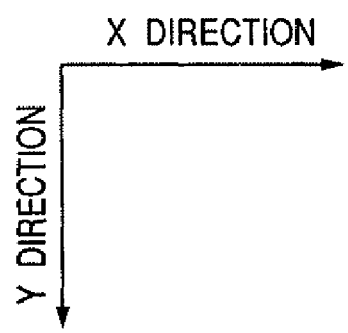

FIG. 33

| READ ORIGINAL NUMBER COUNTER | OWN APPARATUS IMAGE OUTPUT NUMBER COUNTER | OUTSIDE TRANSMITTED IMAGE NUMBER COUNTER | EXTERNALLY RECEIVED IMAGE OUTPUT NUMBER COUNTER | EXECUTABLE PROC |
|---|---|---|---|---|
| ○ | ○ | | | COPY |
| ○ | | | | BOX (STORAGE) |
| ○ | ○ | | | BOX (OUTPUT) |
| | | ○ | | PRINT (TRANSMISSION) |
| | | | ○ | PRINT (RECEPTION) |
| ○ | | ○ | | TRANSMISSION |

FIG. 43

| READ ORIGINAL NUMBER COUNTER | OWN APPARATUS IMAGE OUTPUT NUMBER COUNTER | EXTERNALLY RECEIVED IMAGE OUTPUT NUMBER COUNTER | EXECUTABLE PROC |
|---|---|---|---|
| ○ | ○ | | COPY |
| ○ | | | BOX (STORAGE) |
| | ○ | | BOX (OUTPUT) |
| ○ | | | PRINT (TRANSMISSION) |
| | | ○ | PRINT (RECEPTION) |

FIG. 50

| READ ORIGINAL NUMBER COUNTER (BLACK AND WHITE) | READ ORIGINAL NUMBER COUNTER (COLOR) | OWN APPARATUS IMAGE OUTPUT NUMBER COUNTER (BLACK AND WHITE) | OWN APPARATUS IMAGE OUTPUT NUMBER COUNTER (COLOR) | EXTERNALLY RECEIVED IMAGE OUTPUT NUMBER COUNTER (BLACK AND WHITE) | EXTERNALLY RECEIVED IMAGE OUTPUT NUMBER COUNTER (COLOR) | SETTING MODE |
|---|---|---|---|---|---|---|
| ○ | | ○ | | | | COPY (BLACK AND WHITE) |
| | ○ | | ○ | | | COPY (COLOR) |
| ○ | ○ | ○ | | | | COPY (COLOR MODE UNDECIDED) |
| | | | | | | BOX (STORAGE) |
| | | ○ | ○ | | | BOX (OUTPUT) |
| | | | | ○ | ○ | PRINT (RECEPTION) |
| ○ | ○ | | | | | PRINT (TRANSMISSION) |

FIG. 51

| READ ORIGINAL NUMBER COUNTER (BLACK AND WHITE) | READ ORIGINAL NUMBER COUNTER (COLOR) | OWN APPARATUS IMAGE OUTPUT NUMBER COUNTER (BLACK AND WHITE) | OWN APPARATUS IMAGE OUTPUT NUMBER COUNTER (COLOR) | EXTERNALLY RECEIVED IMAGE OUTPUT NUMBER COUNTER (BLACK AND WHITE) | EXTERNALLY RECEIVED IMAGE OUTPUT NUMBER COUNTER (COLOR) | EXECUTABLE PROC |
|---|---|---|---|---|---|---|
| ○ | | ○ | | | | COPY (BLACK AND WHITE) |
| | ○ | | ○ | | | COPY (COLOR) |
| ○ | | | | | | BOX (STORAGE, BLACK AND WHITE) |
| | ○ | | | | | BOX (STORAGE, COLOR) |
| | | ○ | | | | BOX (OUTPUT, BLACK AND WHITE) |
| | | | ○ | | | BOX (OUTPUT, COLOR) |
| | | | | ○ | | PRINT (RECEPTION, BLACK AND WHITE) |
| | | | | | ○ | PRINT (RECEPTION, COLOR) |
| ○ | | | | | | PRINT (TRANSMISSION, BLACK AND WHITE) |
| | ○ | | | | | PRINT (TRANSMISSION, COLOR) |

FIG. 54

| READ ORIGINAL NUMBER COUNTER | OWN APPARATUS IMAGE OUTPUT NUMBER COUNTER | EXTERNALLY RECEIVED IMAGE OUTPUT NUMBER COUNTER | EXECUTABLE PROC |
|---|---|---|---|
|  |  |  | COPY<br>BOX (STORAGE, OUTPUT)<br>PRINT (TRANSMISSION AND RECEPTION) |
| X |  |  | BOX (OUTPUT)<br>PRINT (RECEPTION) |
|  | X |  | BOX (STORAGE)<br>PRINT (TRANSMISSION AND RECEPTION) |
| X | X |  | PRINT (RECEPTION) |
|  |  | X | COPY<br>BOX (STORAGE, OUTPUT)<br>PRINT (TRANSMISSION) |
| X |  | X | BOX (OUTPUT) |
|  | X | X | BOX (STORAGE)<br>PRINT (TRANSMISSION) |
| X | X | X |  |

FIG. 55A

| SECTION NAME | SECTION ID | UPPER LIMIT VALUE | | | | | | | |
|---|---|---|---|---|---|---|---|---|---|
| | | READ SYSTEM | | OUTPUT SYSTEM | | | | TRANSMISSION SYSTEM | |
| | | UPPER LIMIT VALUE OF THE NUMBER OF READ ORIGINALS (BLACK AND WHITE) | UPPER LIMIT VALUE OF THE NUMBER OF READ ORIGINALS (COLOR) | UPPER LIMIT VALUE OF THE NUMBER OF OUTPUT IMAGES READ BY OWN APPARATUS (BLACK AND WHITE) | UPPER LIMIT VALUE OF THE NUMBER OF OUTPUT IMAGES READ BY OWN APPARATUS (COLOR) | UPPER LIMIT VALUE OF THE NUMBER OF OUTPUT IMAGES RECEIVED FROM EXTERNAL APPARATUS (BLACK AND WHITE) | UPPER LIMIT VALUE OF THE NUMBER OF OUTPUT IMAGES RECEIVED FROM EXTERNAL APPARATUS (COLOR) | UPPER LIMIT VALUE OF THE NUMBER OF IMAGES OUTSIDE TRANSMITTED (BLACK AND WHITE) | UPPER LIMIT VALUE OF THE NUMBER OF IMAGES OUTSIDE TRANSMITTED (COLOR) |
| SECTION A | 1234 | 200000 | 100000 | 150000 | 100000 | 150000 | 150000 | 5000 | 1000 |
| SECTION B | 5678 | 300000 | 0 | 300000 | 0 | 300000 | 0 | 100000 | 0 |
| SECTION C | 1111 | 100000 | 100000 | 100000 | 100000 | 100000 | 5000 | UNREGISTERED | UNREGISTERED |
| SECTION D | UNREGISTERED | UNREGISTERED | UNREGISTERED | UNREGISTERED | UNREGISTERED | UNREGISTERED | UNREGISTERED | UNREGISTERED | UNREGISTERED |
| ⋮ | | | | | | | | | |
| SECTION N | 9999 | 20000 | 20000 | UNREGISTERED | UNREGISTERED | UNREGISTERED | UNREGISTERED | 10000 | 10000 |

FIG. 55B

| | READ SYSTEM (A CLASSIFICATION) | | OUTPUT SYSTEM (B CLASSIFICATION) | | | | TRANSMISSION SYSTEM (C CLASSIFICATION) | |
|---|---|---|---|---|---|---|---|---|
| | ITEM 1 | ITEM 2 | ITEM 3 | ITEM 4 | ITEM 5 | ITEM 6 | ITEM 7 | ITEM 8 |
| TOTAL DATA OF EACH COUNTER UP TO NOW | THE NUMBER OF READ ORIGINALS (BLACK AND WHITE) | THE NUMBER OF READ ORIGINALS (COLOR) | THE NUMBER OF OUTPUT IMAGES READ BY OWN APPARATUS (BLACK AND WHITE) | THE NUMBER OF OUTPUT IMAGES READ BY OWN APPARATUS (COLOR) | THE NUMBER OF OUTPUT IMAGES RECEIVED FROM EXTERNAL APPARATUS (BLACK AND WHITE) | THE NUMBER OF OUTPUT IMAGES RECEIVED FROM EXTERNAL APPARATUS (COLOR) | THE NUMBER OF IMAGES OUTSIDE TRANSMITTED (BLACK AND WHITE) | THE NUMBER OF IMAGES OUTSIDE TRANSMITTED (COLOR) |
| | 30000 | 1280 | 25000 | 1000 | 2500 | 250 | 5000 | 280 |

FIG. 56

STORAGE MEDIUM SUCH AS
FD, CD-ROM, OR THE LIKE

| DIRECTORY INFORMATION |
|---|
| 1ST DATA PROC PROGRAM<br>PROGRAM CODE GROUP CORRESPONDING<br>TO STEPS OF FLOW CHART SHOWN IN FIG. 30 |
| 2ND DATA PROC PROGRAM<br>PROGRAM CODE GROUP CORRESPONDING<br>TO STEPS OF FLOW CHART SHOWN IN FIG. 32 |
| 3RD DATA PROC PROGRAM<br>PROGRAM CODE GROUP CORRESPONDING<br>TO STEPS OF FLOW CHART SHOWN IN FIG. 39 |
| 4TH DATA PROC PROGRAM<br>PROGRAM CODE GROUP CORRESPONDING<br>TO STEPS OF FLOW CHART SHOWN IN FIG. 40 |
| 5TH DATA PROC PROGRAM<br>PROGRAM CODE GROUP CORRESPONDING<br>TO STEPS OF FLOW CHART SHOWN IN FIG. 41 |
| 6TH DATA PROC PROGRAM<br>PROGRAM CODE GROUP CORRESPONDING<br>TO STEPS OF FLOW CHART SHOWN IN FIG. 42 |
| 7TH DATA PROC PROGRAM<br>PROGRAM CODE GROUP CORRESPONDING<br>TO STEPS OF FLOW CHART SHOWN IN FIG. 45 |
| 8TH DATA PROC PROGRAM<br>PROGRAM CODE GROUP CORRESPONDING TO<br>STEPS OF FLOW CHART SHOWN IN FIGS. 46, 47 |
| 9TH DATA PROC PROGRAM<br>PROGRAM CODE GROUP CORRESPONDING<br>TO STEPS OF FLOW CHART SHOWN IN FIG. 49 |
| 10TH DATA PROC PROGRAM<br>PROGRAM CODE GROUP CORRESPONDING<br>TO STEPS OF FLOW CHART SHOWN IN FIG. 53 |

MEMORY MAP OF STORAGE MEDIUM

IMAGE PROCESSING APPARATUS, IMAGE PROCESSING APPARATUS ADMINISTRATION INFORMATION DISPLAY METHOD, SYSTEM, PROGRAM AND STORAGE MEDIUM

This application is a continuation application of co-pending) application Ser. No. 10/649,957, filed Aug. 28, 2003, which is incorporated herein by reference.

BACKGROUND OF THE INVENTION

1. Field of the Invention

The present invention relates to an image processing apparatus having, e.g., a copy function and a printer function, a method of displaying administration information of the image processing apparatus, a system of displaying the administration information, a program of executing the administration information display method, a storage medium of storing the program, and the like.

2. Related Background Art

Conventionally, there is a copy machine which is equipped with an administration apparatus for administrating a magnetic card and an ID number. In this type of copy machine, when a user performs a copy operation, the administration apparatus administrates the number of copies in regard of each section, or the like. Moreover, in recent years, a multifunction peripheral apparatus (hereinafter called MFP apparatus) having both a facsimile (FAX) function and a printer function has been developed. Incidentally, as the MFP apparatuses of such a type, the MFP apparatus capable of independently administrating facsimile reception outputs and the number of printer outputs are proposed, and also the MFP apparatus of administrating copy outputs and print outputs based on the same section information are proposed.

However, in the MFP apparatus, it is proposed to input and output an image through an output path which is different from that of a conventional copy machine. Incidentally, the followings are recited as examples of the paths. That is, an image read by other MFP apparatus is output by a user's own MFP apparatus (simply called own MFP apparatus hereinafter); image data of a scanned original is transmitted by a facsimile or an electronic mail; and images read by a scanner, transmitted from a host computer, and received by a facsimile are stored in a hard disk of the own MFP apparatus, and then the necessary image is read when a user needs it. In such circumstances, to uniformly administrate the number of output images as the same section information becomes difficult more and more.

Incidentally, these paths are consolidated in, e.g., three types as follows.

In the first type, the image is scanned by the own apparatus, but is not output by the own apparatus (i.e., transmitted to other apparatus).

In the second type, the image not scanned by the own apparatus (i.e., received externally) is output by the own apparatus.

In the third type, the image scanned by the own apparatus is output similarly by the own apparatus.

When it is intended to administrate these three paths as the same section information, it is necessary to prepare and provide four independent counters as follows:

a counter for counting the number of images scanned by the own apparatus;

a counter for counting the number of output images received from the external apparatus;

a counter for counting the number of images transmitted outside; and a counter for counting the number of output images scanned by the own apparatus.

Moreover, it is necessary to notify the user of the counter information concerning these four counters as needed.

However, in the case where the same section information is administrated, when the overall counter information is always displayed on the operation unit, a problem to prevent the user from promptly obtaining desired counter information when referring the section information may occur. Still more, in a case where input and output paths become complicated and thus more counters become necessary in future, it is supposed that this problem becomes more serious.

Incidentally, it is usual that accounting for a copy operation or a print operation is performed in regard to each section. In the past, when the number of images scanned by the own apparatus, the number of output images scanned by the own apparatus, and the like are counted up, a guide for counting up the images is clear because physical resources such as originals and papers exist, whereby the user can be convinced.

Here, it is assumed that a count-up operation is performed when a scanner-read image in a recently proposed box and a transmission function or an image stored in the box is transmitted outside. In such a case, image compression is performed, resolution is designated, plural images are combined, there are many formats of transmission image such as a file format and the like, an image is transmitted by a facsimile, an image is attached to an electronic mail, and an image is disposed on a specific directory as a file. Therefore, in such circumstances, even if a guide for counting up images is unclear, the user is dissatisfied with an accounting system. Moreover, the specification as to the count unit in the MFP apparatus becomes complicated, whereby a problem to make a development engineer more hard to develop a new MFP apparatus may occur.

Moreover, since an input operation (scan) can be performed asynchronously with an output operation in the MFP apparatus, a problem that a process is difficult particularly when the counter (i.e., the value counted by the counter) reaches an upper limit value may occur.

For example, in a local copy operation that an image is input by the own apparatus and then output by the own apparatus, following cases are expected:

the case where, although the input operation ended, the counter reaches the upper limit value during the output operation;

the case where the counter reaches the upper limit value during the input operation; and the case where, although the counter reaches the upper limit value during the input operation, the print operation is performed on the way.

In other words, the situation that the process is interrupted when the counter reaches the upper limit value includes various patterns. Therefore, when the counter reaches the upper limit value unexpectedly, then the user has to continue the process in consideration of the reason why the process is interrupted and a method of restarting the process, whereby a problem to make the MFP apparatus awkward for the user may occur.

Moreover, when the upper limit values are set respectively to the plural counters, it is difficult for the user to grasp which counter reaches the upper limit value even when the process is interrupted. In this case, even if one counter reaches the upper limit value, when there is a mode that is executable by only the remaining counters which do not yet reach the upper limit values, the process in regard to the mode in question can be continued. For this reason, if counter information cannot be notified easily to the user, a problem that, when the process is once interrupted because any of the counters reaches the upper limit value, it is difficult to restart the process may occur.

SUMMARY OF THE INVENTION

An object of the present invention is to provide an image processing apparatus which solved the above conventional problems, a method of displaying administration information of the image processing apparatus, a system of displaying the administration information, a program of executing the administration information display method, a storage medium of storing the program, and the like.

Other object of the present invention is to provide an image processing apparatus which can be easily administrated and used by a user since it is possible to beforehand prevent occurrence of problems that administration is rather difficult and operability rather degrades for the user because various functions and modes are provided, a method of displaying administration information of the image processing apparatus, a system of displaying the administration information, a program of executing the administration information display method, a storage medium of storing the program, and the like.

Still other object of the present invention is to provide an image processing apparatus which enables, even when plural image input and output processes performed by using plural input and output paths are administrated by counter information concerning plural counters, a user to easily recognize notification of the counter information, a method of displaying administration information of the image processing apparatus, a system of displaying the administration information, a program of executing the administration information display method, a storage medium of storing the program, and the like.

Still other object of the present invention is to provide an image processing apparatus which enables a user to easily recognize counter information by selecting from among plural counters belonging to the same administration section any of the counter that the number of remaining images (also called the remaining number) is necessary in regard to a setting mode and then displaying the selected counter on an operation unit, and by notifying with an alert the user of impossibility of process continuation when the counter reaches an upper limit value, and which performs weight count (e.g., count of the number of bytes) in regard to the number of outside-transmitted images to make a guide of count-up (i.e., to count up images) clear and impartial, thereby removing user's dissatisfied element and reducing the number of developer's steps in development processes, a method of displaying administration information of the image processing apparatus, a system of displaying the administration information, a program of executing the administration information display method, a storage medium of storing the program, and the like.

Still other object of the present invention is to provide an image processing apparatus which specifies a counter that the number of remaining images (also called the remaining number) is necessary in regard to a mode set by a user from among plural counters at a time, e.g., when the user sets a desired input or output mode and numeric values, calculates a minimum value of the number of images which would be input or output from the set mode and numeric values, compares the calculated minimum value with the remaining count number of the specified counter, and notifies the user of the compared result to urge him to change the setting if the counter value exceeds the upper limit value when the process starts as it is in that setting, thereby causing the user to clearly recognize beforehand that the counter reaches the upper limit value while the process is performed and thus to change the setting based on the user's intention to beforehand prevent a restart itself complicated for the user, and which also enables the user to beforehand consider the restart of the process even when the process is continued based on the user's intention although the user has known that the counter reaches the upper limit value, thereby reducing a user's load concerning the restart of the process after the counter reached the upper limit value while the processing is performed, a method of displaying administration information of the image processing apparatus, a system of displaying the administration information, a program of executing the administration information display method, a storage medium of storing the program, and the like.

Still other object of the present invention is to provide an image processing apparatus which enables a user to recognize counter information by selecting counters to be displayed by the number capable of being displayed on an operation unit according to a mode set by the user from among plural counters belonging to the same administration section and by displaying in sequence the counter closer to an upper limit value when the counter is selected from plural candidates, notifies with an alert the user of impossibility of process continuation when the user intends to execute a mode which cannot be achieved by the remaining counters which do not yet reach the upper limit value in a case where any of the counter reaches the upper limit value, and performs the process if the process can be achieved only by the remaining counters which do not yet reach the upper limit value, thereby making a restart of the process easy when any of the counters reaches the upper limit value, a method of displaying administration information of the image processing apparatus, a system of displaying the administration information, a program of executing the administration information display method, a storage medium of storing the program, and the like.

Still other object of the present invention is to provide an image processing apparatus which enables a user to recognize counter information by displaying on an operation unit only a counter closest to an upper limit value from among plural counters belonging to the same administration section, notifies with an alert the user of impossibility of process continuation when the user intends to execute a mode which cannot be achieved by only the remaining counters which do not yet reach the upper limit value in a case where any of the counter reaches the upper limit value, and displays on the operation unit the counter closest to the upper limit value from among the remaining counters which do not yet reach the upper limit value so as to easily execute a mode which can be achieved only by the counters which do not yet reach the upper limit value, thereby making the process after any of the counters reaches the upper limit value easy, a method of displaying administration information of the image processing apparatus, a system of displaying the administration information, a program of executing the administration information display method, a storage medium of storing the program, and the like.

Other object and features of the present invention will be apparent from the following description in conjunction with the accompanying drawings.

BRIEF DESCRIPTION OF THE DRAWINGS

FIG. 10 is a diagram for explaining the operation of the image rotation unit shown in FIG. 8;

FIG. 33 is a diagram showing combinations of the upper limit value of each counter and executable processes;

FIG. 43 is a diagram showing combinations of the upper limit value of each counter and executable processes;

FIG. 50 is a diagram showing the counter displayed on the operation unit according to an execution process in an image forming apparatus capable of performing color input and output;

FIG. 51 is a diagram indicating which counter only has not to reach the upper limit value in regard to the execution process in the image forming apparatus capable of performing color input and output;

FIG. 54 is a diagram showing combinations of the upper limit value of each counter and executable processes;

FIGS. 55A and 55B are diagrams showing an example of administration tables capable of being administrated by the image processing apparatus according to the present invention; and FIG. 56 is a pattern diagram for explaining a memory map of a storage medium storing various data processing programs capable of being read by the image processing apparatus according to the present invention.

DETAILED DESCRIPTION OF THE PREFERRED EMBODIMENTS

First Embodiment

Hereinafter, an image processing apparatus having, e.g., a copy function and a printer function, a method of displaying administration information of the image processing apparatus, a system of displaying the administration information, a program of executing the administration information display method, a storage medium of storing the program, and the like will be explained with reference to the attached drawings. More specifically, a method of counting the number of images in a case where data is transmitted outside through a network, a method of notifying a user of image number administration information, and the like will be explained.

Figure 1:
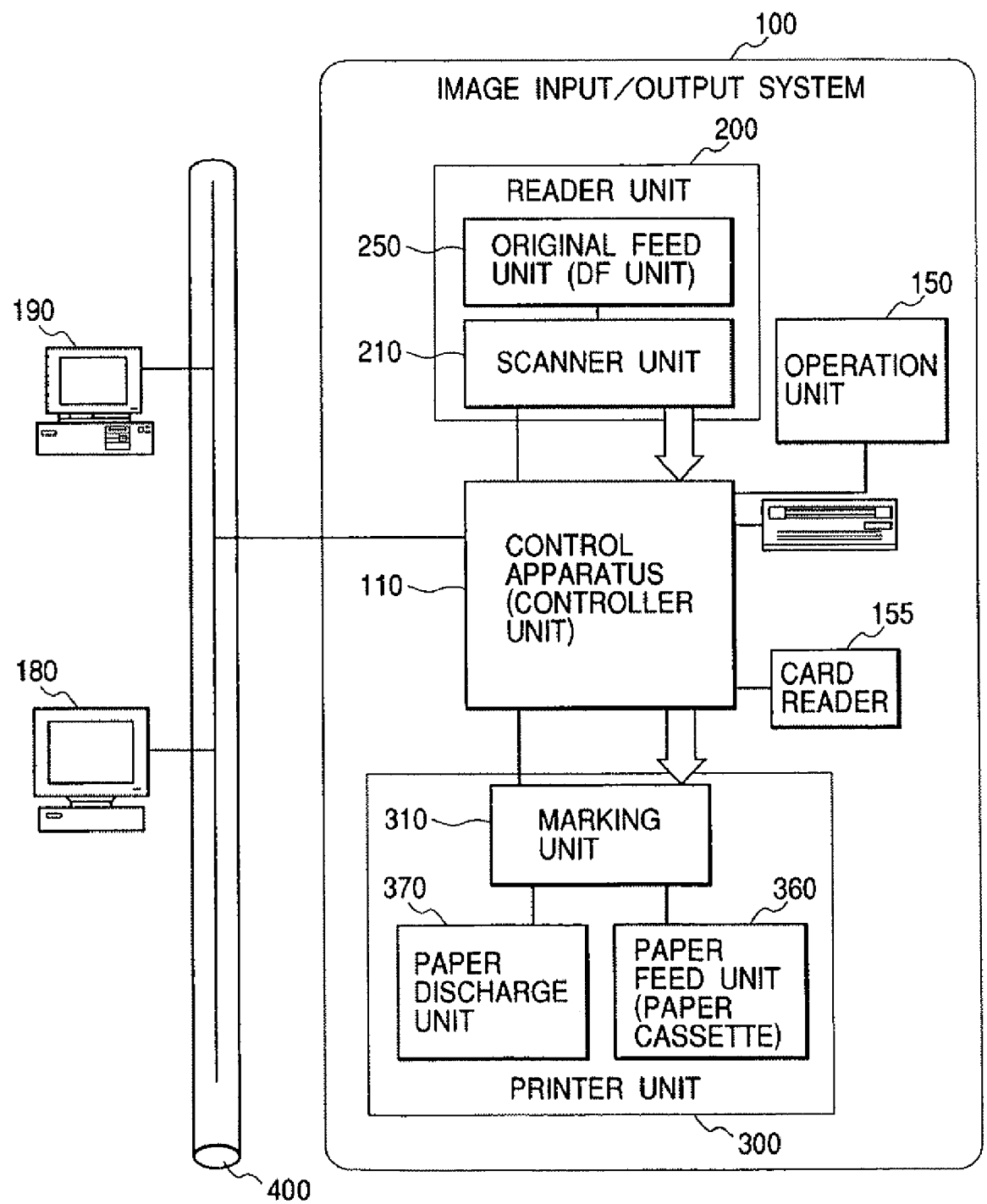
FIG. 1 is a block diagram showing one example of the entire structure of an image input/output system to which an image processing apparatus according to the first embodiment of the present invention is applicable.

FIG. 1 is a block diagram showing one example of the entire structure of an image input/output system 100 to which the image processing apparatus according to the first embodiment of the present invention is applicable.

In FIG. 1, numeral 200 denotes a reader unit (image input apparatus) which optically reads an original image and then converts the read image into image data. The reader unit 200 is composed of a scanner unit 210 having a function to read the original image, and an original feed unit (or DF (document feed) unit) 250 having a function to transport an original.

Numeral 300 denotes a printer unit (image output apparatus) which transports a recording paper, prints the image data as a visible image on the transported recording paper, and then discharges the recording paper. The printer unit 300 is composed of a paper feed unit (or paper cassette) 360 having plural kinds of recording paper cassettes, a marking unit 310 having a function to transfer and fix the image data to the recording paper, and a paper discharge unit 370 having a function to sort and staple the image-printed recording paper and then output the obtained recording paper outside.

Numeral 110 denotes a control apparatus which is electrically connected to the reader unit 200 and the printer unit 300. Moreover, the control apparatus is connected to host computers (PC's) 180 and 190 through a network (LAN) 400. The control apparatus 110 controls the reader unit 200 to read the original image data, and further controls the printer unit 300 to output the image data on the recording paper, thereby providing a copy function.

Besides, the control apparatus 110 provides a scanner function to convert the image data read from the reader unit 200 into code data and then transmit the converted code data to the host computers through the network 400, and a printer function to convert code data received from the host computers through the network 400 into image data and then output the converted image data to the printer unit 300.

Moreover, the control apparatus 110 communicates with a card reader 155 to obtain card presence/absence and a section number, and further counts up the number of scanned image and printed images in regard to each section.

Numeral 150 denotes an operation unit which is connected to the control apparatus 110, consists of a liquid crystal touch panel, and provides a user interface (I/F) for handling and operating the image input/output system 100.

Incidentally, in the present invention, the image input/output system 100 including external apparatuses and information processing apparatuses such as the PC's 180 and 190 may be treated as an overall system, while the system as shown in FIG. 1 is of course applicable. Besides, the reader unit 200 and the printer unit 300 may be integrally provided in the same case (like a digital copy machine), or may be independently provided. Thus, the present invention is applicable to various apparatuses, systems, and combinations of them.

Figure 2:
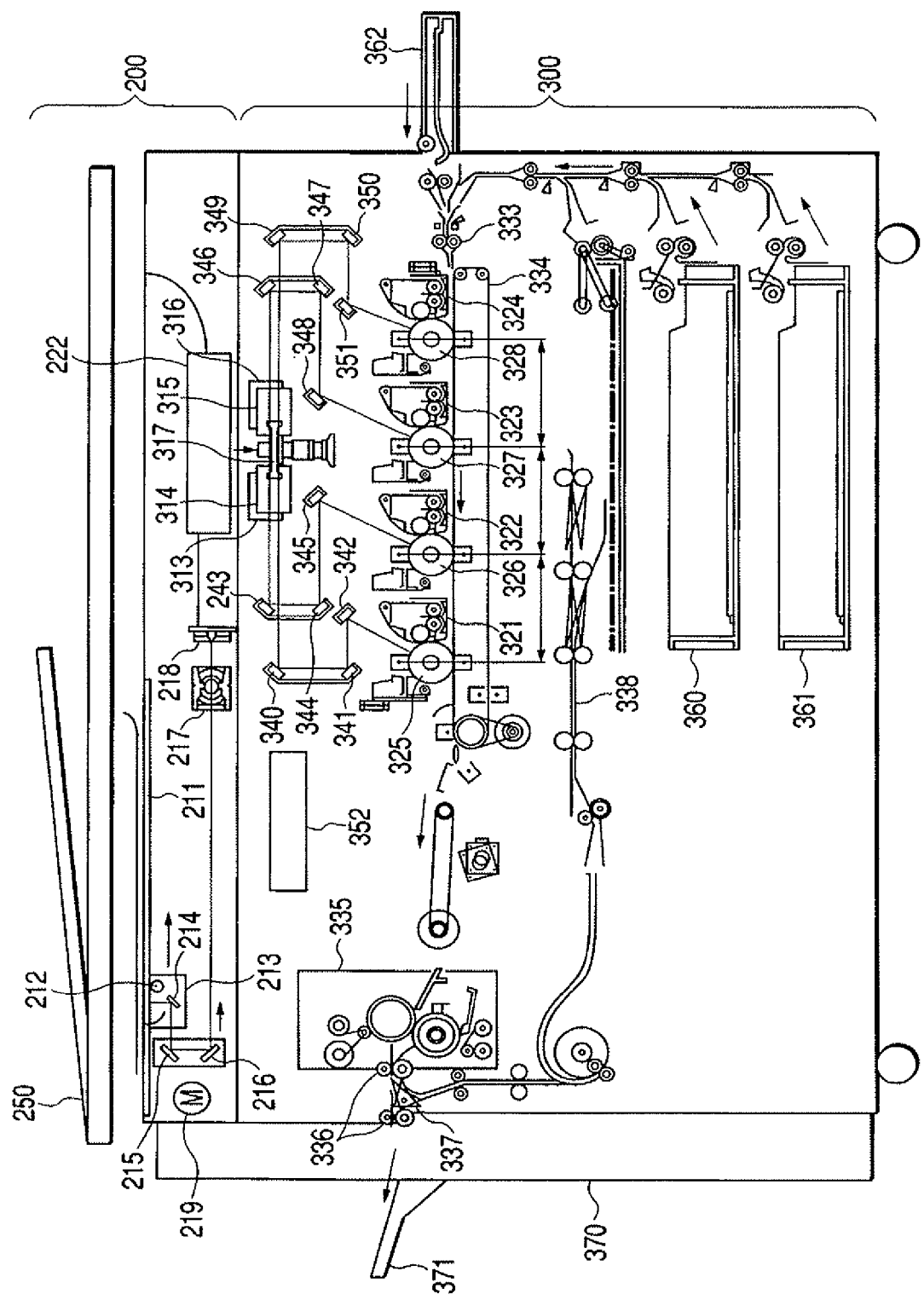
FIG. 2 is a cross sectional diagram showing the structures of a reader unit and a printer unit both shown in FIG. 1.

FIG. 2 is a cross sectional diagram showing the structures of the reader unit 300 and the printer unit 300 both shown in FIG. 1. In FIG. 2, the structural components same as those of FIG. 1 are denoted respectively by the numerals same as those of FIG. 1.

In the reader unit 200, numeral 250 denotes the original feed unit which feeds one by one the originals from the first page onto a platen glass 211, and discharges the originals on the platen glass 211 after an original read operation ended. When the original is fed and transported onto the platen glass 211, a lamp 212 is turned on, and movement of an optical unit 213 is started, whereby the original is exposed and scanned. Then, the light reflected from the original is introduced into a CCD image sensor (simply called CCD hereinafter) 218 through mirrors 214, 215 and 216 and a lens 217, whereby the image on the scanned original is read by the CCD 218. Incidentally, the optical unit 213 is moved by a motor 219.

Numeral 222 denotes a reader image processing unit which performs a predetermined process to the image data output from the CCD 218, and outputs the processed image data to the control apparatus 110 through a scanner interface (I/F) 140 shown in later-described FIG. 4.

In the printer unit 300, numeral 352 denotes a printer image processing unit which outputs the image data from the control apparatus 110 to a laser driver 317 through a printer I/F 145 shown in later-described FIG. 4.

The laser driver 317 drives laser beam generation units 313, 314, 315 and 316 to cause these units to generate laser beams according to the image data output from the printer image processing unit 352. Then, the laser beams are irradiated respectively on photosensitive drums 325, 326, 327 and 328 through mirrors 340, 341, 342, 343, 344, 345, 346, 347, 348, 349, 350 and 351, whereby latent images according to the laser beams are formed on the photosensitive drums 325, 326, 327 and 328, respectively.

Numerals 321, 322, 323 and 324 denote development units which develop the latent images respectively by using black (Bk), yellow (Y), cyan (C) and magenta (M) toners. The developed toners are transferred to the recording paper, whereby full-color printout is performed.

The recording paper which has been fed from any of the paper cassettes 360 and 361 and a manual feed tray 362 at a timing synchronous with a start of the laser beam irradiation is adsorbed onto a transfer belt 334 through a registration roller 333, and thus transported. Then, the toners (developers) adhered on the photosensitive drums 325, 326, 327 and 328 are transferred to the transported recording paper, and the recording paper is further transported to a fixing unit 335, whereby the toners (developers) are fixed to the recording paper by heat and pressure in the fixing unit 335.

The recording paper which passed the fixing unit 335 is discharged to a paper discharge tray 371 through discharge rollers 336. Then, the paper discharge unit 370 sorts the discharged and stacked recording papers and staples the sorted recording papers.

On one hand, in a case where double-sided copy or recording is set, the recording paper is once transported up to the discharge rollers 336, and after then the rotation direction of the discharging roller 336 is reversed to guide the recording paper into a paper refeed transportation path 338 through a flapper 337. The recording paper guided into the paper refeed transportation path 338 is fed to the transfer belt 334 at the above timing.

Incidentally, the reader unit 200 and the printer unit 300 which can perform the full-color process to the image data are mainly explained in the present embodiment, but the present embodiment is not limited to this. That is, in the present embodiment, the reader unit 200 and the printer unit 300 may perform a monochrome process, and only either the reader unit 200 or the printer unit 300 may perform the full-color process. As above, the present invention is applicable to various types of image processing apparatuses.

<Explanation of Reader Image Processing Unit>

Figure 3:
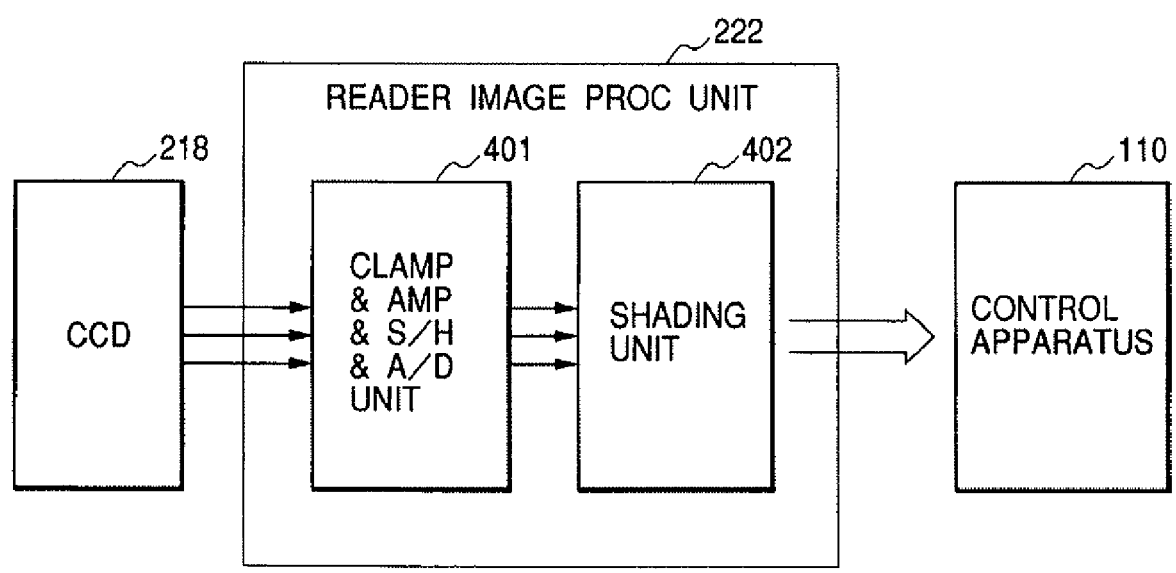
FIG. 3 is a block diagram showing the detailed structure of a reader image processing unit shown in FIG. 2.

FIG. 3 is a block diagram showing the detailed structure of the reader image processing unit 222 shown in FIG. 2.

In the reader image processing unit 222, the original put on the platen glass 211 is read and converted into the electrical signal by the CCD 218. In a case where the CCD 218 is a color sensor, it is possible to adopt a structure that R (red), G (green) and B (blue) color filters are in-line in due order on a one-line CCD, a structure that R, G and B color filters are arranged on the respective lines of a three-line CCD, a structure that filters are provided on a chip, or a structure that filters are provided independently of a CCD.

The electrical signal (analog image signal) output from the CCD 218 is input to the reader image processing unit 222, and the input signal is subjected to a sample-and-hold (S/H) process by a clamp and amplification and S/H and A/D unit 401. Thus, the dark level of the analog image signal is clamped to a reference potential, and the clamped level is amplified by a predetermined amount (although processing order is not limited to this). After then, the obtained signals are A/D converted to obtain, e.g., eight-bit R, G and B digital signals (simply called R, G and B signals hereinafter), the R, G and B signals subjected to a shading correction and black correction process by a shading unit 402, and the obtained signals are then output to the control apparatus 110.

In the present embodiment, the case where the printer unit 300 adopts a laser beam system is explained by way of example. However, the present invention is also applicable to a case where the printer unit 300 adopts other print systems such as an electrophotographic system (e.g., an LED system), a liquid crystal shutter system, an inkjet system, a thermal transfer system, a sublimation system, and the like.

<Explanation of Control Apparatus>

Figure 4:
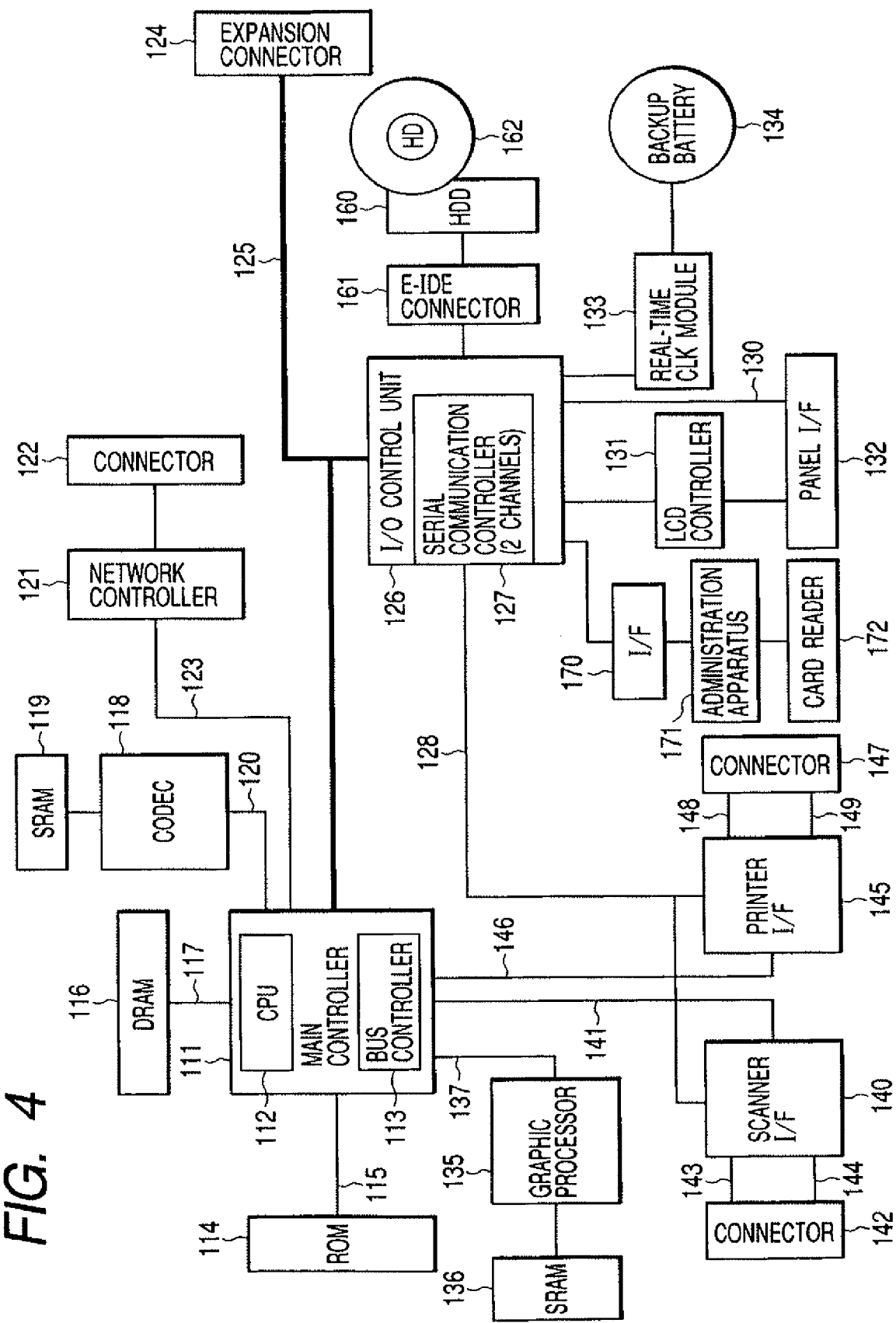
FIG. 4 is a block diagram showing the structure of a control apparatus shown in FIG. 1.

FIG. 4 is a block diagram showing the structure of the control apparatus 110 shown in FIG. 1.

In FIG. 4, numeral 111 denotes a main controller which is mainly composed of a CPU 112, a bus controller 113, and not-shown various I/F controller circuits.

The CPU 112 and the bus controller 113 control the operation of the control apparatus 110 as a whole, and the CPU 112 operates based on a program read from a ROM 114 through a ROM I/F 115. Incidentally, an operation to analyze PDL (page description language) code data received from a host computer and expand the analyzed data into raster image data has been described in the program. That is, the above various operations are administrated by software. Besides, the bus controller 113 controls data transfer in the I/F's, and further controls intervention in bus competition and DMA data transfer.

Numeral 116 denotes a DRAM which is connected to the main controller 111 through a DRAM I/F 117 is used as a working area for the operation of the CPU 112 and an area for storing the image data.

Numeral 118 denotes a codec which compresses the raster image data of the DRAM 116 according to a compression system such as an MH (Modified Huffman) system, an MR (Modified READ (relative element address)) system, an MMR (Modified Modified READ) system, a JBIG (Joint Bi-level Image Experts Group) system, a JPEG (Joint Photographic Experts Group) system, or the like, and contrarily expands the compressed and stored code data into the raster image data. Numeral 119 denotes an SRAM which is used as a temporary working area for the codec 118. The codec 118 is connected to the main controller 111 through an I/F 120, and the data is DMA transferred between the codec 118 and the DRAM 116 under the control of the bus controller 113.

Numeral 135 denotes a graphic processor which performs an image rotation process, an image magnification change process, a color space conversion process and a binarization process to the raster image data stored in the DRAM 116. An SRAM 136 is used as a temporary working area for the graphic processor 135, and further contains a nonvolatile memory in which later-described various counter values and the like are stored. The graphic processor 135 is connected to the main controller 111 through an I/F 137, and the data is DMA transferred between the graphic processor 135 and the DRAM 116 under the control of the bus controller 113.

Numeral 121 denotes a network controller which is connected to the main controller 111 through an I/F 123 and also connected to an external network through a connector 122. Here, it should be noted that Ethernet™ is generally used as the network.

Numeral 125 denotes a general-purpose high-speed bus to which an expansion connector 124 for connecting an expansion board and an I/O control unit 126 are connected. Here, it should be noted that a PCI (Peripheral Component Interconnect) bus is generally used as the general-purpose high-speed bus.

Numeral 126 denotes the I/O control unit 126 which is equipped with a two-channel start-stop system serial communication controller 127 for transmitting and receiving control commands to and from the CPU's of the reader unit 200 and the printer unit 300. Besides, the I/O control unit 126 is connected to the scanner I/F 140 and the printer I/F 145 (they are also called external I/F circuits hereinafter) through an I/O bus 128.

Numeral 132 denotes a panel I/F which is connected to an LCD controller 131 is composed of an I/F for displaying various signals on the liquid crystal screen of the operation unit 150 and a key input I/F 130 for inputting signals from hard keys and touch panel keys.

The operation unit 150 is equipped with a liquid crystal display unit, a touch panel input apparatus adhered on the liquid crystal display unit, and plural hard keys. The signal input from the hard key or the touch panel key is transferred to the CPU 112 through the panel I/F 132, and the image data from the panel I/F 132 is displayed on the liquid crystal display unit. That is, the various functions for the operations of the image processing apparatus, the image data, and the like are displayed on the liquid crystal display unit.

Numeral 133 denotes a real-time clock module which updates and stores date and time administrated in the image processing apparatus. Incidentally, the real-time clock module 133 is backed up by a backup battery 134.

Numeral 161 denotes an E-IDE I/F (or connector) which is used to connect an external storage. In the present embodiment, a hard disk drive (HDD) 160 is connected through the E-IDE connector 161, whereby the image data is stored in and read from a hard disk (HD) 162.

Numeral 170 denotes an administration apparatus I/F which connects the image processing apparatus to an administration apparatus 171 for administrating various number information concerning the number of scans for each section, the number of prints, and the like. Besides, the administration apparatus I/F 170 is used to transmit the control command from the image processing apparatus to the administration apparatus 171 and further return the counter information and an enable signal from the administration apparatus 171 to the image processing apparatus. Moreover, a card reader 172 is connected to the administration apparatus 171, whereby the section information inherent to each card can be obtained.

Connectors 142 and 147 are connected respectively to the reader unit 200 and the printer unit 300. The connector 142 includes a start-stop system serial I/F 143 and a video I/F 144, and the connector 147 includes a start-stop system serial I/F 148 and a video I/F 149.

The scanner I/F 140 is connected to the reader unit 200 through the connector 142, and also connected to the main controller 111 by a scanner bus 141, whereby the scanner I/F 140 functions to perform a predetermined process to the image received from the reader unit 200. Also, the scanner I/F 140 functions to output to the scanner bus 141 a control signal generated based on a video control signal sent from the reader unit 200. Incidentally, the data transfer from the scanner bus 141 to the DRAM 116 is controlled by the bus controller 113.

The printer I/F 145 is connected to the printer unit 300 through the connector 147, and also connected to the main controller 111 by a printer bus 146, whereby the printer I/F 145 functions to perform a predetermined process to the image data output from the main controller 111 and then output the processed image data to the printer unit 300. Also, the printer I/F 145 functions to output to the printer bus 146 a control signal generated based on a video control signal sent from the printer unit 300. Incidentally, the transfer of the raster image data expanded on the DRAM 116 to the printer unit 300 is controlled by the bus controller 113, that is, the raster image data is DMA transferred to the printer unit 300 through the printer bus 146 and the video I/F 149.

<Explanation of Image Processing Unit of Scanner I/F>

Figure 5:
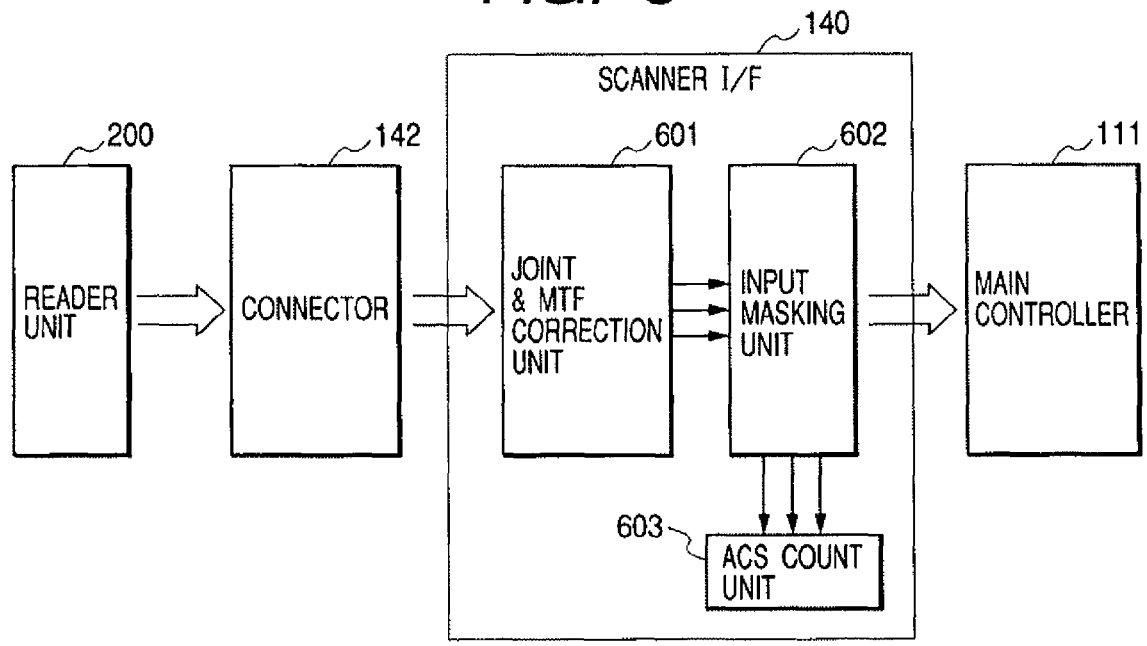
FIG. 5 is a block diagram showing the detailed structure of the part performing an image process of a scanner interface (I/F) shown in FIG. 4.

FIG. 5 is a block diagram showing the detailed structure of the part performing the image process of the scanner I/F 140 shown in FIG. 4.

As shown in FIG. 5, the image signal sent from the reader unit 200 through the connector 142 is processed by a joint and MTF (modulation transfer function) correction unit 601. When the CCD 218 is the three-line CCD, since the image read positions on the respective lines are different from others, a joint process is performed by the joint and MTF correction unit 601 to adjust a delay amount in regard to each line according to read speed, and further correct a signal timing so as to match the read positions on the three lines with others. Besides, since an MTF in the read process changes according to the read speed, an MTF correction process is performed by the joint and MTF correction unit 601 to correct such a change.

The digital signal of which the read position timing has been corrected is then input to an input masking unit 602 so as to correct the spectral characteristics of the CCD 218 and the mirrors 214, 215 and 216.

After then, the output signal of the input masking unit 602 is then sent to an ACS (auto count select) count unit 603 and the main controller 111.

Figure 6:
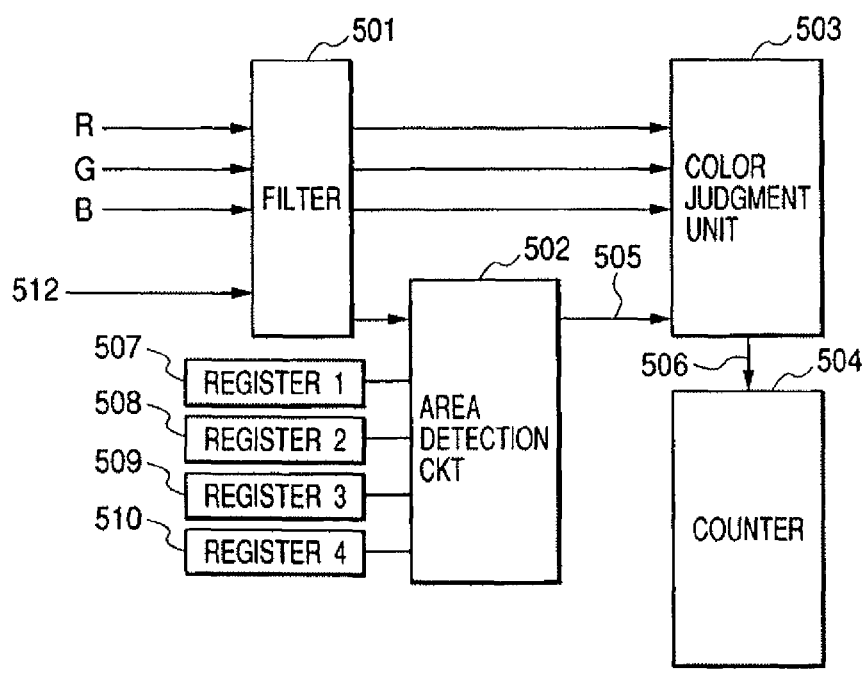
FIG. 6 is a block diagram showing the structure of an auto color select (ACS) count unit shown in FIG. 5.

FIG. 6 is a block diagram showing the structure of the ACS count unit 603 shown in FIG. 5.

Incidentally, the ACS process is performed to judge whether the original is a color original or a monochrome (black-and-white) original. That is, the ACS count unit 603 obtains saturation of each pixel, and judges how many the pixels exceeding a certain threshold exist based on the obtained saturation, thereby performing the color judgment. However, even in the black-and-white original, many color pixels microscopically exist on the periphery of an edge due to influence of the MTF or the like, whereby it is difficult to accurately perform the ACS judgment in regard to each pixel simply. In any case, although various methods are provided as the ACS judgment method, the present embodiment is not restricted to the method itself. That is, the present embodiment will be explained by using a general ACS judgment method.

As described above, since the many color pixels microscopically exist in the black-and-white original, it is necessary to judge whether or not a target pixel is a true color pixel on the basis of color pixel information on the periphery of the target pixel. Numeral 501 denotes a filter which is necessary to perform the judgment. Thus, the filter 501 has an FIFO (first in, first out) structure to refer the pixels on the periphery of the target pixel.

Numeral 502 denotes an area detection circuit which generates an area signal 505 for the ACS judgment on the basis of the values respectively set in registers 507 to 510 by the main controller 111 and a video control signal 512 sent from the reader unit 200.

Numeral 503 denotes a color judgment unit which refers the pixels on the periphery of the target pixel in the memory of the filter 501 based on the area signal 505 for the ACS judgment, and thus determines whether the target pixel is the color pixel or the black-and-white pixel. Numeral 504 denotes a counter which counts up the number of color judgment signals 506 output from the color judgment unit 503.

The main controller 111 determines, in the read range, the area to which the ACS judgment is performed, and then sets the determined value to the registers 507 to 510. In the present embodiment, the main controller 111 is set to determine the range independently of the original. Moreover, the main controller 111 compares the value of the counter counting up the number of color judgment signals within the area to which the ACS judgment is performed with a predetermined threshold, and judges based on the compared result whether the original in question is the color original or the black-and-white original.

In each of the registers 507 to 510, the position where the color judgment unit 503 starts the judgment and the position where the color judgment unit 503 ends the judgment are set respectively in main and sub scan directions on the basis of the video control signal 512 sent from the reader unit 200. In the present embodiment, the positions corresponding to the size smaller than the size of an actual original by 10 mm or so are set.

<Explanation of Image Processing Unit of Printer I/F>

Figure 7:
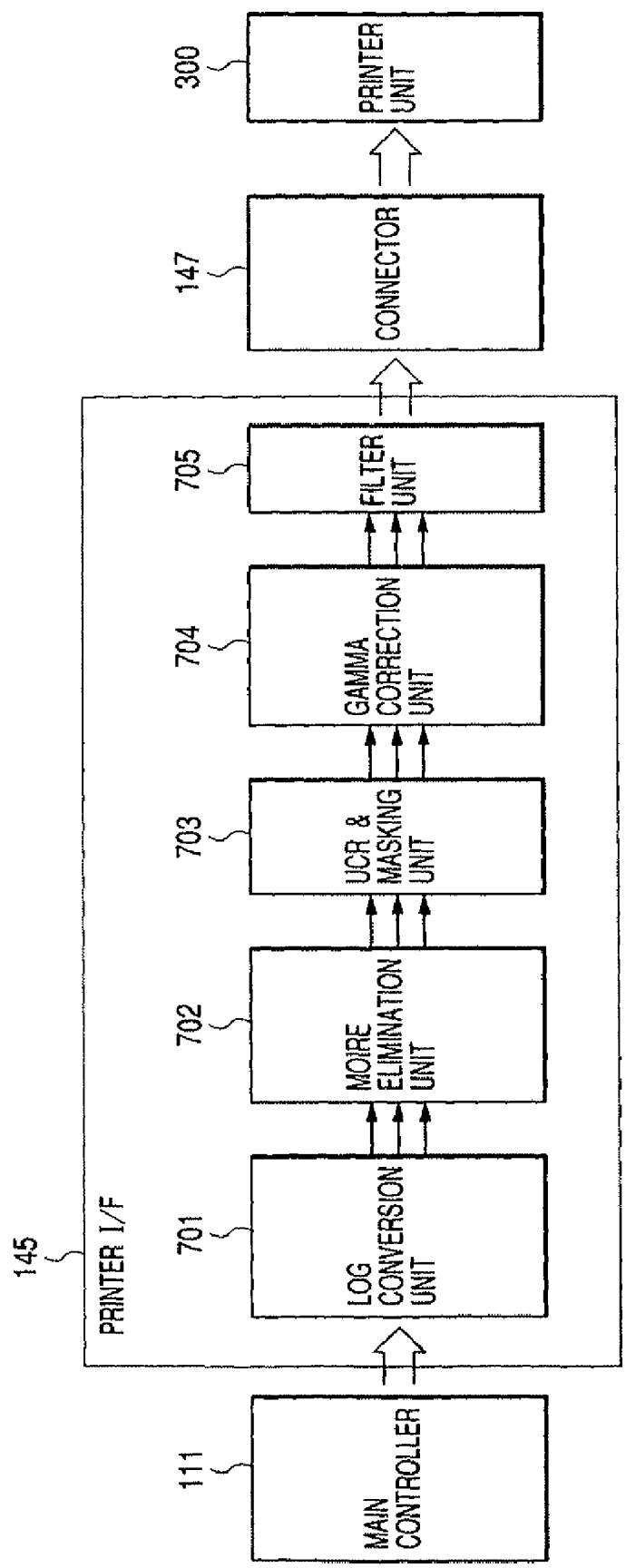
FIG. 7 is a block diagram showing the detailed structure of the part performing an image process of a printer I/F shown in FIG. 4.

FIG. 7 is a block diagram showing the detailed structure of the part performing the image process of the printer I/F 145 shown in FIG. 4.

As shown in FIG. 7, the image signal sent from the main controller 111 through the printer bus 146 is first input to a logarithmic (LOG) conversion unit 701, whereby the input R, G and B signals are logarithmic converted into C (cyan), M (magenta) and Y (yellow) signals. Then, moire elimination is performed to these signals by a moire elimination unit 702. Numeral 703 denotes an under color removal (UCR) and masking unit which performs a UCR process to generate C, M, Y and K (black) signals on the basis of the moire-eliminated C, M and Y signals. Then, the obtained signals are subjected to a masking process to be suitable for the output by the printer unit. The signals processed by the UCR and masking unit 703 are further subjected to density adjustment by a gamma correction unit 704, and then subjected to a smoothing process or an edge process by a filter unit 705. After then, the image is sent to the printer unit 300 through the connector 147.

<Explanation of Graphic Processor>

Figure 8:
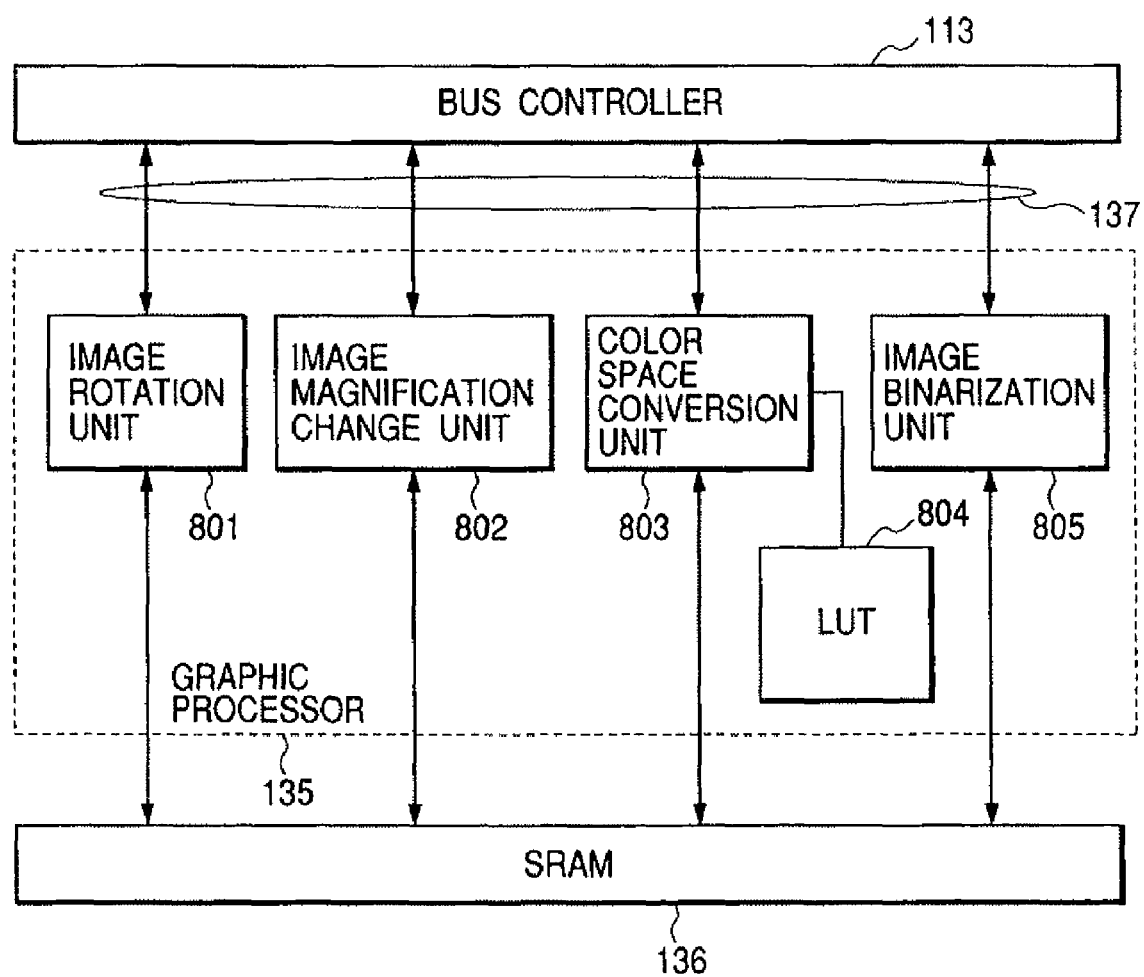
FIG. 8 is a block diagram showing the detailed structure of a graphic processor shown in FIG. 4.

FIG. 8 is a block diagram showing the detailed structure of the graphic processor 135 shown in FIG. 4.

As shown in FIG. 8, the graphic processor 135 is composed of an image rotation unit 801 acting as a module to perform an image rotation process, an image magnification change unit 802 acting as a module to perform an image magnification change process, a color space conversion unit 803 and an LUT (look-up table) 804 acting as a module to perform a color space conversion process, and an image binarization unit 805 acting as a module to perform the binarization process.

The SRAM 136 is used as a temporary working area for each module of the graphic processor 135. Here, it is assumed that the work area is statically allocated to each module beforehand so that the work areas of the SRAM 136 used by the respective modules do not compete with others.

The graphic processor 135 is connected to the main controller 111 through the I/F 137, and the data is DMA transferred between the graphic processor 135 and the DRAM 116 under the control of the bus controller 113.

The bus controller 113 controls to set modes and the like to the modules of the graphic processor 135, and further controls the timings for transferring the image data to the respective modules.

<Explanation of Image Rotation Unit>

Hereinafter, the process procedure of the image rotation unit 801 will be explained.

The setting for image rotation control is performed from the CPU 112 to the bus controller 113 through the I/F 137. Thus, based on the setting, the bus controller 113 performs the setting (e.g., setting for image size, setting for rotation direction, setting for rotation angle, and the like) necessary for image rotation to the image rotation unit 801. After then, the image data transfer is again permitted from the CPU 112 to the bus controller 113. According to such permission, the bus controller 113 starts the image data transfer from the DRAM 116 or the device connected through each I/F.

Incidentally, it is assumed that the image size in case of image rotation is 32 pixels×32 lines, and that the image transfer of 24 bytes (corresponding to one pixel of eight bits for each of R, G and B) is performed in case of image data transfer to the image bus.

Figure 9:
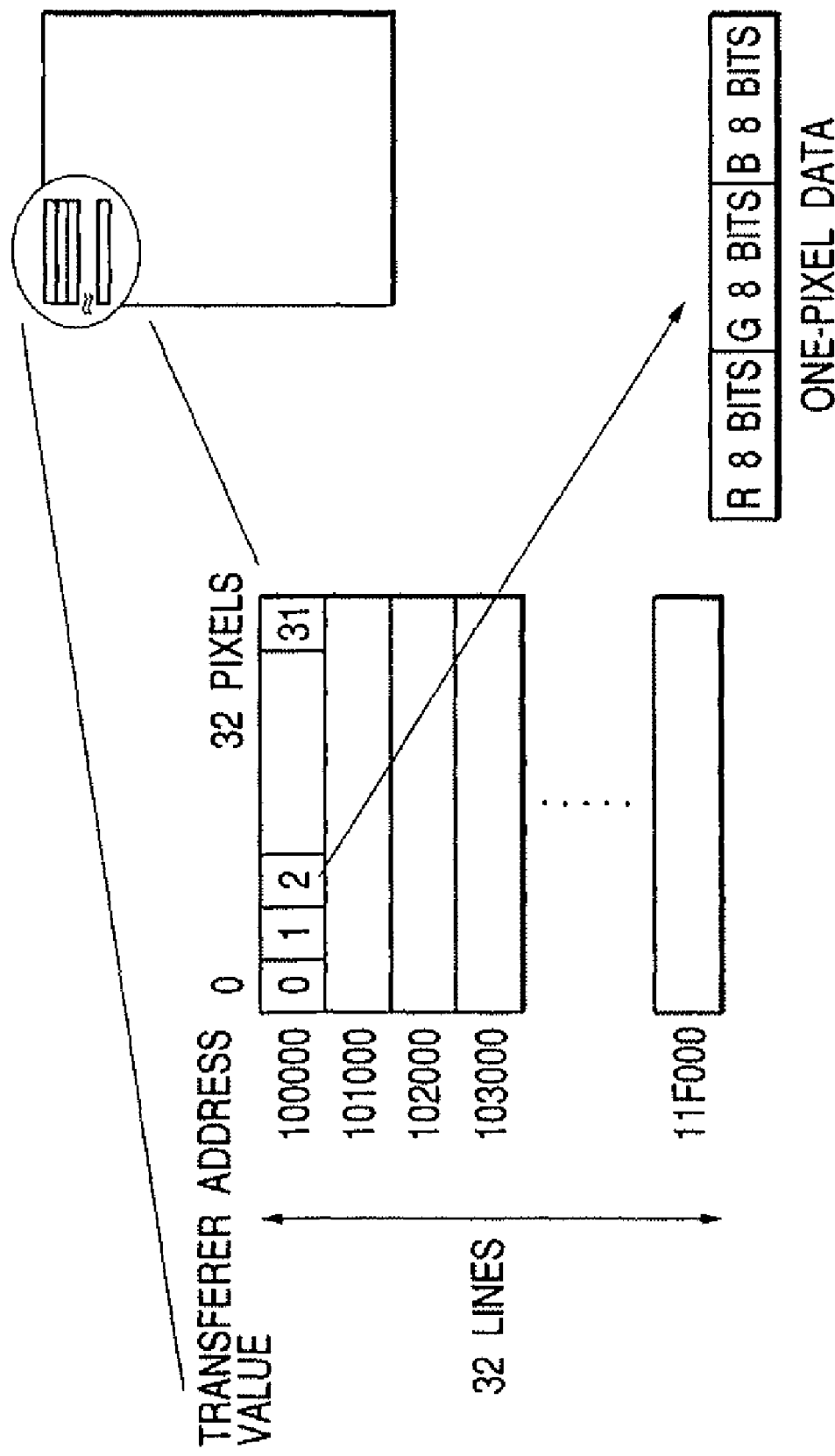
FIG. 9 is a diagram for explaining an operation of an image rotation unit shown in FIG. 8.

As above, to obtain the image of 32 pixels×32 lines, it is necessary to perform the image data transfer in the above unit 32×32 times, and it is also necessary to transfer the image data from non-continuous addresses (see FIG. 9).

The image data transferred by non-continuous addressing is written in the SRAM 136 so as to have been rotated at a desired angle when it is read. For example, when the image is rotated counterclockwise by 90°, the image data to be transferred is written in the Y direction as shown in FIG. 10, and the written data is then read in the X direction, whereby the image is resultingly rotated.

After the image rotation (i.e., the data writing in the SRAM 136) of 32 pixels×32 lines ended, the image rotation unit 80 reads the image data from the SRAM 136 in such a read method as above, and then transfers the read image to the bus controller 113.

The bus controller 113 which received the rotation-processed image data transfers the received image data to the DRAM 116 or each devices on the I/F by the non-continuous addressing.

Such a series of processes is repeated until the CPU 112 does not issue a processing request (i.e., when the processes of pages of necessary number end).

<Explanation of Image Magnification Change Unit>

Hereinafter, the process procedure in the image magnification change unit 802 will be explained.

The setting for image magnification change control is performed from the CPU 112 to the bus controller 113 through the I/F 137. Thus, based on the setting, the bus controller 113 performs the setting (e.g., setting for magnification change ratio in main scan direction, setting for magnification change ratio in sub scan direction, setting for image size after magnification change, and the like) necessary for image magnification change to the image magnification change unit 802. After then, the image data transfer is again permitted from the CPU 112 to the bus controller 113. According to such permission, the bus controller 113 starts the image data transfer from the DRAM 116 or the device connected through each I/F.

Incidentally, the image magnification change unit 802 temporarily stores the received image data in the SRAM 136, and performs interpolation processes to the stored data corresponding to the pixels of necessary number and the lines of necessary number according to the magnification change ratios in the main and sub scan directions by using the SRAM 136 as an input buffer, whereby the magnification change process is completed. The data obtained by the magnification change process is again written in the SRAM 136. Then, the image magnification change unit 802 reads the image data from the SRAM 136 (using as an output buffer) in the above read method, and transfers the read image data to the bus controller 113.

The image data subjected to the magnification change process and received by the bus controller 113 is further transferred to the DRAM 116 or each device on the I/F.

<Explanation of Color Space Conversion Unit>

Hereinafter, the process procedure in the color space conversion unit 803 will be explained.

The setting for color space conversion control is performed from the CPU 112 to the bus controller 113 through the I/F 137. Thus, based on the setting, the bus controller 113 performs the setting (e.g., setting for coefficients of later-described matrix calculation, setting for table value of LUT 804, and the like) necessary for the color space conversion process to the color space conversion unit 803 and the LUT 804. After then, the image data transfer is again permitted from the CPU 112 to the bus controller 113. According to such permission, the bus controller 113 starts the image data transfer from the DRAM 116 or the device connected through each I/F.

Then, the color space conversion unit 803 performs 32×32 matrix calculation represented by an equation (1), in regard to each pixel of the received image data.

$$\begin{pmatrix} X \\ Y \\ Z \end{pmatrix} = \begin{pmatrix} a11 & a12 & a13 \\ a21 & a22 & a23 \\ a31 & a32 & a33 \end{pmatrix} \begin{pmatrix} R \square b1 \\ G \square b2 \\ B \square b3 \end{pmatrix} + \begin{pmatrix} c1 \\ c2 \\ c3 \end{pmatrix} \quad (1)$$

In the equation (1), symbols R, G and B denote inputs, symbols X, Y and Z denote outputs, and symbols a11, a12, a13, a21, a22, a23, a31, a32 and a33 denotes coefficients.

In any case, by the calculation of the equation (1), various color space conversion processes can be performed (e.g., conversion from RGB color space into Yuv color space).

Next, the conversion by using the LUT 804 is performed to the data obtained by the matrix calculation, whereby also nonlinear conversion can be performed. Of course, it is possible to substantially skip the LUT conversion by providing a through-type table. In any case, after then, the color space conversion unit 803 transfers the image data subjected to the color space conversion process to the bus controller 113.

The image data subjected to the color space conversion process and received by the bus controller 113 is further transferred to the DRAM 116 or each device on the I/F.

<Explanation of Image Binarization Unit>

Hereinafter, the process procedure in the image binarization unit 805 will be explained.

The setting for binarization control is performed from the CPU 112 to the bus controller 113 through the I/F 137. Thus, based on the setting, the bus controller 113 performs the setting (e.g., setting for various parameters according to conversion methods, and the like) necessary for the binarization process to the image binarization unit 805. After then, the image data transfer is again permitted from the CPU 112 to the bus controller 113. According to such permission, the bus controller 113 starts the image data transfer from the DRAM 116 or the device connected through each I/F.

Then, the binarization unit 805 performs the binarization process to the received image data. Here, in the present embodiment, it is assumed that a binarization method of simply comparing the image data with a predetermined threshold and then performing the binarization based on the compared result is adopted. However, of course, other methods such as a dither method, an error diffusion method, an improved error diffusion method, and the like can be adopted.

After then, the image binarization unit 805 transfers the image data subjected to the binarization process to the bus controller 113.

The image data subjected to the binarization process and received by the bus controller 113 is further transferred to the DRAM 116 or each device on the I/F.

<Explanation of Operation Unit>

Figure 11:
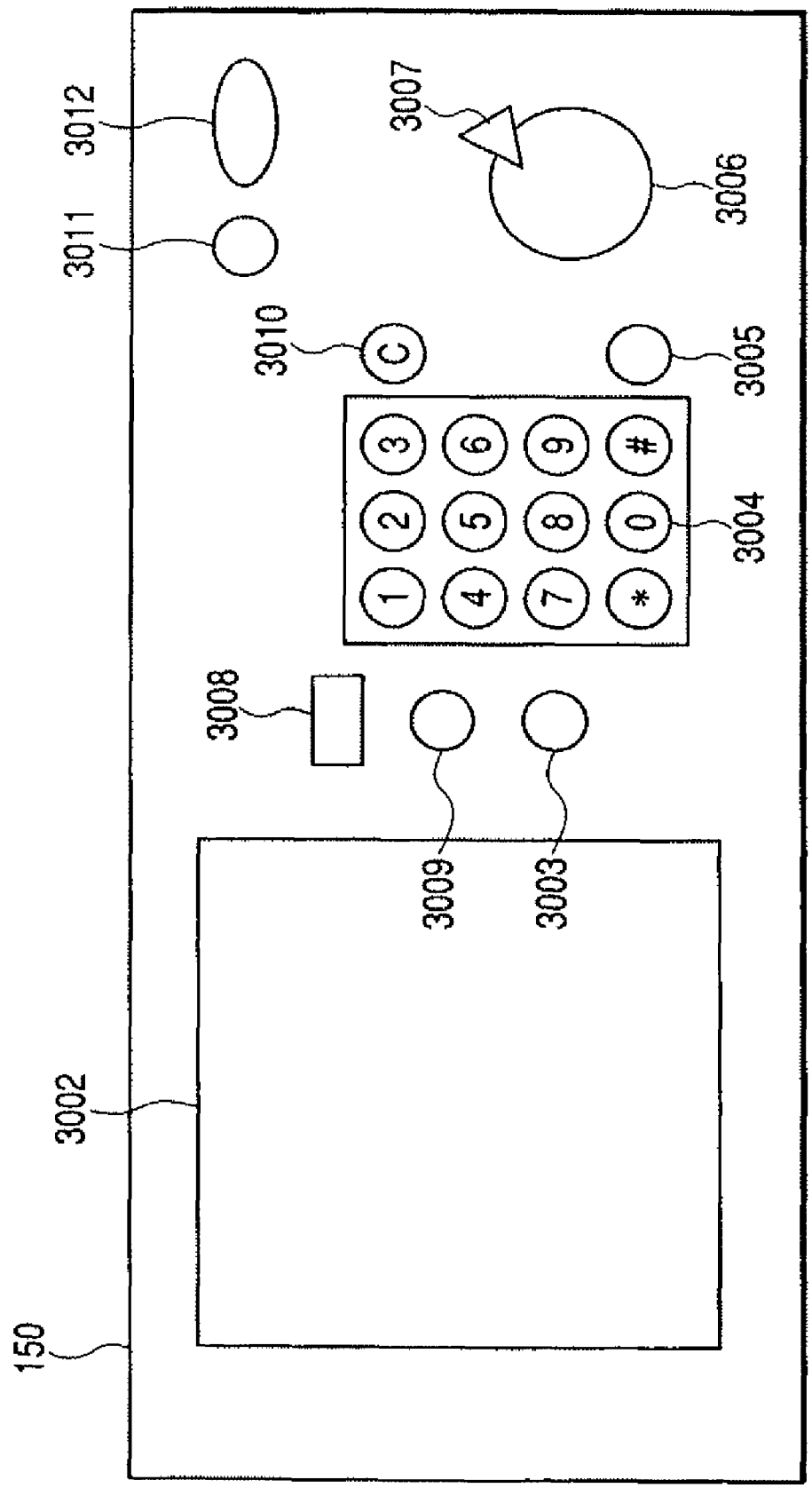
FIG. 11 is a diagram showing the configuration of an operation unit shown in FIG. 1.

FIG. 11 is a diagram showing the configuration of the operation unit 150 shown in FIG. 1.

In FIG. 11, numeral 3002 denotes an LCD unit on which touch panel sheet has been adhered. The LCD unit 3002 displays a system operation (or handling) screen, and also, when a displayed key is depressed, notifies the CPU 112 in the control apparatus 110 of position information representing the position of the depressed key.

Numeral 3006 denotes a start key which is used to start, e.g., an original image read operation. A two-color (green and red) LED is provided at the center of the start key 3006 to indicate by these colors whether or not the start key is available.

Numeral 3007 denotes a stop key which is used to stop the running operation, numeral 3005 denotes an ID key which is used to input a user ID, numeral 3008 denotes a reset key which is used to initialize the setting on the operation unit 150, numeral 3009 denotes a guide key which is used to cause the LCD unit to display the explanations of the displayed keys and the like, numeral 3003 denotes a user mode key which is used to perform mode setting inherent to the image processing apparatus itself, and numeral 3004 denotes numeric keys which are used to directly input numerals and magnifications.

Numeral 3010 denotes a clear key which is used to clear the numerals and the like input by the numeric keys 3004, numeral 3012 denotes an operation unit power supply switch which is used to turn on and off the operation unit 150, and numeral 3011 denotes a power saving key which is used to set a power saving mode.

Hereinafter, operation screens to be displayed on the LCD unit 3002 of the operation unit 150 will be explained in detail with reference to FIGS. 12 to 25.

<Operation Screen>

Figure 12:
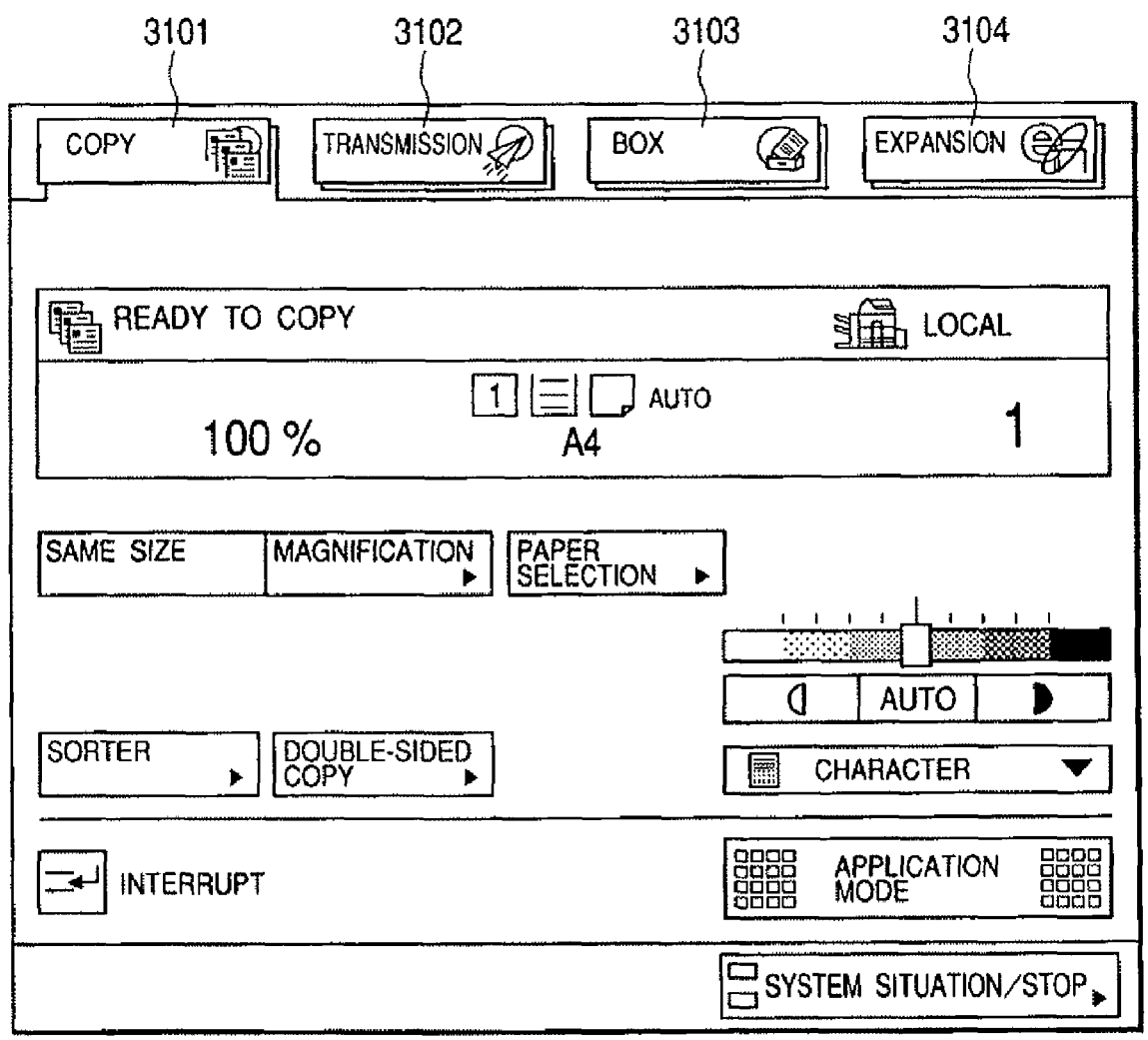
FIG. 12 is a pattern diagram showing an example of an operation screen displayed on an LCD unit shown in FIG. 11.

FIG. 12 is a pattern diagram showing an example of the operation screen displayed on the LCD unit 3002 shown in FIG. 11.

The functions provided by the image processing apparatus according to the present invention is roughly classified into four categories composed of copy, transmission, box and expansion, and these categories correspond to four main tabs (i.e., a copy tab 3101, a transmission tab 3102, a box tab 3103 and an expansion tab 3104) all displayed at the upper portion on the operation screen of the LCD unit 3002.

By depressing each of the main tabs 3101 to 3104, the screen of each category is changed. Incidentally, when it is not permitted to change the category, the displayed color of the main tab is appropriately changed, and the color-changed main tab becomes unavailable.

Here, the copy (category) includes a function to perform ordinary document copy by using the scanner (reader unit 200) and the printer (printer unit 300) of the own apparatus, and a function to perform remote copy by using the scanner (reader unit 200) and a printer connected through the network.

The transmission (category) includes a function to transfer the document date scanned by the scanner (reader unit 200) of the own apparatus, e.g., to a host computer or a server by using an electronic mail, to a remote printer (including printer and other copy machine), to a facsimile machine, to an FTP (file transfer protocol) server, and to a database. That is, this function can transfer the data to plural destinations.

The box (category) includes a function to store the document scanned by the own scanner (reader unit 200) or received by a facsimile, and then enables a user to print out the stored data at an arbitrary timing. Besides, the expansion (category) includes a function to enable a remote scanner to perform the scan.

<Copy Main Screen>

Figure 13:
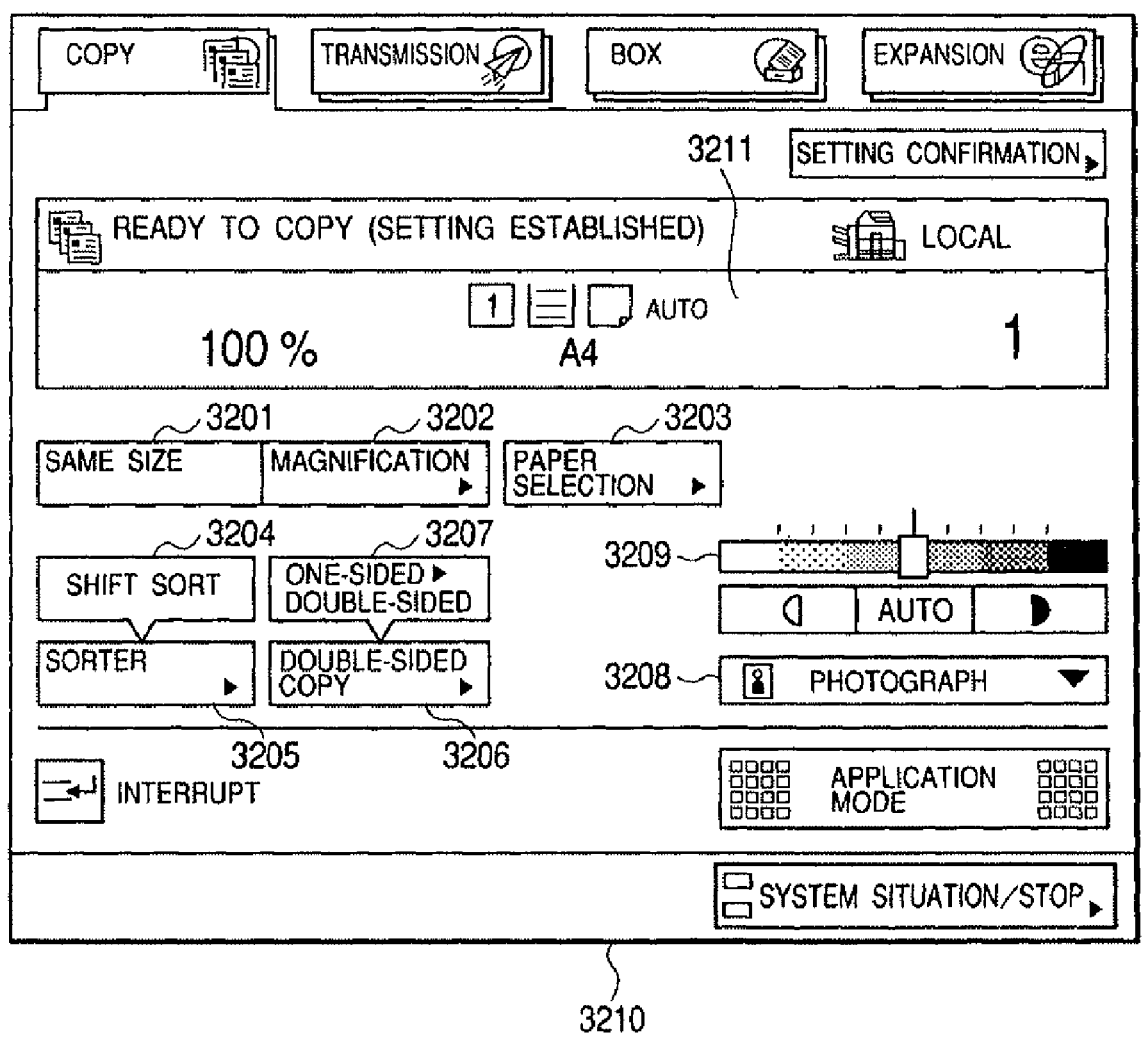
FIG. 13 is a pattern diagram showing an example of a copy main screen displayed on the LCD unit shown in FIG. 11 when a copy tab shown in FIG. 12 is selected.

FIG. 13 is a pattern diagram showing an example of the copy main screen displayed on the LCD unit 3002 shown in FIG. 11 when the copy tab 3101 shown in FIG. 12 is selected. When the start button 3006 is depressed on the copy main screen, the scanner (reader unit 200) operates, whereby the copies according to various setting parameters displayed on the screen are output from the selected printer.

In FIG. 13, numeral 3210 denotes the copy main screen which includes an image quality adjustment button and its display area 3208, a copy parameter display 3211 as well as that in the conventional copy machine, a same size button 3201, an enlargement and reduction (magnification) setting button 3202, a paper selection button 3203, a sorter setting button 3205, a sorter setting display 3204, a double-sided copy setting button 3206, a double-sided copy setting display 3207, and a density indicator and density setting button 3209.

Figure 14:
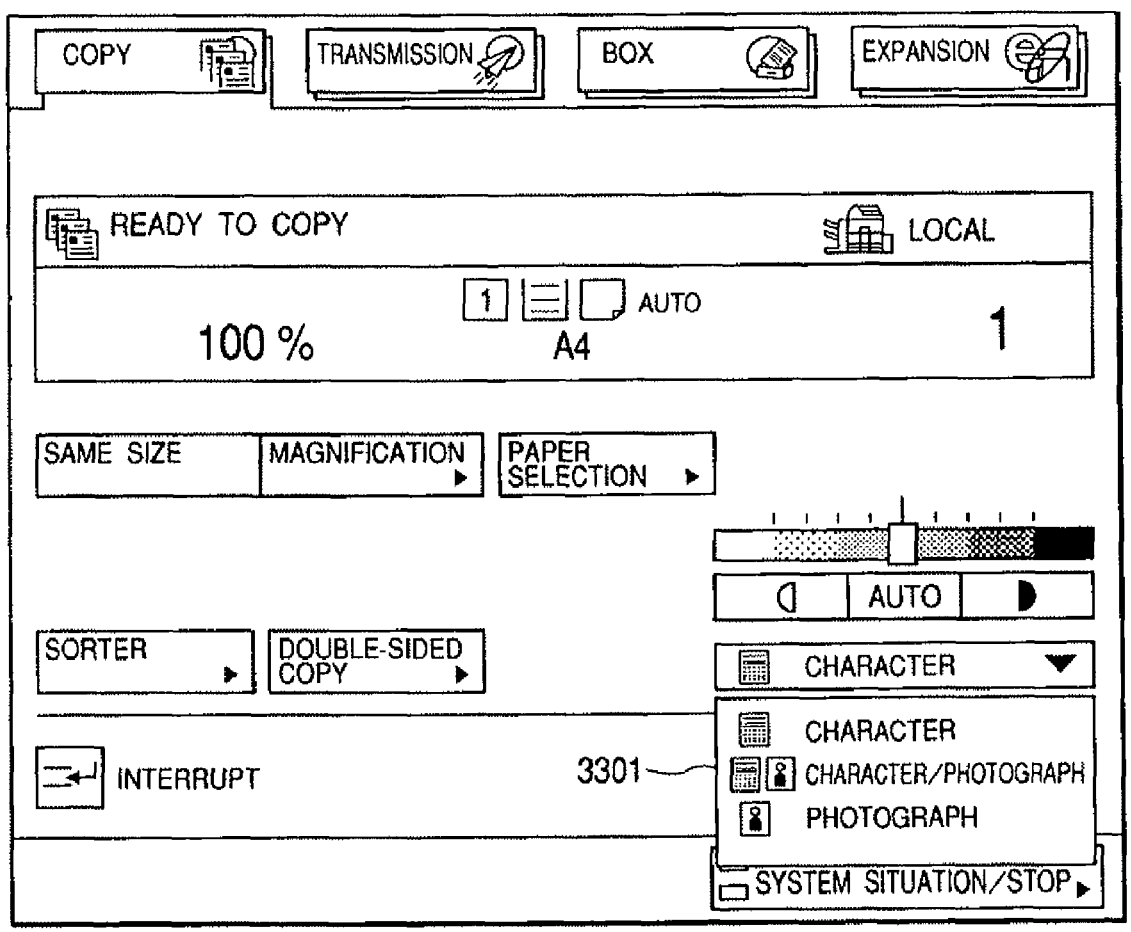
FIG. 14 is a pattern diagram showing an example of an image quality adjustment list on a copy main screen displayed on the LCD unit shown in FIG. 11.
Figure 15:
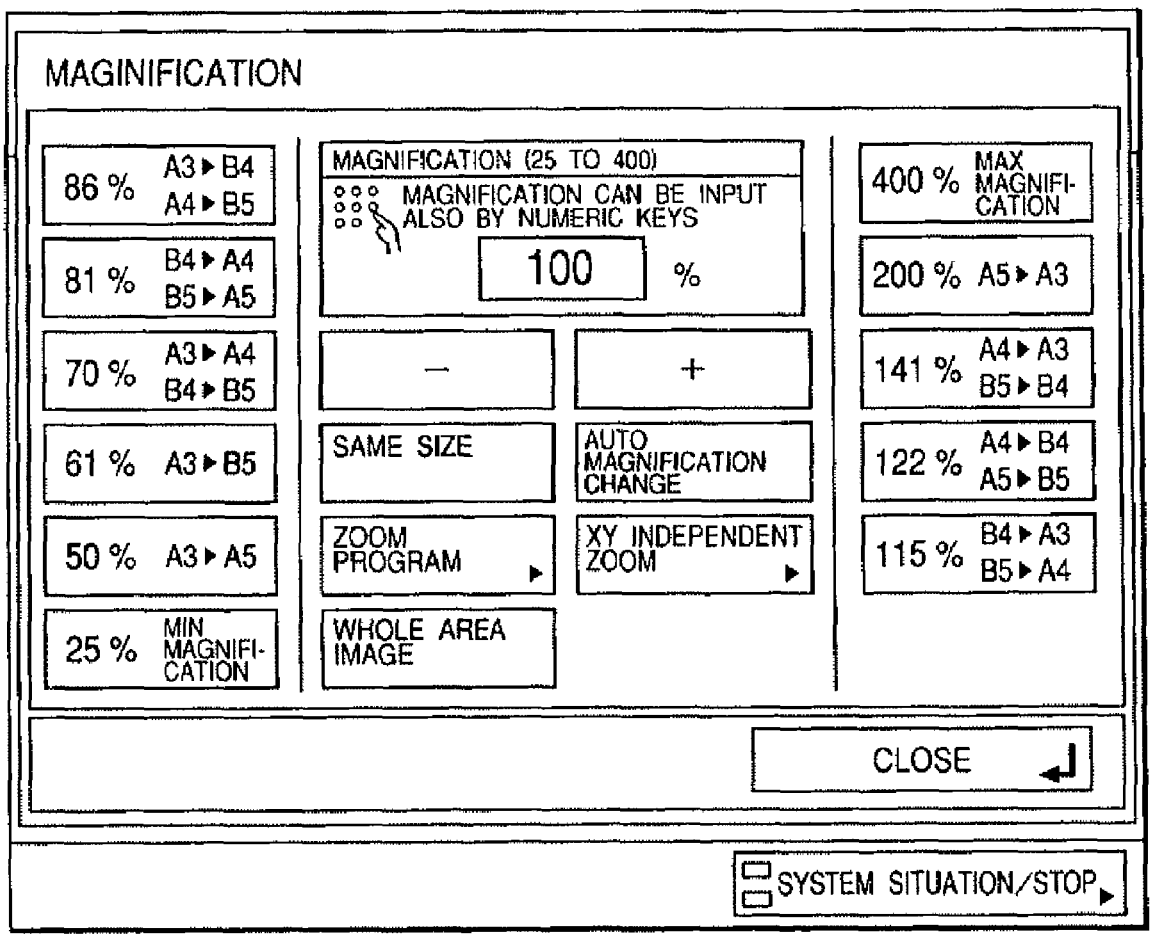
FIG. 15 is a pattern diagram showing an example of a magnification change sub screen displayed on the LCD unit shown in FIG. 11.
Figure 16:
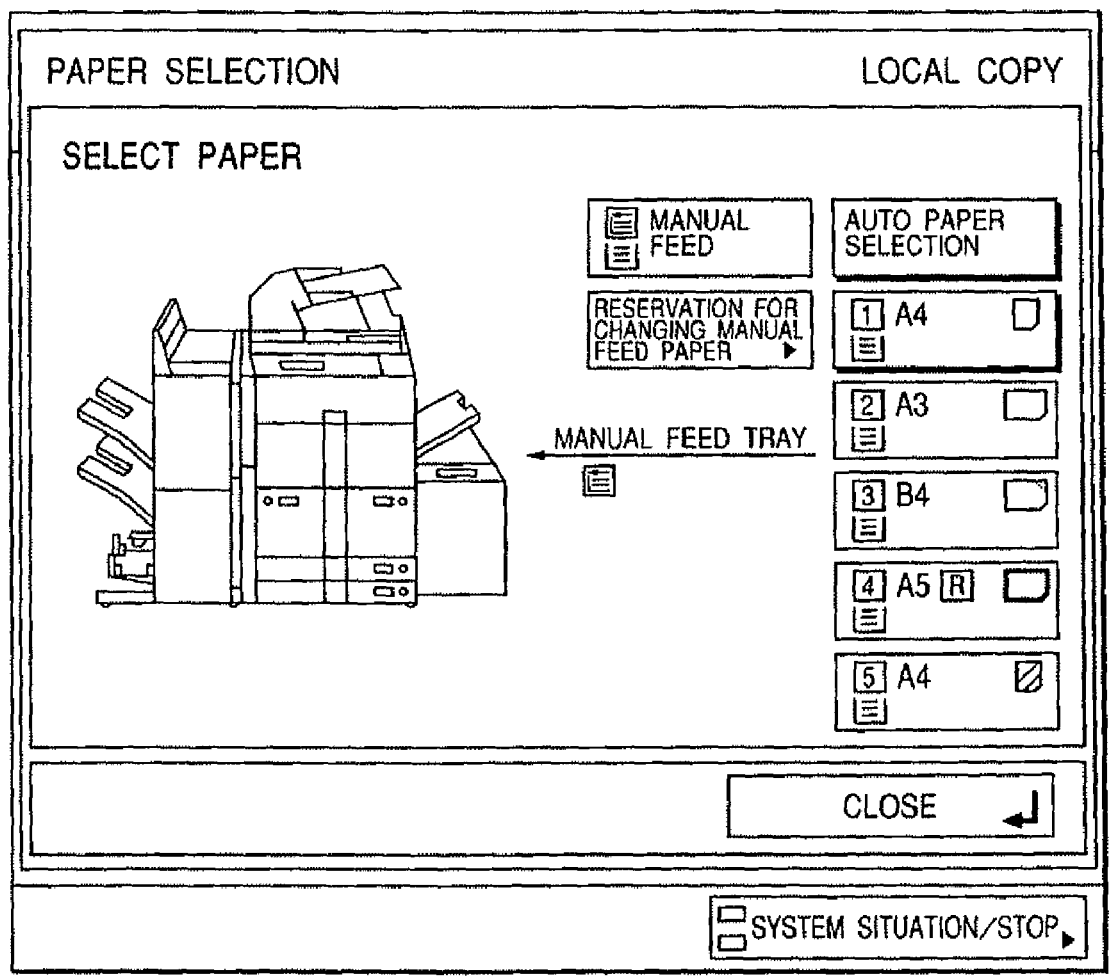
FIG. 16 is a pattern diagram showing an example of a paper selection sub screen displayed on the LCD unit shown in FIG. 11.
Figure 17:
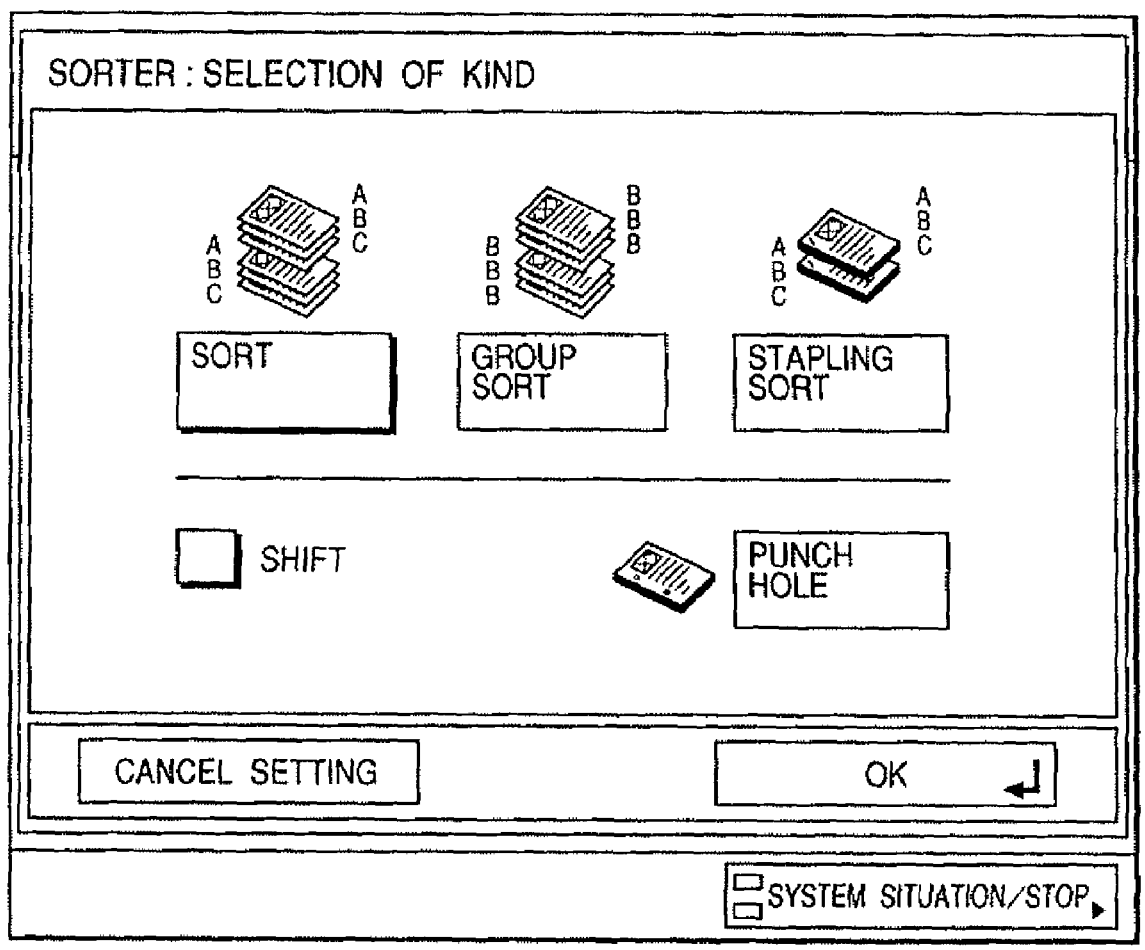
FIG. 17 is a pattern diagram showing an example of a sorter setting sub screen displayed on the LCD unit shown in FIG. 11.
Figure 18:
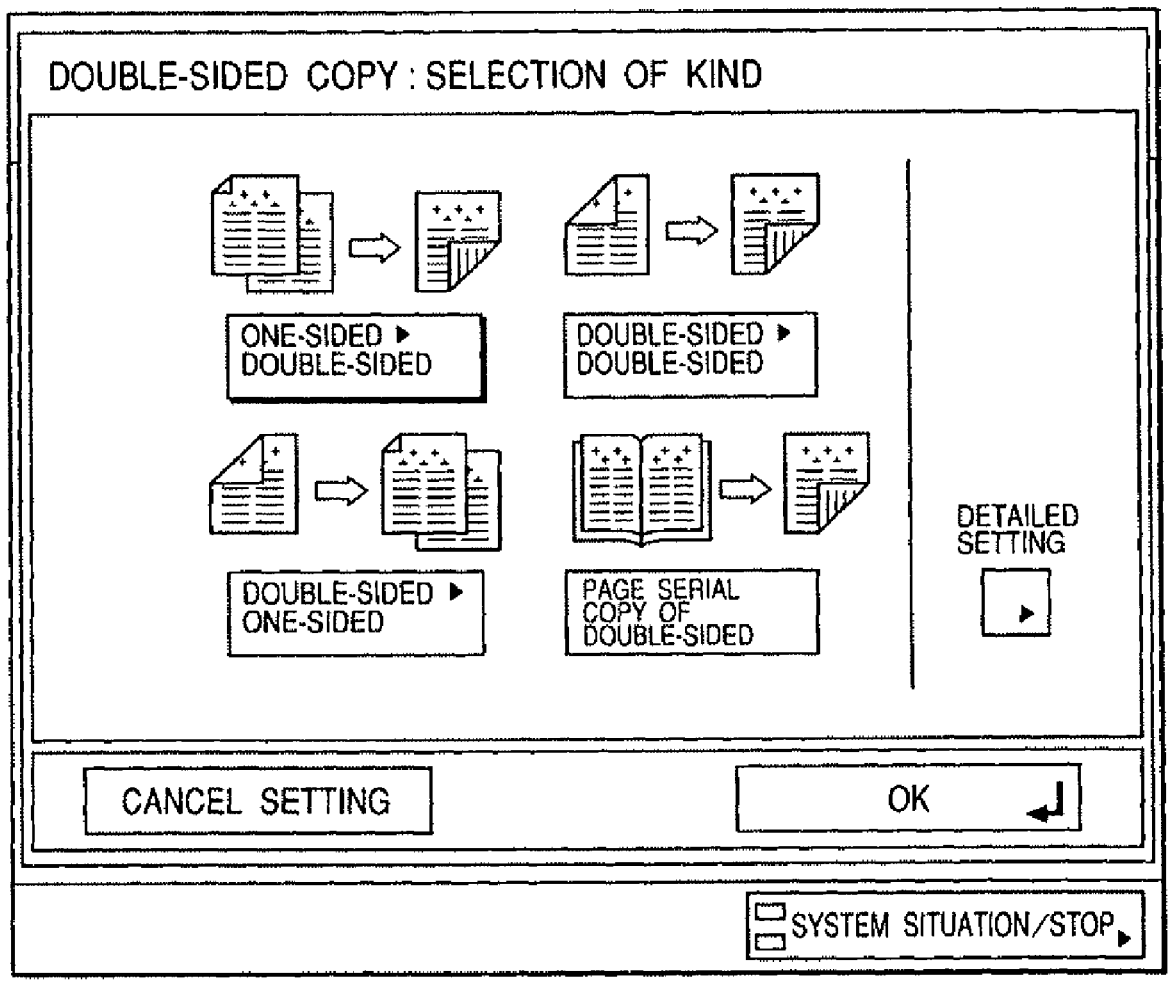
FIG. 18 is a pattern diagram showing an example of a double-sided copy setting sub screen displayed on the LCD unit shown in FIG. 11.

When the image quality adjustment button 3208 is depressed, an image quality list 3301 is displayed as shown in FIG. 14, whereby the user can select the desired image quality in the list.

Besides, when such a copy parameter setting button (i.e., the enlargement and reduction (magnification) setting button 3202, the paper selection button 3203, the sorter setting button 3205, or the double-sided copy setting button 3206), a sub screen (i.e., a magnification change sub screen shown in FIG. 15, a paper selection sub screen shown in FIG. 16, a sorter setting sub screen shown in FIG. 17, or a double-sided copy setting sub screen shown in FIG. 18) for performing the corresponding setting is displayed, whereby the user can set the parameter as well as the setting in the conventional copy machine. Moreover, as well as the conventional copy machine, the density setting can be performed by using the density indicator and density setting button 3209.

<Transmission Main Screen>

Figure 19:
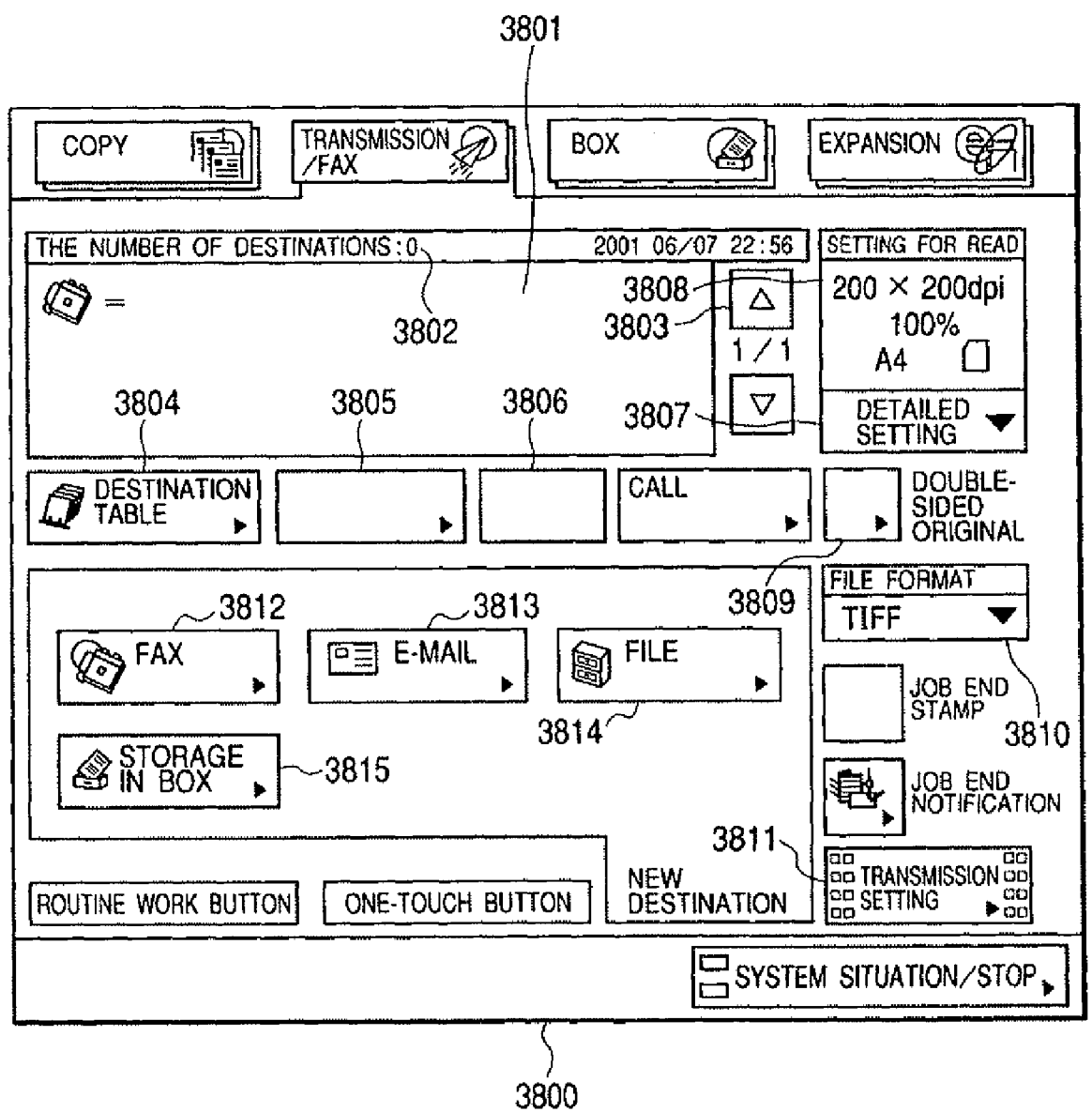
FIG. 19 is a pattern diagram showing an example of a transmission main screen displayed on the LCD unit shown in FIG. 11.

FIG. 19 is a pattern diagram showing an example of the transmission main screen displayed on the LCD unit 3002 shown in FIG. 11 when the transmission tab 31002 shown in FIG. 12 is selected. When the start button 3006 is depressed on the transmission main screen, the scanner (reader unit 200) operates, whereby a transmission process to transmit the read image data to a set destination in a designated transmission method (e.g., electronic mail method, facsimile method, or the like) starts.

In FIG. 19, numeral 3800 denotes the transmission main screen which includes a destination display area 3801, a detailed destination number display area 3802, a destination scroll button 3803, a destination display button 3804, a detailed information button 3805, a delete button 3806, a read setting display area 3808, a read detailed setting button 3807, a double-sided original button 3809, a file format setting button 3810, a transmission setting button 3811, a facsimile destination setting button 3812, an electronic mail destination setting button 3813, a file destination setting button 3814, and the like.

An input destination list is displayed in the destination display area 3801, and newly input destinations are sequentially added to the end of the list. The number of currently set destinations is displayed on the detailed destination number display area 3802. After a certain address is selected from the destination display area 3801, when the delete button 3806 is depressed, the selected destination is deleted.

In response to the depression of the facsimile destination setting button 3812, the control apparatus causes the LCD unit to display a setting screen (not shown) for inputting a partner's address (destination) to which the original data is transmitted by a facsimile. On this screen, when the partner's address is input and a determination button is depressed by the user, the control apparatus returns the displayed screen to the screen of FIG. 19, and then displays in the destination display area 3801 the partner's address input on the previous screen and also displays in the detailed destination number display area 3802 the number of destinations.

When the electronic mail destination setting button 3813 on the operation screen shown in FIG. 19 is depressed, the control apparatus causes the LCD unit to display a setting screen (not shown) for inputting the partner's address (destination) to which the original data is transmitted by an electronic mail. On this screen, when the partner's address is input and the determination button is depressed by the user, the control apparatus returns the displayed screen to the screen of FIG. 19, and then displays in the destination display area 3801 the partner's address input on the previous screen and also displays in the detailed destination number display area 3802 the number of destinations.

Moreover, when the file destination setting button 3814 on the operation screen shown in FIG. 19 is depressed, the control apparatus causes the LCD unit to display a setting screen (not shown) for inputting a host computer's address (destination) to which the original data is to be transmitted in a file transmission method. On this screen, when the partner's address is input and the determination button is depressed by the user, the control apparatus returns the displayed screen to the screen of FIG. 19, and then displays in the destination display area 3801 the partner's address input on the previous screen and also displays in the detailed destination number display area 3802 the number of destinations.

Moreover, when a button 3815 on the operation screen shown in FIG. 19 is depressed, the control apparatus causes the LCD unit to display a setting screen (not shown) for inputting a box number (destination) in which the original data to be stored in any of plural boxes provided in the hard disk of the own apparatus is stored. On this screen, when the box number is input and the determination button is depressed by the user, the control apparatus returns the displayed screen to the screen of FIG. 19, and then displays in the destination display area 3801 the box number input on the previous screen and also displays in the detailed destination number display area 3802 the number of destinations.

In the state that the previous setting was ended by the user and thus the displayed content on the operation unit has been returned to the operation screen shown in FIG. 19, when the start key (not shown) on the operation unit 150 is depressed by the user, the control apparatus causes the reader unit 200 to start the read process of the original set on the reader unit 200. Further, the control apparatus performs control so that the original data scanned by the reader unit 200 is transmitted to the destination corresponding to the displayed content in the destination display area 3801 of the operation screen shown in FIG. 19. For example, when the destination (partner's telephone number) has been set through the depression of the facsimile destination setting button 3812, the control apparatus performs control so that the scanned image data is transmitted to the destination in question by facsimile. Besides, when the destination (electronic mail address) has been set through the depression of the electronic mail destination setting button 3813, the control apparatus performs control so that the scanned image data is transmitted to the destination in question by electronic mail. Furthermore, when the destination (host computer's address) has been set through the depression of the file destination setting button 3814, the control apparatus performs control so that the scanned image data is file transmitted to the destination in question. Furthermore, when the destination (box number of the box to which original data to be stored in any of plural boxes provided in the hard disk of the own apparatus is stored) has been set through the depression of the button 3815, the control apparatus performs control so that the scanned image data is stored in the destination (box) in question. Incidentally, it should be noted that the data storage process to the box can be performed by using a later-described box screen.

As described above, the original data scanned by the reader unit 200 can be output in the desired output method selectable from among the various kinds of output methods (facsimile output process, electronic mail output process, file output process, box storage process, and the like). Incidentally, when the plural destinations can be set in one output method and thus the plural destinations are actually designated, the control apparatus performs control so that the scanned data is output to the plural designated destinations.

Moreover, when the plural buttons are selected from among the buttons 3812 to 3815, the processes corresponding to these buttons can be performed together. For example, it is assumed that the destination of facsimile transmission is set through the depression of the button 3812 by the user, the destination of electronic mail transmission is set through the depression of the button 3813, the destination of file transmission is set through the depression of the button 3814, and the destination of box storage is set through the depression of the button 3815. In this case, the control apparatus performs control so that all of the destinations respectively set for the above various output methods are simultaneously displayed in the destination display area 3801 of the returned operation screen shown in FIG. 19. Then, when the start key is depressed, the control apparatus causes the reader unit 200 to perform the original read process and further to transmit the read original image to the plural destinations in the mutually different output methods displayed in the destination display area 3801. For example, when the destination set through the button 3813, the destination set through the button 3814, and the destination set through the button 3815 are displayed in the destination display area 3801, the control apparatus performs control so that the scanned image data is transmitted by facsimile to the partner of the telephone number set through the button 3812, the scanned image data is transmitted by electronic mail to the partner of the electronic mail address set through the button 3813, the scanned image data is file transmitted to the host computer set through the button 3814, and the scanned image data is output to the box (designated box in the hard disk of the own apparatus) of the box number set through the button 3815. As above, it is controllable to simultaneously output the scanned original data to the plural destinations in the plural kinds of output methods.

Furthermore, even when a transmission mode is executed in any of the above plural kinds of output methods, the control apparatus can control whether or not to permit to execute the transmission mode. That is, the control apparatus can control the permission and inhibition of execution of the transmission mode according to the control based on counter information (scan counter information particularly concerning the number of read times in the above transmission mode) capable of being generated, stored, administrated, updated and displayed, under the later-described control of the control apparatus. Besides, in this case, the counter information can be presented and notified to the user.

Figure 20:
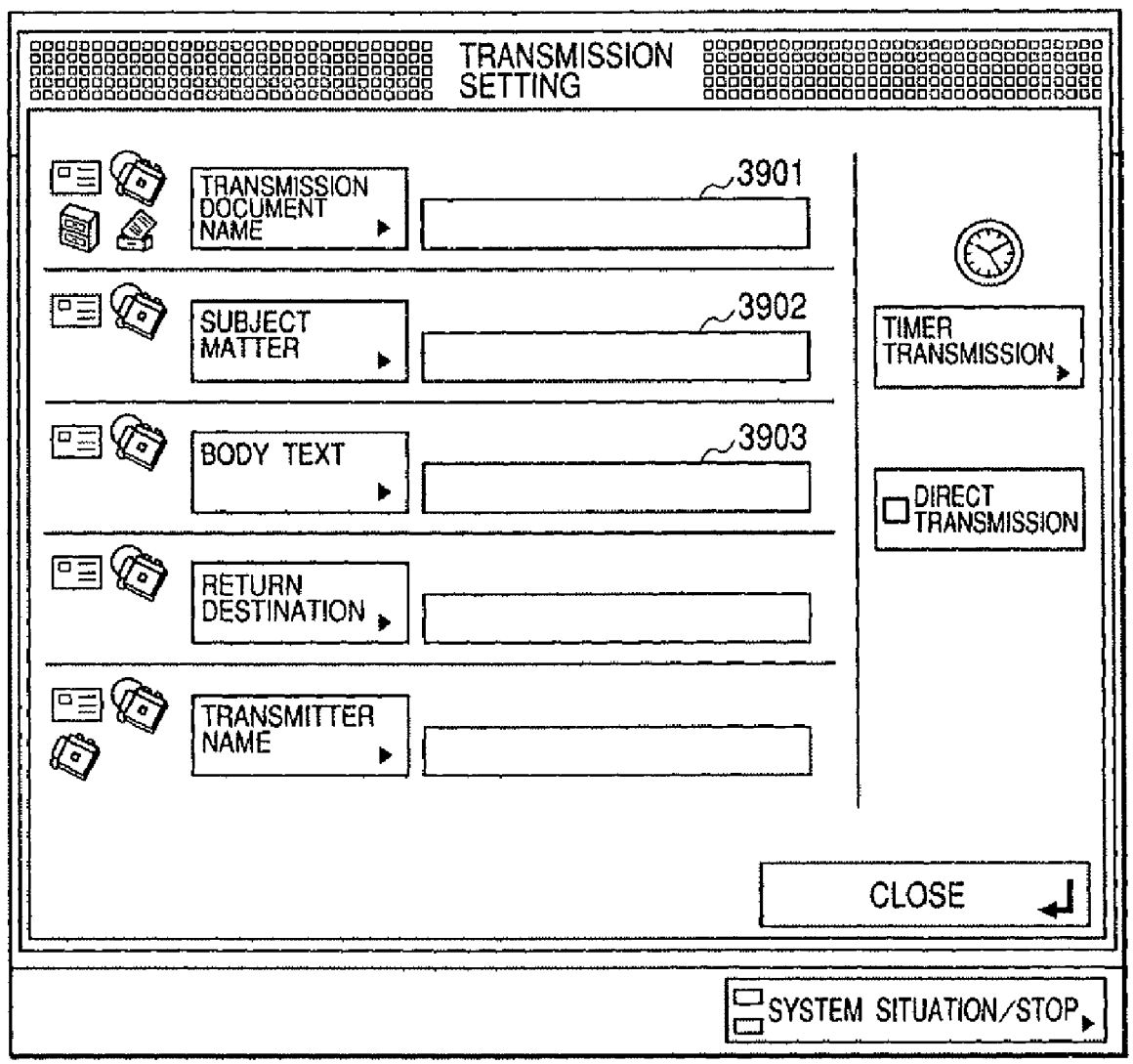
FIG. 20 is a pattern diagram showing an example of a transmission sub screen displayed on the LCD unit shown in FIG. 11.

Then, when the transmission setting button 3811 is depressed, a transmission setting screen shown in FIG. 20 is displayed. On the transmission setting screen, when a transmission document name input area 3901, a subject matter input area 3902, or a body text input area 3902 is depressed, a full keyboard is displayed, whereby necessary data can be input.

<Box Screen>

Figure 21:
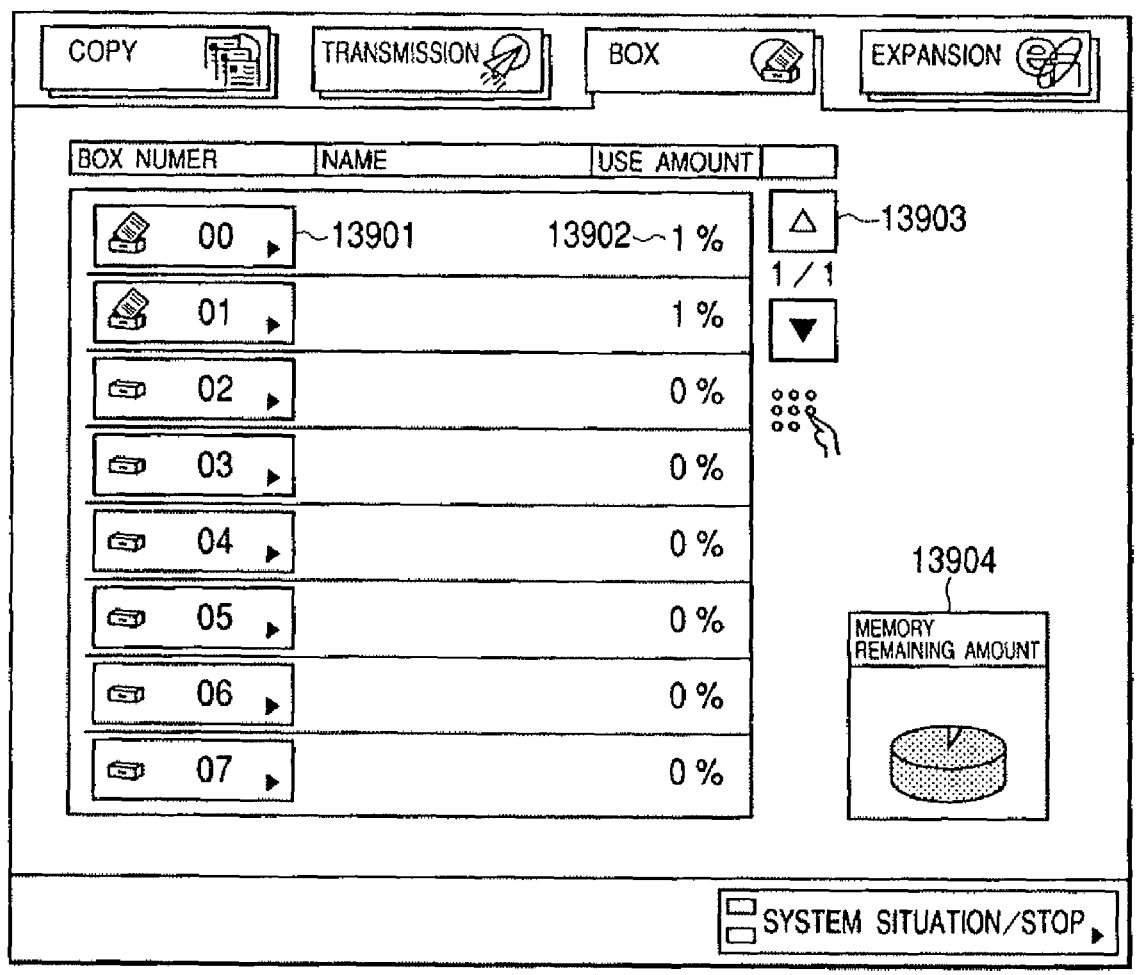
FIG. 21 is a pattern diagram showing an example of a box main screen displayed on the LCD unit shown in FIG. 11 when a box tab shown in FIG. 12 is selected.

FIG. 21 is a pattern diagram showing an example of the box main screen displayed on the LCD unit 3002 shown in FIG. 11 when the box tab 3103 shown in FIG. 12 is selected. On the box main screen, the document read from the scanner (reader unit 200), the document transmitted from the PC's 180 and 190, and the document received through a not-shown facsimile unit can be stored in the memory, whereby the user can print and transmit the document stored in the box at an arbitrary timing.

The box main screen shown in FIG. 21 includes a box number button 13901, a box information display area 13902, a box display scroll button 13903, a memory remaining amount display area 13904, and the like.

When the box number button 13901 corresponding to an arbitrary box number is depressed, a box content display screen (FIG. 22) concerning the box selected on the screen shown in FIG. 21 is displayed, whereby the content of the box selected on the screen shown in FIG. 21 is displayed.

Figure 22:
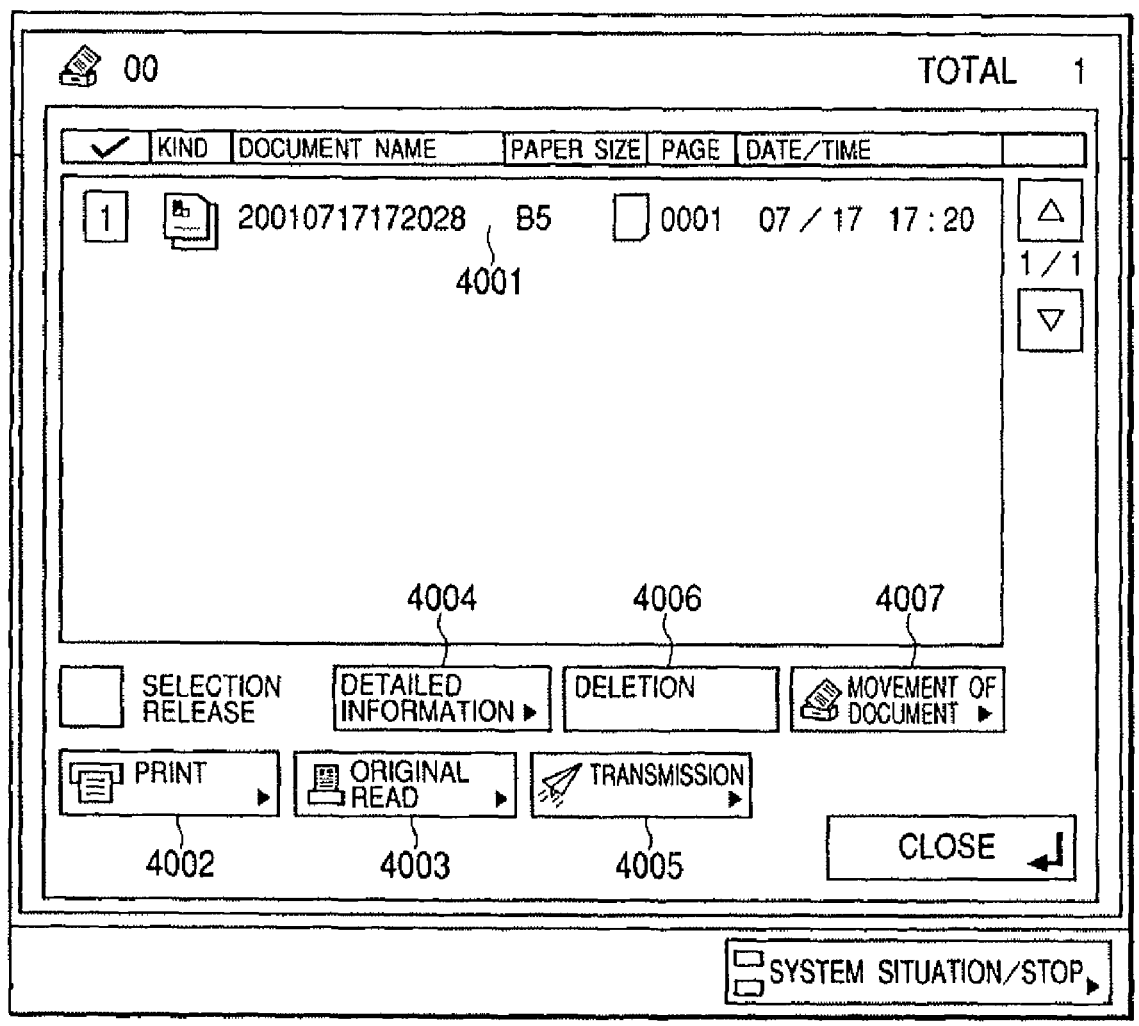
FIG. 22 is a pattern diagram showing an example of a box content display screen displayed on the LCD unit shown in FIG. 11 when a box number button shown in FIG. 21 is depressed.

FIG. 22 is a pattern diagram showing an example of the box content display screen displayed on the LCD unit 3002 shown in FIG. 11 when the box number button 13901 shown in FIG. 21 is depressed.

One or plural documents (jobs) can be stored in the box (that is, maximally 100 jobs can be stored). When the plural jobs (plural series of original data) are stored in the box, the stored jobs of the number capable of being displayed on a display area are displayed (4001). In such a state, when the display of the document is touched by the user, the document displayed at the touched position is selected (4001). Incidentally, it should be noted that FIG. 22 shows the state that the one job is stored in the box selected on the screen shown in FIG. 21.

That is, through the screen shown in FIG. 22, at least one job stored in the box (box selected in FIG. 21) is selectable by the user (maximally 100 jobs are selectable). Moreover, through the screen shown in FIG. 22, an instruction to display the detailed information concerning the selected job, an instruction to delete the selected job, an instruction to move the selected document, an instruction to print the selected job, and an instruction to transmit the selected job are acceptable from the user. Furthermore, an instruction to store a new job in this box is acceptable from the user.

In such a state, when a detailed information button 4004 is depressed, detailed document contents which include a reception number to the box, a reception time, a kind of document, a document name, a user name, the number of pages, the number of copies, a resolution, a size of the document, and the like are displayed.

Moreover, when a delete button 4006 is depressed, the selected document is deleted from the box (in the HD of the own apparatus), and, when a document movement button 4007 is depressed, the selected document can be moved to other box or copied.

Figure 23:
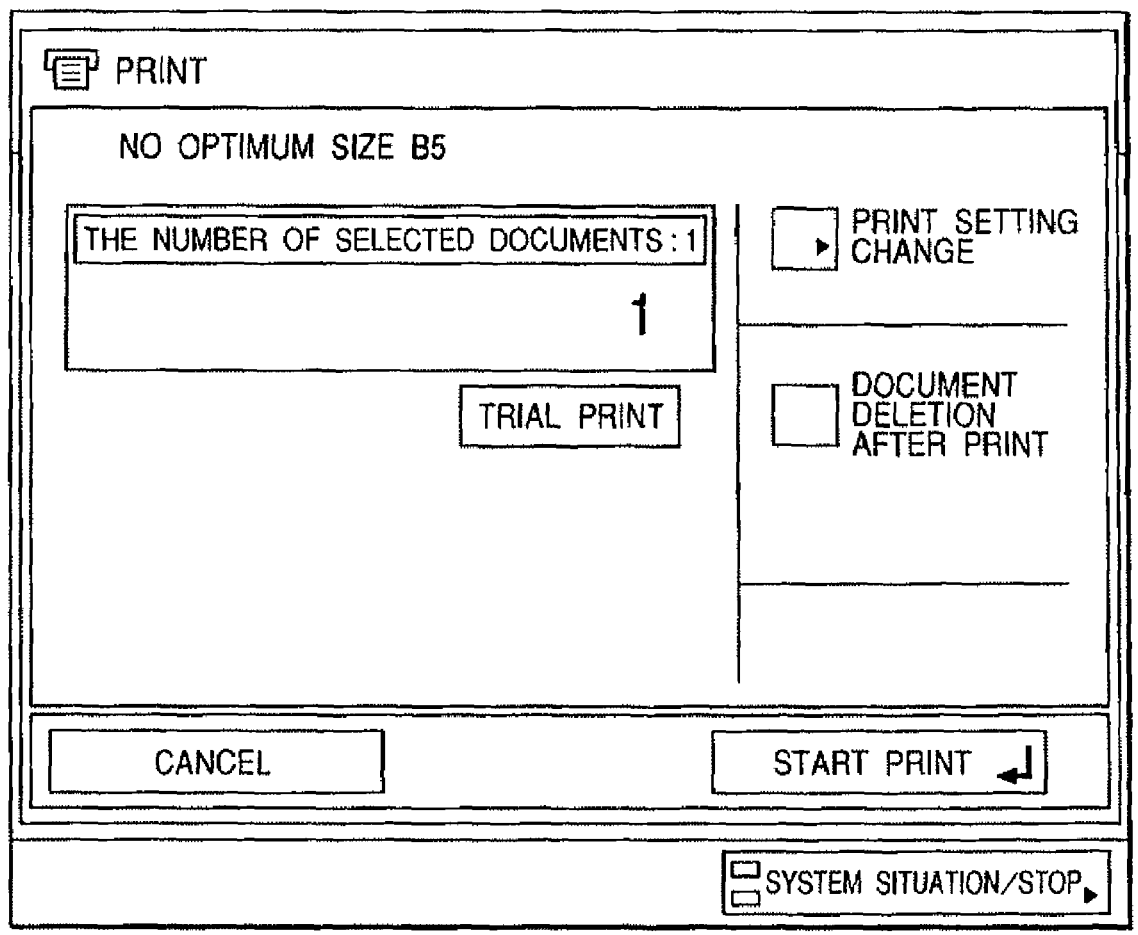
FIG. 23 is a pattern diagram showing an example of an in-box document print sub screen displayed on the LCD unit shown in FIG. 11.

Furthermore, when a print button 4002 is depressed, a box print screen shown in FIG. 23 is displayed, whereby the selected document can be printed.

Figure 24:
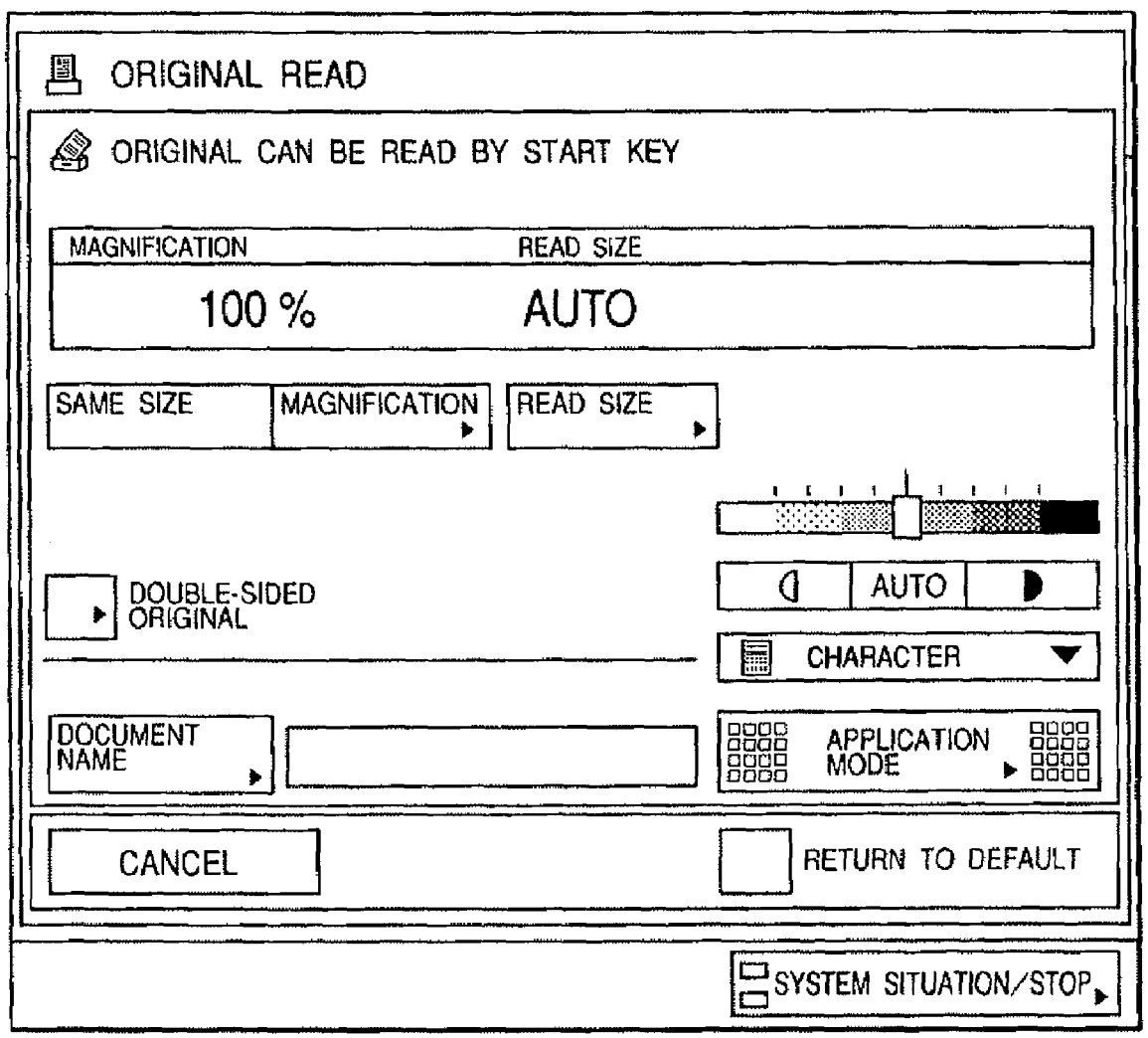
FIG. 24 is a pattern diagram showing an example of an in-box document read sub screen displayed on the LCD unit shown in FIG. 11.

Furthermore, when an original read button 4003 is depressed, a box original read screen shown in FIG. 24 is displayed, whereby a document can be added to the displayed box (i.e., the box which has been selected on the screen shown in FIG. 21 and of which the contents are displayed on the screen shown in FIG. 22).

Figure 25:
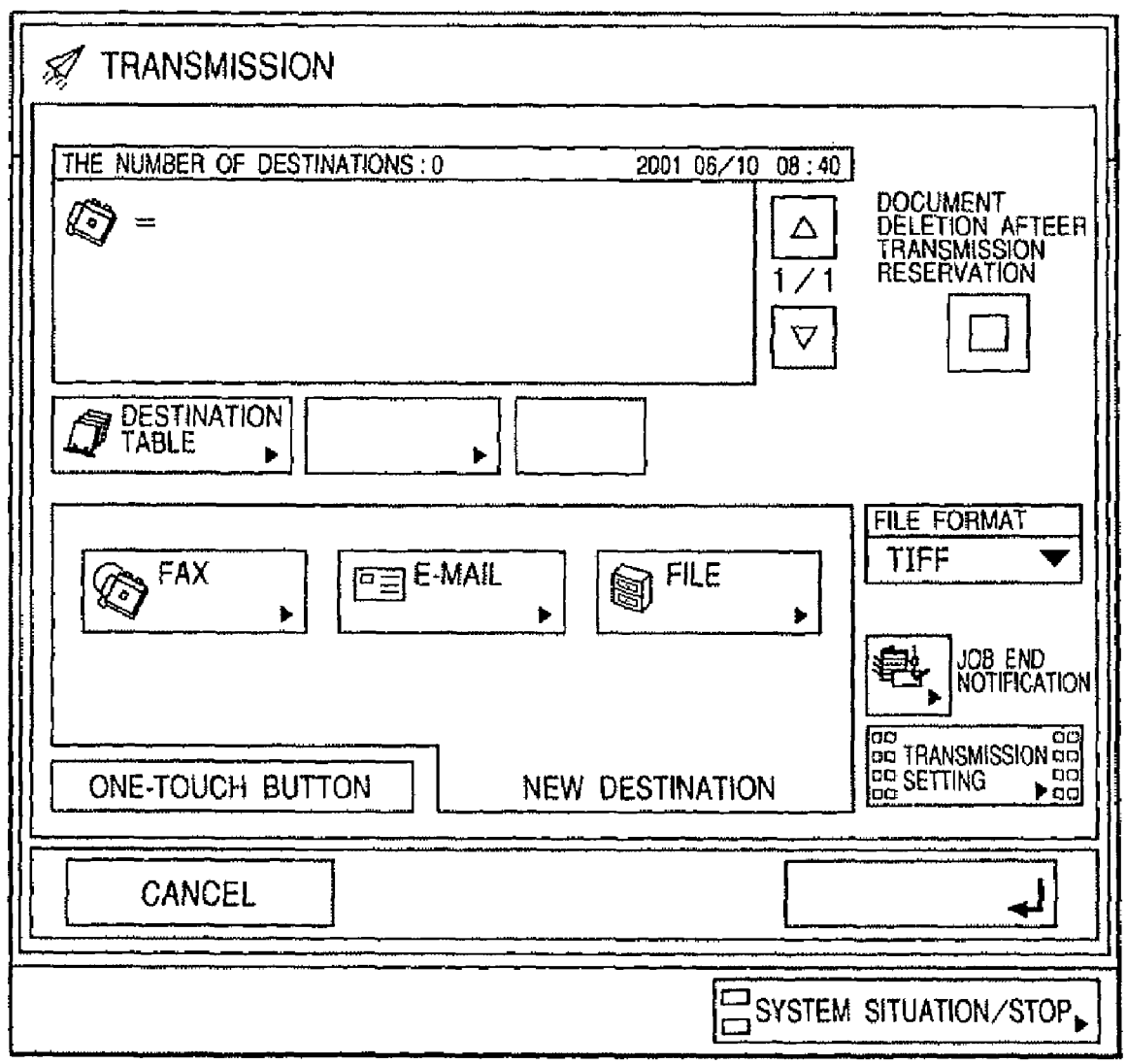
FIG. 25 is a pattern diagram showing an example of an in-box document transmission sub screen displayed on the LCD unit shown in FIG. 11.

Furthermore, when a transmission button 4005 is depressed, a box transmission screen shown in FIG. 25 is displayed, whereby the document selected on the screen shown in FIG. 22 can be transmitted.

<Explanation of Counter Upper Limit Value Setting Process>

Hereinafter, a counter upper limit value setting process in the image processing apparatus according to the first embodiment of the present invention will be explained with reference to FIGS. 26 to 30.

Figure 26:
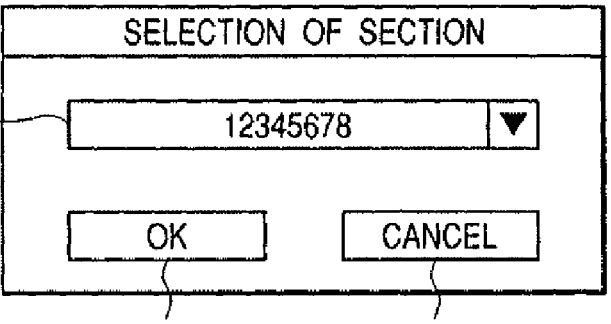
FIG. 26 is a pattern diagram showing an example of a section selection screen displayed on the LCD unit shown in FIG. 11 when a not-shown upper limit setting button is depressed in an administrator mode.

FIG. 26 is a pattern diagram showing an example of the section selection screen displayed on the LCD unit 3002 shown in FIG. 11 when a not-shown upper limit setting button is depressed in an administrator mode. Here, it should be noted that the upper limit value can be set from the PC's 180 and 190, and the like. In such a case, the section selection screen is displayed on the PC's 180 and 190. Further, when the section selection screen is displayed on the PC, it is structured to be able to perform data communication between the image processing apparatus and the PC, and thus to cause the image processing apparatus to perform the display on the PC side (including display control of a later-described counter information setting screen shown in FIG. 27 and following figures) and perform the control according to an instruction input from the PC side (including later-described upper limit value setting), through exchange of necessary information and commands.

In FIG. 26, numeral 2601 denotes a section ID selection display portion. By pointing out the right end of the section ID selection display portion 2601, a list of registered administration section ID's (user ID's) is displayed, whereby the administration section for setting the upper limit value of the counter can be selected from the displayed list. Incidentally, when a user (administrator) intends to select an administration section not included in the section ID list, the user can input by using the numeric keys 3004 the section ID (user ID) of the administration section to which the user intends to set the upper limit value, in the state that the section ID selection display portion 2601 is being selected.

Figure 27:
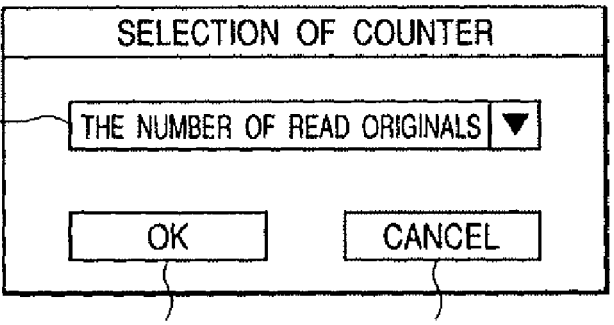
FIG. 27 is a pattern diagram showing an example of a counter selection screen displayed on the LCD unit shown in FIG. 11 when an OK button on the section selection screen shown in FIG. 26 is depressed.

Numeral 2602 denotes an OK button which is depressed to display a counter selection screen shown in FIG. 27. Numeral 2603 denotes a cancel button which is depressed to end the section selection screen.

FIG. 27 is the pattern diagram showing an example of the counter selection screen displayed on the LCD unit 3002 shown in FIG. 11 when the OK button 2602 on the section selection screen shown in FIG. 26 is depressed. Incidentally, it should be noted that, when the upper limit value is set from the PC's 180 and 190, the counter selection screen is displayed on the monitors of these PC's.

In FIG. 27, numeral 2701 denotes a counter selection display portion. By pointing out the right end of the counter selection display portion 2701, kinds of counters ("the number of read originals", "the number of images output by the own apparatus", "the number of outside-transmitted images", and "the number of externally received output images" in the present embodiment), whereby the counter for setting the counter upper limit value can be selected by the user (administrator).

Figure 28:
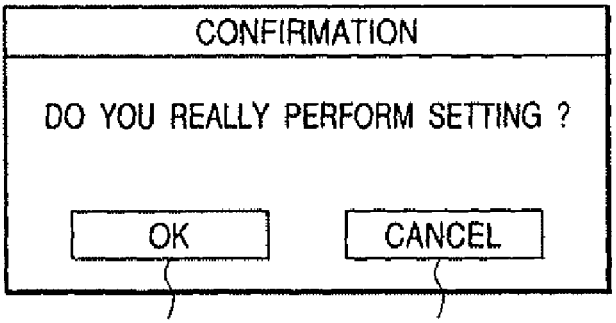
FIG. 28 is a pattern diagram showing an example of a confirmation screen displayed on the LCD unit shown in FIG. 11 when an OK button on the counter selection screen shown in FIG. 27 is depressed.

Numeral 2702 denotes an OK button which is depressed to display a confirmation screen shown in FIG. 28. Numeral 2703 denotes a cancel button which is depressed to end the counter selection screen.

FIG. 28 is the pattern diagram showing an example of the confirmation screen displayed on the LCD unit 3002 shown in FIG. 11 when the OK button 2702 on the counter selection screen shown in FIG. 27 is depressed. Incidentally, it should be noted that, when the upper limit value is set from the PC's 180 and 190, the confirmation screen is displayed on the monitors of these PC's.

Figure 29:
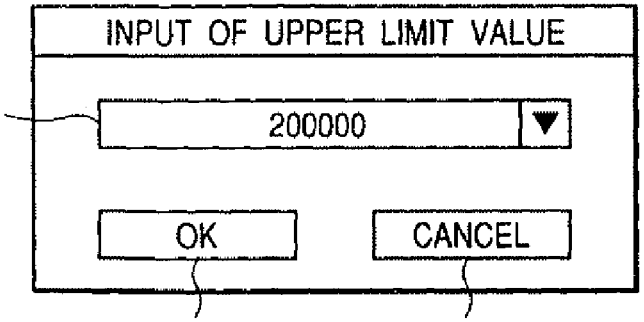
FIG. 29 is a pattern diagram showing an example of an upper limit value input screen displayed on the LCD unit shown in FIG. 11 when an OK button on the confirmation screen shown in FIG. 28 is depressed.

In FIG. 28, numeral 2801 denotes an OK button which is depressed to display an upper limit value input screen shown in FIG. 29. Numeral 2802 denotes a cancel button which is depressed to end the confirmation screen.

FIG. 29 is the pattern diagram showing an example of the upper limit value input screen displayed on the LCD unit 3002 shown in FIG. 11 when the OK button 2801 on the confirmation screen shown in FIG. 28 is depressed. Incidentally, it should be noted that, when the upper limit value is set from the PC's 180 and 190, the upper limit value input screen is displayed on the monitors of these PC's.

In FIG. 29, numeral 2901 denotes a counter upper limit value setting portion. After the counter upper limit value setting portion 2901 was selected, the upper limit value of the counter can be decided from the numeric keys 3004 of the operation unit 150. Incidentally, it should be noted that the numeric values set in the counter upper limit value setting portion 2901 can be input by using the numeric keys 3004 or the like of the operation unit 150.

Numeral 2902 denotes an OK button. When the OK button 2902 is depressed, the setting process based on the counter upper limit value input in the counter upper limit value setting portion 2901 is performed. Numeral 2903 denotes a cancel button which is depressed to end the upper limit value input screen. The control apparatus (CPU 112) performs control so that the administration, the storage, the update, the call, the display and the like based on the counter data set through FIGS. 27 to 29 can be performed. Moreover, the upper limit values corresponding to the counters of the kinds selected through the setting screens shown in FIGS. 27 to 29 can be set and registered. For example, in the present embodiment, the upper limit value can be independently set for each of the counter of "the number of read originals", the counter of "the number of images output by the own apparatus", the counter of "the number of outside-transmitted images", and the counter of "the number of externally received output images".

Figure 30:
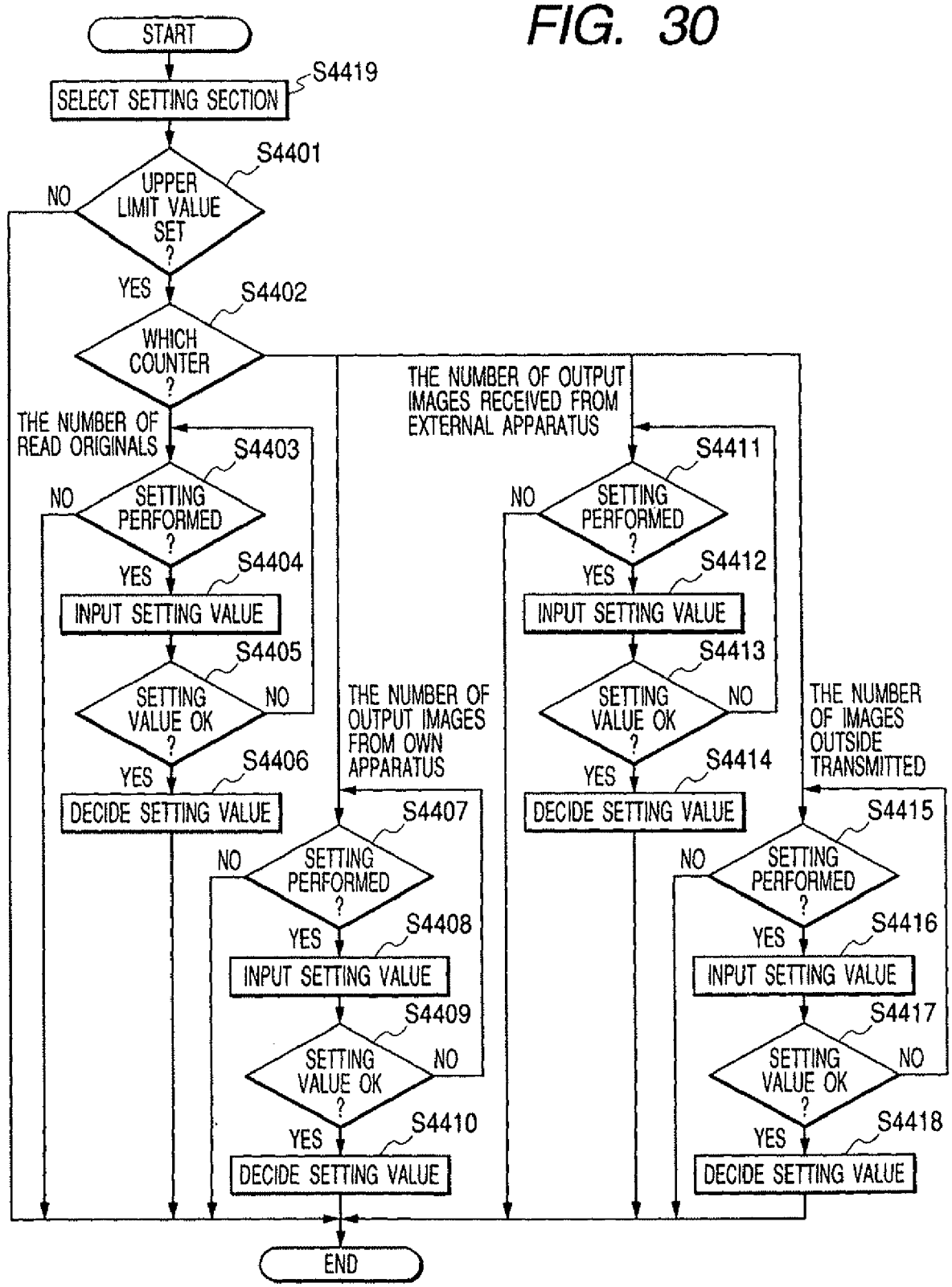
FIG. 30 is a flow chart showing an example of a first control process procedure by the image processing apparatus according to the present invention.

FIG. 30 is a flow chart showing an example of a first control process procedure by the image processing apparatus according to the present invention, and this flow chart corresponds to an example of the procedure of the counter upper limit value setting process according to the first embodiment. Here, it is assumed that the process in this flow chart is performed by the CPU 112 shown in FIG. 4 based on the program stored in the ROM 114 or other storage medium, and symbols S4401 to S4419 denote respective steps.

First, in the step S4419, the section to which the user intends to set the upper limit value is selected on the section ID selection display portion 2601 of the section selection screen shown in FIG. 26. Incidentally, before the process in the step S4419 is performed, the CPU 112 receives the user's instruction to set a section administration setting mode through the operation unit, and causes in response to the received instruction the operation unit to display a password request screen (not shown). Then, when it is confirmed that a proper password (e.g., an administrator code, or a section ID code itself) is input by the user through the password request screen, it is controlled to cause the operation unit to display the section selection screen shown in FIG. 26. Subsequently, it is judged in the step S4401 whether or not to set the upper limit value. For example, when it is detected that the cancel button 2603 shown in FIG. 26 is depressed by the user, it is judged that the upper limit value setting is not performed, and the process ends. On the contrary, when it is detected that the OK button 2602 shown in FIG. 26 is depressed, it is judged that the upper limit value setting is performed, and the flow advances to the step S4402 to change the section selection screen shown in FIG. 26 to the counter selection screen shown in FIG. 27.

In the step S4402, through the counter selection screen shown in FIG. 27, the user selects the upper limit value of any of the "the number of read originals" counter, "the number of images output by the own apparatus" counter, "the number of outside-transmitted images" counter and "the number of externally received output images" counter (the counter selection display portion 2701, and the OK button 2702). Incidentally, on the counter selection display portion 2701 shown in FIG. 27, the counter of the selected target can be sequentially changed in response to the sequential depression of a toggle key provided at the right of the display area. At a time when the OK button 2702 on the counter selection screen shown in FIG. 27 is depressed by the user, it is judged by the CPU 112 that the counter being selected in the counter selection display portion 2701 is the counter being the target to which the upper limit value is set.

When the upper limit value of the "the number of read originals" counter is selected and designated by the user through the counter selection screen shown in FIG. 27, the flow advances to the step S4403 to display the confirmation screen shown in FIG. 28 on the operation unit, whereby it is confirmed by the user whether or not the setting is really performed. When the setting is not performed (when it is detected that the cancel button 2802 shown in FIG. 28 is depressed), the process ends as it is. On one hand, when the setting is performed (when it is detected that the OK button 2801 shown in FIG. 28 is depressed), the flow advances to the step S4404 to change the operation screen shown in FIG. 28 to the operation screen shown in FIG. 29.

In the step S4404, the upper limit value (i.e., the setting value of the upper limit value of the number of the read originals) is actually input by the user with use of the numeric keys of the operation unit shown in FIG. 29, whereby the value of the counter upper limit value setting portion 2901 is set. Then, in response to the depression of the OK key 2902, when any problem does not occur in the input value (YES in the step S4405), the value of the counter upper limit value setting portion 2901 shown in FIG. 29 is decided as the upper limit value corresponding to the "the number of read originals" counter (scanner counter) selected on the operation screen shown in FIG. 27 (S4406). On the contrary, when a problem occurs in the input value (NO in the step S4405), the flow returns to the step S4403 so that the setting is again performed by the user.

On one hand, in the step S4402, when the upper limit value of the "the number of images output by the own apparatus" counter is selected and designated by the user through the counter selection screen shown in FIG. 27, the flow advances to the step S4407 to display the confirmation screen shown in FIG. 28 on the operation unit, whereby it is confirmed by the user whether or not the setting is really performed. Then, when the setting is not performed (when it is detected that the cancel button 2802 shown in FIG. 28 is depressed), the process ends as it is. On the contrary, when the setting is performed (when it is detected that the OK button 2801 shown in FIG. 28 is depressed), the flow advances to the step S4408 to display the operation screen shown in FIG. 29.

In the step S4408, the counter upper limit value setting portion 2901 is selected, the upper limit value (i.e., the setting value of the upper limit value of the number of the images output by the own apparatus) is actually input by the user with use of the numeric keys 3004, and then the OK key 2902 is depressed. Then, in response to the depression of the OK key 2902, when any problem does not occur in the input value (YES in the step S4409), the value of the counter upper limit value setting portion 2901 shown in FIG. 29 is decided as the upper limit value corresponding to the "the number of images output by the own apparatus" counter (local print counter) selected on the operation screen shown in FIG. 27 (S4410). On the contrary, when a problem occurs in the input value (NO in the step S4409), the flow returns to the step S4407.

On one hand, in the step S4402, when the upper limit value of the "the number of externally received output images" counter is selected and designated by the user through the counter selection screen shown in FIG. 27, the flow advances to the step S4411 to display the confirmation screen shown in FIG. 28 on the operation unit, whereby it is confirmed by the user whether or not the setting is really performed. Then, when the setting is not performed (when it is detected that the cancel button 2802 shown in FIG. 28 is depressed), the process ends as it is. On the contrary, when the setting is performed (when it is detected that the OK button 2801 shown in FIG. 28 is depressed), the flow advances to the step S4412 to display the operation screen shown in FIG. 29.

In the step S4412, the counter upper limit value setting portion 2901 shown in FIG. 29 is selected, the upper limit value (i.e., the setting value of the upper limit value of the number of the externally received output images) is actually input by the user with use of the numeric keys 3004, and then the OK key 2902 is depressed. Then, in response to the depression of the OK key 2902, when any problem does not occur in the input value (YES in the step S4413), the value of the counter upper limit value setting portion 2901 shown in FIG. 29 is decided as the upper limit value corresponding to the "the number of externally received output images" counter (remote print counter) selected on the operation screen shown in FIG. 27 (S4414). On the contrary, when a problem occurs in the input value (NO in the step S4413), the flow returns to the step S4411.

On one hand, in the step S4402, when the upper limit value of the "the number of outside-transmitted images" counter is selected and designated by the user through the counter selection screen shown in FIG. 27, the flow advances to the step S4415 to display the confirmation screen shown in FIG. 28 on the operation unit, whereby it is confirmed by the user whether or not the setting is really performed. Then, when the setting is not performed (when it is detected that the cancel button 2802 shown in FIG. 28 is depressed), the process ends as it is. On the contrary, when the setting is performed (when it is detected that the OK button 2801 shown in FIG. 28 is depressed), the flow advances to the step S4416 to display the operation screen shown in FIG. 29.

In the step S4416, the counter upper limit value setting portion 2901 shown in FIG. 29 is selected, the upper limit value (i.e., the setting value of the upper limit value of the number of the outside-transmitted images) is actually input by the user with use of the numeric keys 3004, and then the OK key 2902 is depressed. Then, in response to the depression of the OK key 2902, when any problem does not occur in the input value (YES in the step S4417), the value of the counter upper limit value setting portion 2901 shown in FIG. 29 is decided as the upper limit value corresponding to the "the number of outside-transmitted images" counter (transmission counter) selected on the operation screen shown in FIG. 27 (S4418). On the contrary, when a problem occurs in the input value (NO in the step S4417), the flow returns to the step S4415. Incidentally, it is controlled by the CPU 112 that the upper limit values decided in the steps S4406, S4410, S4414 and S4418 are stored in a nonvolatile memory of the SRAM 136 or the HD 162 shown in FIG. 4. In the memory, the upper limit value of each counter is correlated with the counter in question and can be called and displayed as needed. A medium which stores the upper limit values may be a storage medium of any type capable of holding these values even if a power supply is turned off. Moreover, such information is controlled so that it can be returned to a transmission source PC (personal computer) in response to an instruction command from the transmission source PC.

The above processes of registering the various counter information and the like to be performed through the operation screens respectively shown in FIGS. 26 to 29 are set independently of each section (i.e., each section ID code), the process of selecting the kind of counter to which the setting is performed and the process of setting the upper limit value of the selected counter can be performed in regard to each section ID, and the obtained values can be called (captured) as needed under the control of the CPU 112.

<Explanation of Counter Display Process>

Hereinafter, the counter display process by the image processing apparatus according to the first embodiment of the present invention will be explained with reference to FIGS. 31 to 40.

Figure 31:
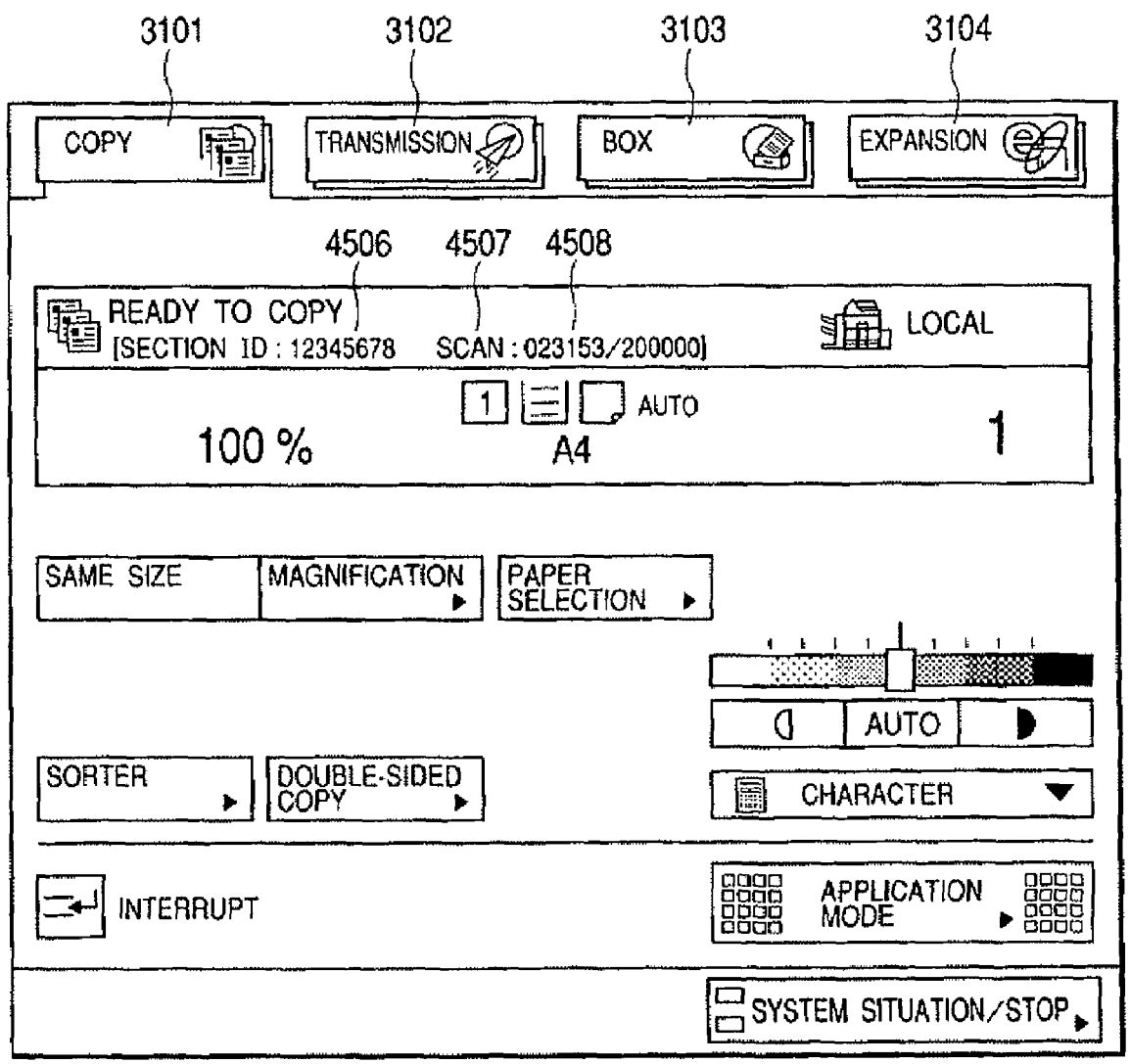
FIG. 31 is a pattern diagram showing an example of the copy main screen on which a counter is displayed, in the image processing apparatus according to the first embodiment of the present invention.

FIG. 31 is a pattern diagram showing an example of the copy main screen on which the counter is displayed, in the image processing apparatus according to the first embodiment of the present invention. As a pre-step of causing the operation unit 150 to display the copy main screen, the CPU 112 causes the operation unit to display a request screen to request the user whether to set a magnetic card or an IC card to the card reader 155 capable of reading the information of the card or to input an ID code through the ID key of the operation unit. Then, in response to that the magnetic card or the IC card is set to the card reader 155, the CPU 112 reads ID code information from the data storage medium, and performs a certification process to judge whether the read ID is a correct ID. On one hand, when the ID code is input through the ID key and the numeric keys of the operation unit, the CPU 112 performs the certification process to judge whether the read ID is a correct ID. After then, according as it is judged in the certification process that the correct ID code (section ID) has been input, the CPU 112 permits the operation unit to display the operation screen shown in FIG. 31. On the contrary, according as it is judged in the certification process that the input ID code is an incorrect ID code, the CPU 112 inhibits the operation unit from displaying the operation screen shown in FIG. 31. Thus, the CPU 112 permits to display or inhibits from displaying the operation screen, whereby it is controlled whether to permit or inhibit the operation in the image processing apparatus. Incidentally, as above, although the operation example in the mode of determining and controlling the use permission/inhibition of the image processing apparatus based on the certified result of the ID code is mainly explained in the present embodiment, the present invention is not limited to this. That is, the image processing apparatus also includes a mode of permitting the use of the image processing apparatus without requesting the input of the ID code. Therefore, it is possible for the user to select, as an administrator's setting item, in which of these two modes the image processing apparatus should be operated.

In FIG. 31, numeral 4501 denotes a section number. That is, a section number stored in the magnetic card or the IC card and read by the card reader 155 shown in FIG. 1, a section number input through the ID key 3005, or a section number corresponding to the user ID is displayed. Incidentally, it should be noted that the section number has been judged by the CPU 112 to be the correct ID code (section number).

Numeral 4507 denotes a discrimination symbol. The symbol 4507 represents that any of the counter of "the number of read originals", the counter of "the number of images output by the own apparatus", the counter of "the number of outside-transmitted images", and the counter of "the number of externally received output images" is currently displayed.

Incidentally, it is controlled by the CPU 112 to select and the display the counter which is closest to the upper limit value from among the counters that the remaining number is necessary in the counter information concerning the image processing mode being the selection target in the plural image processing modes (local copy mode, box (storage) mode, box (output) mode, print (transmission) mode, print (reception) mode, and transmission mode) of the image processing apparatus. That is, in the example of FIG. 31, the local copy mode is being selected, and the counter information corresponding to the "the number of read originals" counter concerning the scan process necessary in the selected local copy mode is displayed.

Numeral 4508 denotes a display portion of current value/upper limit value. That is, at this portion, the current user ID (section number), the current value of the counter being selected based on the setting mode, and the upper limit value of this counter are displayed. In the example of FIG. 31, "200000" is set as the upper limit value of the "the number of read originals" counter through the operation screens respectively shown in FIGS. 27 to 29. On one hand, it is notified to the user that the "23153" scan processes (corresponding to 23153 pages) have been performed up to now by the reader unit 200. Moreover, since the value "23153" does not exceed the upper limit value "200000", the operation unit is controlled by the CPU 112 to display a message "ready to copy" or the like to notify the user that the corresponding image processing mode (copy mode) can be executed.

In regard to the method of displaying the operation screen shown in FIG. 31, the operation screens respectively corresponding to the image processing modes are provided, and it is controlled by the CPU 112 to display the screens in a tab format so that the operation screen corresponding to the image processing mode selected by the user can be displayed on the operation unit. When the CPU 112 permits the operation unit 150 to display the operation screen based on the certification result of the section ID, it has been registered, by the operator (administrator) as default through a not-shown administrator mode screen, which operation screen corresponding to one of the plural image processing modes is used as the operation screen to be displayed first on the operation unit. Then, based on such registered information, the screen to be displayed after the ID certification process is determined. In the displayed example, the operation screen corresponding to the copy mode is displayed as the default. Then, for example, when the transmission tab 3102 on the screen is depressed by the operator, it is controlled in response to the depression to change the operation screen for the copy mode to the operation screen for the transmission mode. Moreover, when the box tab 3103 on the screen is depressed by the operator, it is controlled in response to the depression to change the operation screen to that for the box (storage) mode. Furthermore, when the expansion tab 3104 on the screen is depressed by the operator, it is controlled in response to the depression to display the operation screen for the image processing mode previously set as an expansion mode. Moreover, for example, when it is intended to display the operation screen for the transmission mode, it is controlled by the CPU 112 to display on this screen also the necessary information such as the counter information (scanner counter information and outside-transmission number counter information) concerning the process (scan process and transmission process) necessary in the transmission mode. Furthermore, when it is intended to display the operation screen for the box (storage) mode, it is controlled by the CPU 112 to display on this screen also the necessary information such as the counter information (scanner counter information, etc.) concerning the process (including scan process) necessary in the box (storage) mode. Moreover, when it is intended to display the operation screen for the box (output) mode, it is controlled by the CPU 112 to display on this screen also the necessary information such as the counter information (print counter information, etc.) concerning the process (including print process) necessary in the box (output) mode.

Figure 32:
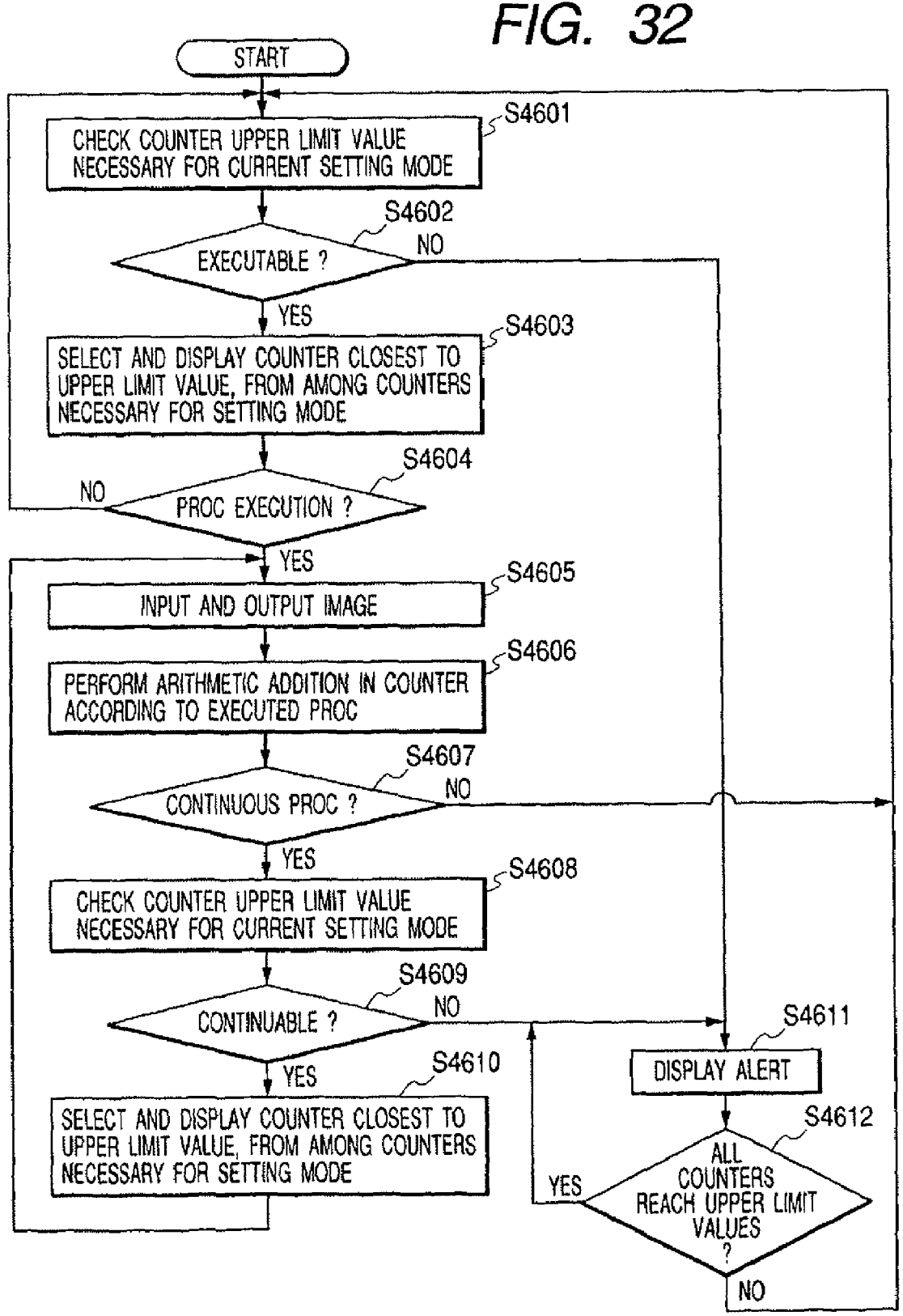
FIG. 32 is a flow chart showing an example of a second control process procedure by the image processing apparatus according to the present invention.

FIG. 32 is a flow chart showing an example of a second control process procedure by the image processing apparatus according to the present invention, and this flow chart corresponds to the example of the counter display process procedure according to the first embodiment. Here, it is assumed that the process in this flow chart is performed by the CPU 112 shown in FIG. 4 based on the program stored in the ROM 114 or other storage medium, and symbols S4601 to S4612 denote respective steps.

First, in the step S4601, the upper limit value of the counter that the remaining number is necessary for the current setting mode is checked. Incidentally, before the process in the step S4601 is performed, it is judged whether or not the ID code is input by the user through the card reader 155 or the ID key of the operation unit, and, according as it is judged that the ID code is input, it is further judged whether or not the input ID code is the correct ID code. Here, it should be noted that these judgments are performed in a not-shown step. Then, when it is judged that the input ID code is correct and thus the operation unit is permitted to display the operation screen corresponding to the judged ID code (section code), the process in the step S4601 is performed. Incidentally, each counter information is administrated by the administration apparatus 171 in regard to each user ID (section ID in this case) on the basis of the registered information of the operation screens shown in FIGS. 26 to 29, the log information of the process actually performed by the apparatus, and the like. Thus, it is possible to read each counter value and count up the read values in response to the instruction from the CPU 112. In any case, the details of comparison between the setting mode and the counter will be shown in FIG. 33.

As shown in FIG. 33, to execute the local copy mode (copy mode) which is necessary for the read process by the reader unit 200 of the own apparatus and the output process by the printer unit 300 of the own apparatus, it has only to satisfy the condition that the "the number of read originals" counter (shown as a read original number counter in FIG. 33) and the "the number of images output by the own apparatus" counter (shown as an own apparatus image output number counter in FIG. 33) do not reach the upper limit values. Moreover, to execute the box (storage) mode that the image (also called the series of original data, and the job) read by the own apparatus is stored in the memory (box in HD) provided in the own apparatus, it has only to satisfy the condition that the "the number of read originals" counter does not reach the upper limit value. Furthermore, to execute the box (output) mode that the image stored in the memory (box in HD) provided in the own apparatus is output by the printer unit of the own apparatus, it has only to satisfy the condition that the "the number of images output by the own apparatus" counter does not reach the upper limit value. Moreover, to execute the print (transmission) mode that the image read by the own apparatus is transmitted to the external apparatus, it has only to satisfy the condition that the "the number of read originals" counter and the "the number of images output by the own apparatus" counter do not reach the upper limit values. Here, it is assumed that the print (transmission) mode is the mode to transmit the job and then cause the communication partner to print out the transmitted job, and this mode is used in case of causing other image processing apparatus to print out the job read by the own apparatus. Furthermore, to execute the print (reception) mode that the image received from the external apparatus (e.g., a host computer, other image processing apparatus such as other image forming apparatus, other facsimile machine, or the like) is output by the own apparatus, it has only to satisfy the condition that the "the number of externally received output images" counter (shown as an externally received image output number counter in FIG. 33) does not reach the upper limit value. Moreover, to execute the transmission mode that the image received by the own apparatus is transmitted to the external apparatus (e.g., a host computer, other image processing apparatus such as other image forming apparatus, other facsimile machine, or the like), it has only to satisfy the condition that the "the number of read originals" counter and the "the number of outside-transmitted images" counter (shown as an outside transmitted image number counter in FIG. 33) do not reach the upper limit values. Here, it is assumed that the transmission mode is the mode to simply transmit the job to the communication partner irrespective of whether or not to cause the communication partner to print out the transmitted job. That is, as to whether or not to print the job on the communication partner side is outside the range of judgment and control by the own apparatus. For example, the process to perform the file transmission to the host computer, the process to transmit the electronic mail to a desired electronic mail address, and the like are included in the transmission mode. As above, it is controlled by the CPU 112 that relation, restriction and rule are determined in regard to the plural modes of the image processing apparatus, the plural processes by the image processing apparatus, and the counter information, whereby the appropriate administration can be performed.

Incidentally, it is assumed that each of the "the number of read originals" counter, the "the number of images output by the own apparatus" counter, the "the number of outside-transmitted images" counter, and the "the number of externally received output images" counter is stored in the administration apparatus 171 of FIG. 4 in regard to each user ID.

Figure 34:
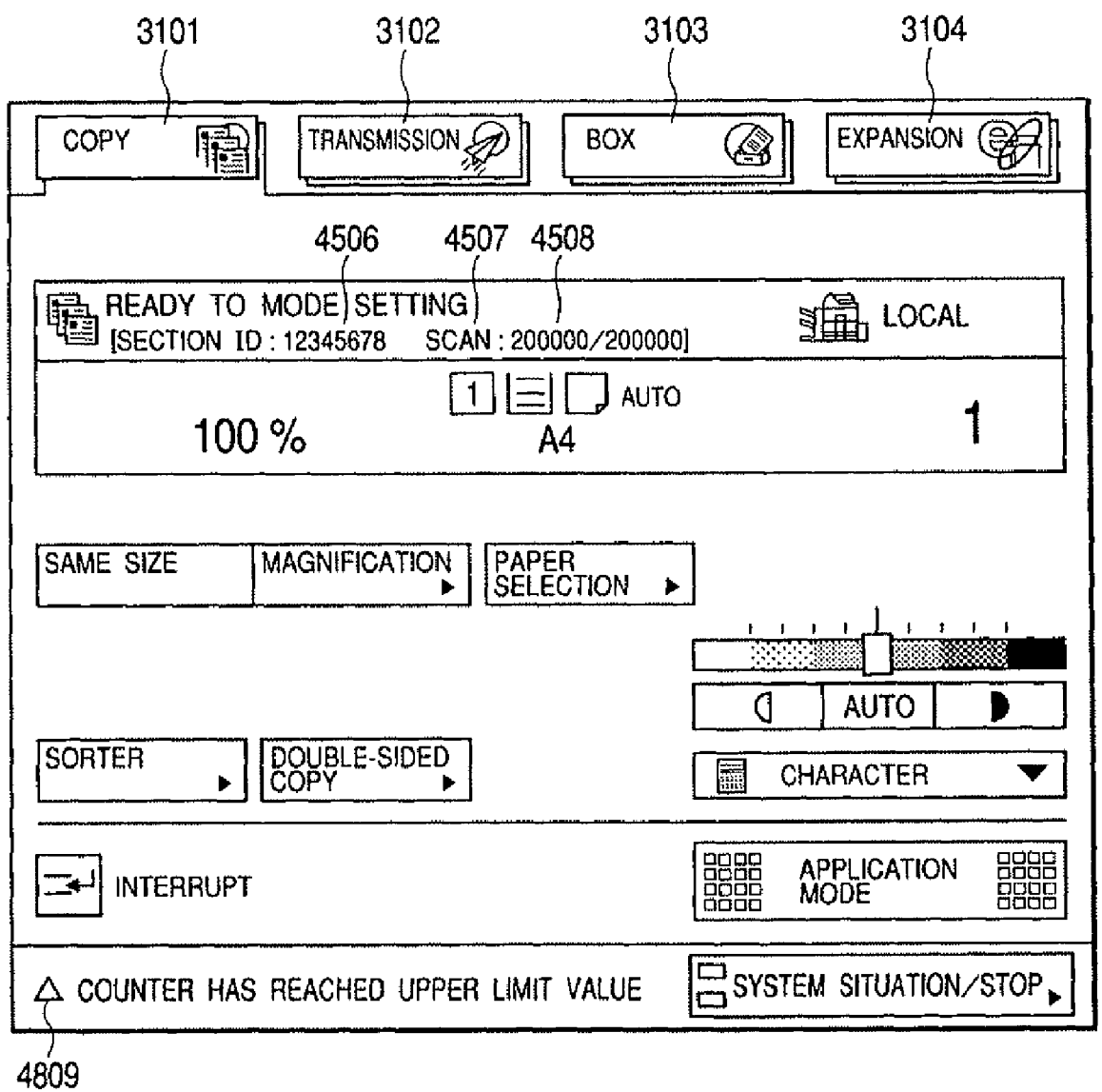
FIG. 34 is a pattern diagram showing an example of an operation unit screen displayed on the LCD unit shown in FIG. 11 when the counter reaches the upper limit value.

Thus, the upper limit value of the counter that the remaining number is necessary for the current user ID and the setting mode is checked in the step S4601. Then, when it is judged in the step S4602 that any of the counters that the remaining number is necessary in the current setting mode reaches the upper limit value and thus the process in the setting mode in question cannot be performed (executed), the flow advances to the step S4611 to notify with an alert the user of impossibility of the process. An example of the notification screen in this case is shown in FIG. 34. In FIG. 34, when it is displayed on a display portion 4808 that the counter reaches the upper limit value, then a message 4809 to represent the impossibility of the process is notified.

As above, the processes in the step S4601 to S4603 are performed at a predetermined timing when the operation screen is displayed on the operation unit 150. For example, when the power supply is turned on, when the correct section ID code is input and thus the default operation screen (e.g., copy screen as shown in FIGS. 33 and 34) is displayed, or when the operation screen of the image processing mode selected by the depression of the tab portion (tabs 3102, 3103 and 3104 as shown in FIG. 34) of the tab-form operation screen is displayed on the operation unit, the processes in the step S4601 to S4603 are performed.

In the example shown in FIG. 31, the selection target image processing mode (i.e., the image processing mode to be selected) is the copy mode, and it is judged by the CPU 112 based on the information from the administration apparatus that the total amount (23153 times) of the number of times of the scan processes by the reader unit 200 included as the process necessary for the copy mode (i.e., the number of original page processes) does not exceed the upper limit value (200000) of the scanner counter allocated to the section ID code. Besides, it is controlled by the CPU 112 to permit to execute the copy mode under the section ID code, and it is also controlled to be able to accept the operation on the setting screen for the copy mode and the instruction to execute the copy mode by the user. On one hand, in the example shown in FIG. 34, the selection target image processing mode is the copy mode, and it is judged by the CPU 112 based on the information from the administration apparatus that the total amount of the number of times of the scan processes by the reader unit 200 included as the process necessary for the copy mode (i.e., the number of original page processes) has reached the upper limit value (200000) of the scanner counter allocated to the section ID code. Besides, it is controlled by the CPU 112 to inhibit from executing the copy mode under the section ID code, and it is also controlled to be unable to accept the operation on the setting screen for the copy mode and the instruction to execute the copy mode by the user. For example, it is controlled to disable the key input by not responding to the depression of key buttons by the user on the operation screen.

Moreover, in FIG. 34, although the total amount of the number of times of the scan processes contravenes the restriction of the upper limit value, the total amount of the number of times of the print processes does not reach the upper limit value (upper limit value of "the number of images output by the own apparatus" counter) of the print counter allocated to the section ID code. In such a case, for example, when the box (output) mode is selected by the user's depression of the box tab 3103 on the operation screen shown in FIG. 34, the box (output) mode is judged as the mode that the scan process by the own apparatus is unnecessary, the CPU 112 changes the operation screen shown in FIG. 34 to the setting screen for the box mode, notifies the user that the process can be performed, and enables to accept the operation for the box (output) mode on the operation screen and the execution instruction of the box (output) mode under the section ID code (section ID input in the pre-step of S4601). However, since the box (storage) mode is the mode that the scan process is necessary, it is controlled by the CPU 112 to inhibit from executing the box (storage) mode under the section ID code. Besides, when the tab 3102 to select the transmission mode is depressed on the screen shown in FIG. 34, it is permitted to change the displayed contents to the setting screen for the transmission mode, but it is judged that the transmission mode is the mode that the scan process is necessary. Therefore, as well as the message 4809 shown in FIG. 34, a message to represent that the counter has reached the upper limit value is notified to the user, and it is inhibited from executing the transmission mode under the section ID code. Thus, it is controlled to be unable to accept the setting operation and the execution instruction for the transmission mode by the user under the section ID code.

Incidentally, the case where the counter has reached the upper limit value includes a case where the number of times of mode executions has reached the upper limit value, and a case where, although the number of times of mode executions does not yet reach the upper limit value at a time when the setting screen for the selection target operation mode is displayed, the sum of the number of input images and the total number of times of mode executions exceeds the upper limit value at a time when a numeric value for setting the number of images is input by the user on the operation screen permitted to be displayed. In the former case, for example, it is controlled to be able to maintain the inhibition state of the mode operation until the setting is changed to increase the upper limit value of the counter through the setting screens shown in FIGS. 26 to 29. In the latter case, it is controlled by the CPU 112 to release the inhibition state and permit the operation mode by changing the setting of the upper limit value and, and even if not changing the setting, by decreasing (by the user) the numeric value to set the number of output images to be within the rage not exceeding the current setting upper limit value.

Next, in the step S4612 of FIG. 32, when it is judged that all the counters have reached the respective upper limit values, the alert display in the step S4611 is repeated, so that other process cannot be performed until the upper limit value is changed or the current counted value is cleared.

On the contrary, when it is judged in the step S4612 that there is the counter which does not reach the upper limit value (i.e., NO in the step S4612), the flow returns to the step S4601 to check the upper limit value of the counter that the remaining number is necessary for the current setting mode, because the process can be still performed according to the setting mode.

Incidentally, when it is judged in the step S4602 that the process in the setting mode in question can be performed (executed), the flow advances to the step S4603 to select the counter closest to the upper limit value from among the counters that the remaining number is necessary for the current setting mode, and display the selected counter on the operation unit (FIG. 31).

In this state, when the process is not performed (NO in the step S4604), the flow returns to the step S4601. On the contrary, when the process is performed by, e.g., depressing the start key 3006 shown in FIG. 11 (YES in the step S4604), the flow advances to the step S4605 to input and output the image in the designated mode. Then, in the step S4606, the counter (i.e., the value of the counter) according to the process in question is arithmetically added (i.e., the counter in the administration apparatus 171 is counted up).

Next, it is judged in the step S4607 whether or not a continuous process is performed. In the continuous process, for example, plural number is set by using the numeric keys 3004 shown in FIG. 11, or plural originals are put on a not-shown feeder, whereby the images are continuously read and output. In any case, when it is judged that the continuous process is performed, in the step S4608, the upper limit value of the counter that the remaining number is necessary for the current setting mode is checked every time one process is performed. In this case, the procedure in the step S4608 is the same as that in the step S4601. As a result, when it is judged in the step S4609 that the mode being currently executed cannot be continued, the flow advances to the step S4611 to perform the alert display and interrupt the current process.

On the contrary, when it is judged in the step S4609 that the mode being currently executed can be further continued, the flow advances to the step S4610 to select the counter closest to the upper limit value from among the counters that the remaining number is necessary for the current setting mode, and display the selected counter on the operation unit, as well as the step S4603. Then, the flow returns to the step S4605 to perform next image input and output. After a series of the processes ended, when the currently executed job ends, it is judged in the step S4607 that the continuous process is not performed, and the flow returns to the step S4601.

Hereinafter, the counter display operation in the transmission process will be explained with reference to FIGS. 32 and 35 to 40.

FIGS. 35 to 38 are pattern diagrams showing an example of the operation screen for the transmission mode to be displayed on the LCD unit 3002 shown in FIG. 11. Hereinafter, the counter display operation in the transmission process will be explained with reference to the flow chart shown in FIG. 32.

Figure 35:
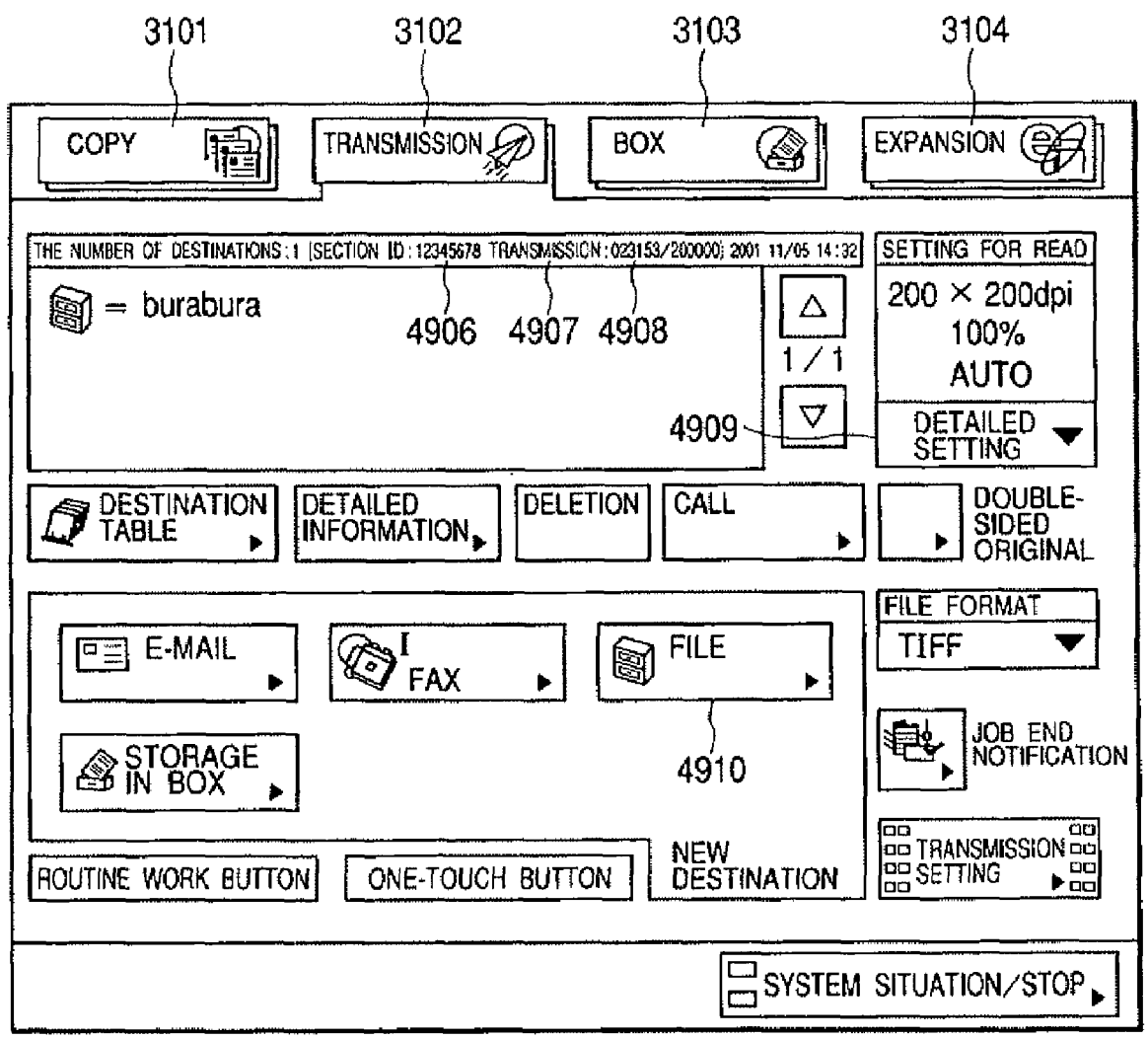
FIG. 35 is a pattern diagram showing an example of a transmission screen displayed on the LCD unit shown in FIG. 11.

First, the transmission tab 3102 shown in FIG. 35 is depressed to use the transmission function. For example, in response to the user's depression of the tab 3102 to select the transmission mode on the operation screen shown in FIG. 31 or 34, the CPU 112 changes the displayed screen on the operation unit to the operation screen shown in FIG. 35. Here, a case where the file transmission of the image (also called image data of job) read by a file button 4910 to the designated position will be explained by way of example.

Figure 36:
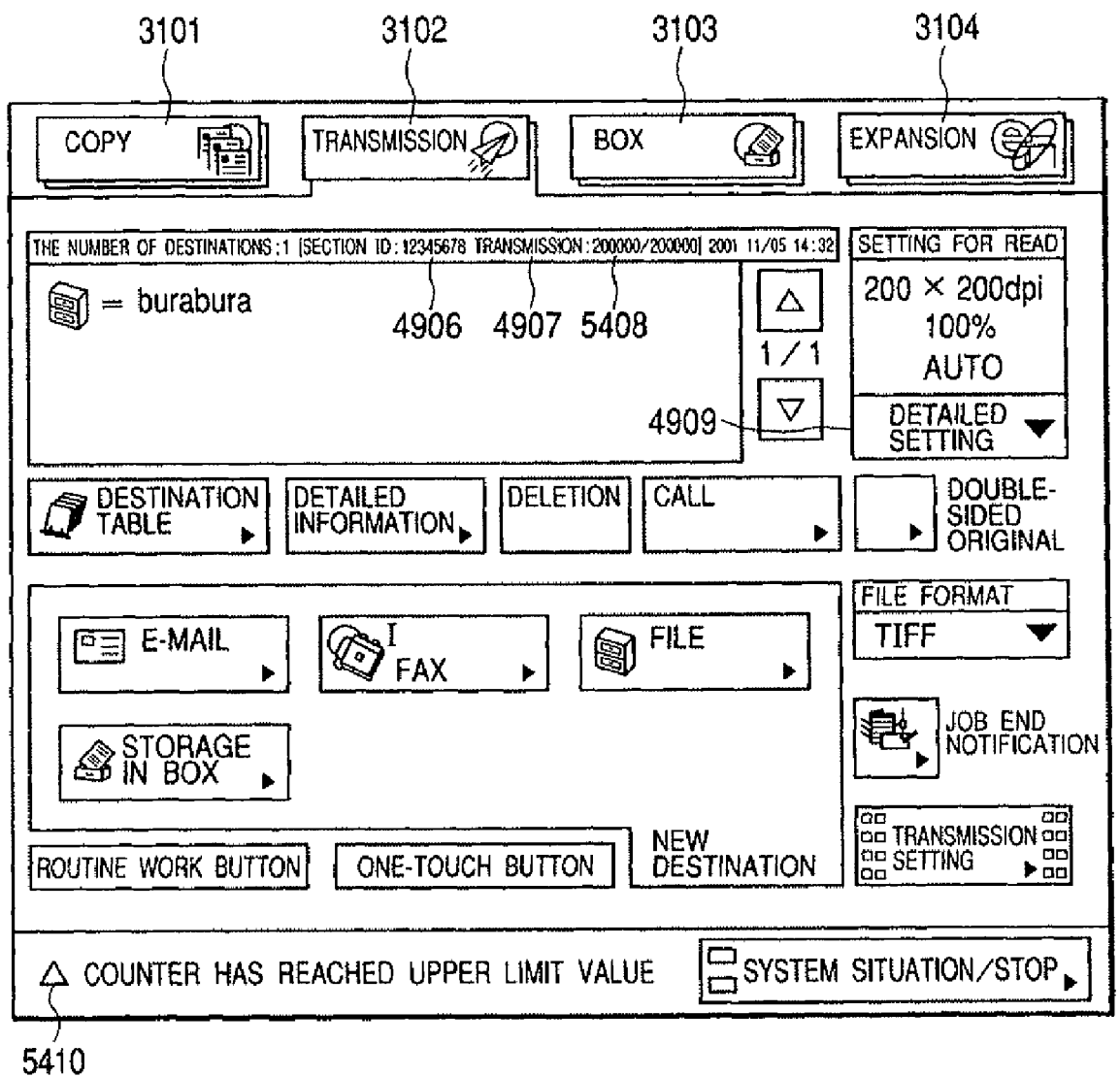
FIG. 36 is a pattern diagram showing an example of a screen when the counter reaches the upper limit value on the transmission screen displayed on the LCD unit shown in FIG. 11.

Here, in the step S4601 of FIG. 32, the upper limit value of the counter for the transmission process is checked. As shown by the administration table of FIG. 33, the read process and the transmission process are necessary for the transmission process, and it is necessary that the remaining number exits in the "the number of read originals" counter and the "the number of outside-transmitted images" counter. In this case, as the condition to permit the transmission process, it is necessary that the total amount of the original pages already processed up to now is less than the upper limit value of the counter allocated to the target section ID in regard to both the "the number of read originals" counter and the "the number of outside-transmitted images" counter. In this example, it is assumed that the latter counter is in the state closer to the upper limit value. For this reason, as shown by the operation screen of FIG. 35, it is controlled by the CPU 112 to display the information of the "the number of outside-transmitted images" counter in a predetermined display area on the operation screen for setting the transmission mode (step S4603 in FIG. 32). In this case, the CPU 112 controls to permit the execution of the transmission mode under the section ID in question, and enables to accept the setting operation for the transmission mode and the execution instruction of the transmission mode on the operation screen. When it is judged in the step S4602 of FIG. 32 that the counter has reached the upper limit value, the flow advances to the step S4611 to perform the alert display for the user as well as the alert notification in the copy operation shown in FIG. 34. This example is shown in FIG. 36. In FIG. 36, the counter has reached the upper limit value as shown by a portion 5408 ("200000/200000"), and the alert message is displayed at a least portion 5410 on the operation unit. In this case, it is controlled by the CPU 112 to inhibit from executing the transmission mode under the section ID in question, and disable the setting operation for the transmission mode and the execution instruction for the transmission mode both performed on the operation screen by the user.

Figure 37:
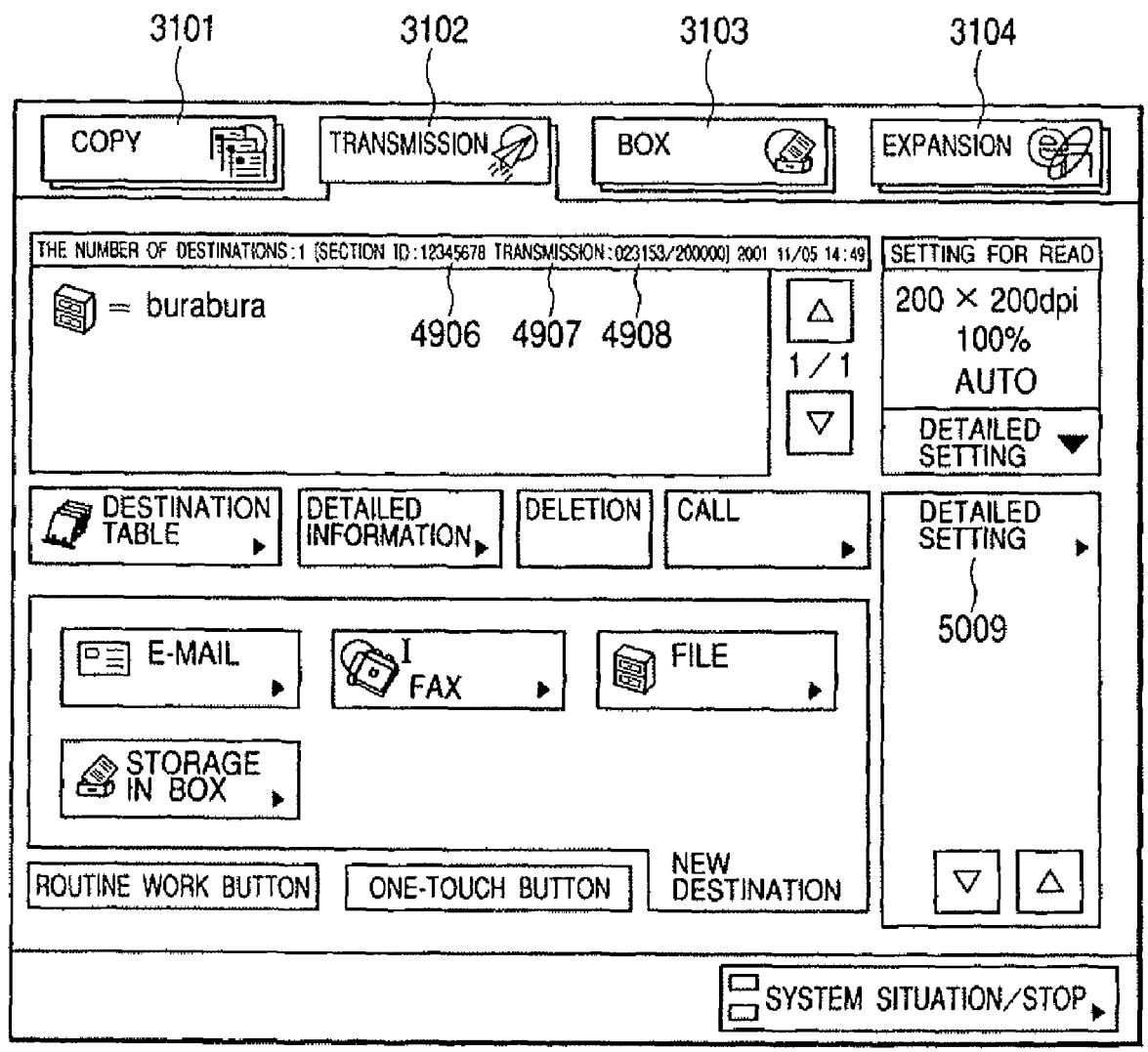
FIG. 37 is a pattern diagram showing an example of the transmission screen displayed on the LCD unit shown in FIG. 11.
Figure 38:
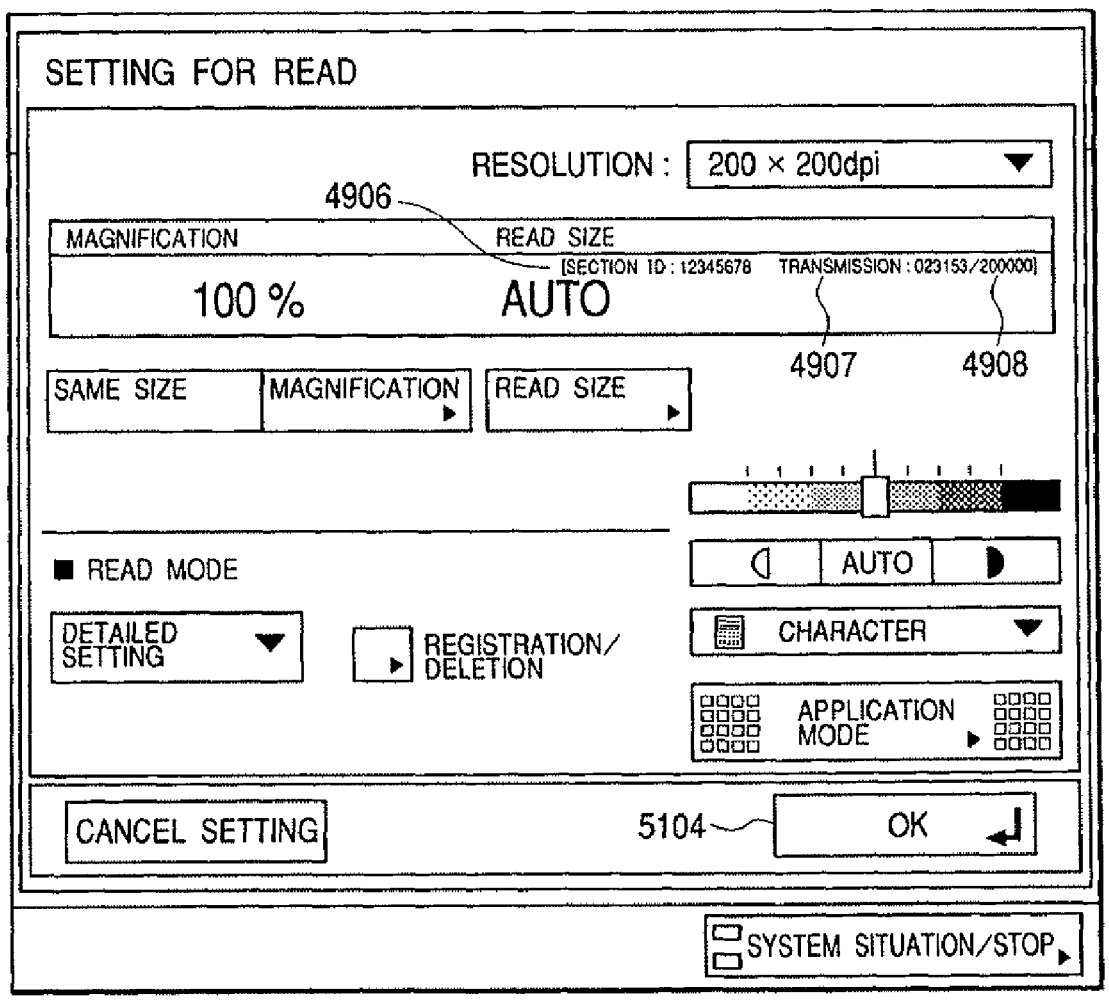
FIG. 38 is a pattern diagram showing an example of the transmission screen displayed on the LCD unit shown in FIG. 11.

When it is intended to perform the detailed setting for reading the original after the counter was displayed in the step S4603 of FIG. 32, a detailed setting button 4909 shown in FIG. 35 is depressed to display a menu 5009 shown in FIG. 37. Then, the menu 5009 is selected, and the setting is performed on a read setting (setting for read) screen shown in FIG. 38. After then, when the setting ends, an OK key 5104 shown in FIG. 38 is depressed to return to the transmission main screen shown in FIG. 35. Subsequently, the image process starts by, e.g., depressing the start key 3006 shown in FIG. 11 (steps S4604 and S4605 in FIG. 32).

Next, the flow advances to the step S4606 in FIG. 32 to perform a count-up process (operation). Here, the count-up process is performed according to the number of transmission bytes in case of the transmission mode. Hereinafter, the count-up process in the transmission mode will be explained with reference to FIG. 39.

Figure 39:
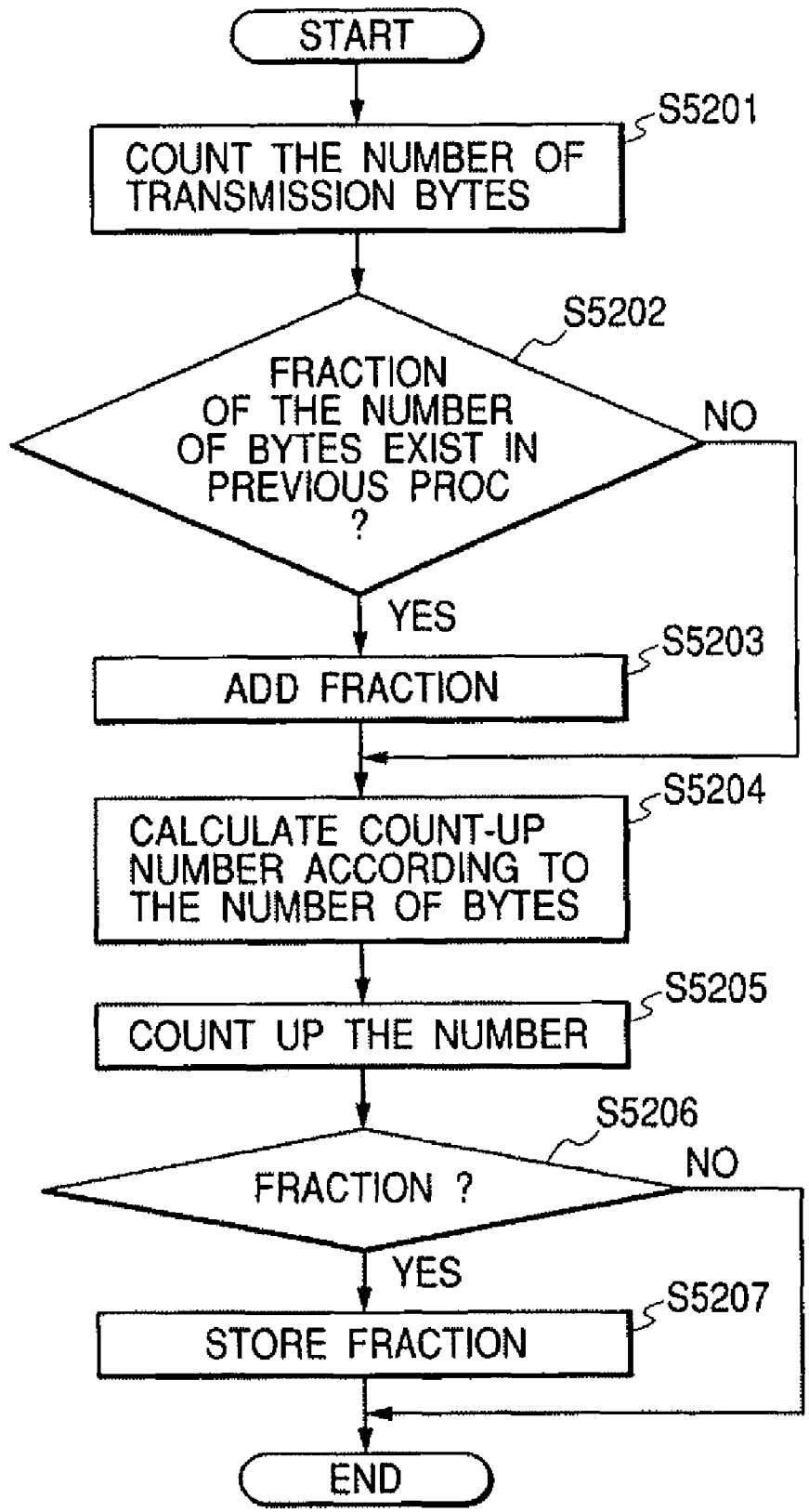
FIG. 39 is a flow chart showing an example of a third control process procedure by the image processing apparatus according to the present invention.

FIG. 39 is the flow chart showing an example of a third control process procedure by the image processing apparatus according to the present invention, and this flow chart corresponds to the example of the count-up process procedure in the transmission mode according to the first embodiment. Here, it is assumed that the process in this flow chart is performed by the CPU 112 shown in FIG. 4 based on the program stored in the ROM 114 or other storage medium, and symbols S5201 to S5207 denote respective steps.

First, in the step S5201, the number of transmission bytes at this time is counted up. Then, when a fraction of the number of transmission bytes which did not reach the number of bytes for the count-up of one image in the previous transmission process exists (S5202), this fraction is added (S5203).

The obtained number of bytes is divided by the number of bytes necessary for counting up one image, thereby calculating the number of images to be counted up (S5204). The obtained result is notified to the counter in the administration apparatus 171, and the count-up is performed (S5205). Even in this case, when a fraction of the number of transmission bytes which did not reach the number of bytes for the count-up of one image exists (S5206), this fraction is stored in the nonvolatile memory of the SRAM 136 or the HD 162 in regard to each user ID to be added in a next process in the transmission mode (S5207). That is, the "the number of outside-transmitted images" counter (value) is equivalent to the value obtained by dividing the integrated value of the number of bytes of transmitted image by the number of bytes of count-up of one image. Therefore, instead of storing of the fraction, it is possible to store the integrated value of the transmitted image data and divide the stored integrated value by the number of bytes of count-up of one image.

Incidentally, a medium which stores these value may be a storage medium of any type capable of holding them even if a power supply is turned off.

As above, after the count-up was performed, if the process in FIG. 32 is continued (for example, plural number is set by using the numeric keys 3004 shown in FIG. 11, or plural originals are put on a not-shown feeder), the upper limit value is again checked. When it is judged that the continuous process can be performed, the appropriate counter is displayed, and the process is actually continued (S4607 to S4610). Here, it should be noted that the process in the step S4608 is the same as that in the S4601, and the process in the step S4610 is the same as that in the step S4603.

Incidentally, a process to set the number of bytes necessary for counting up the number of outside-transmitted images by one will be explained with reference to FIG. 40.

Figure 40:
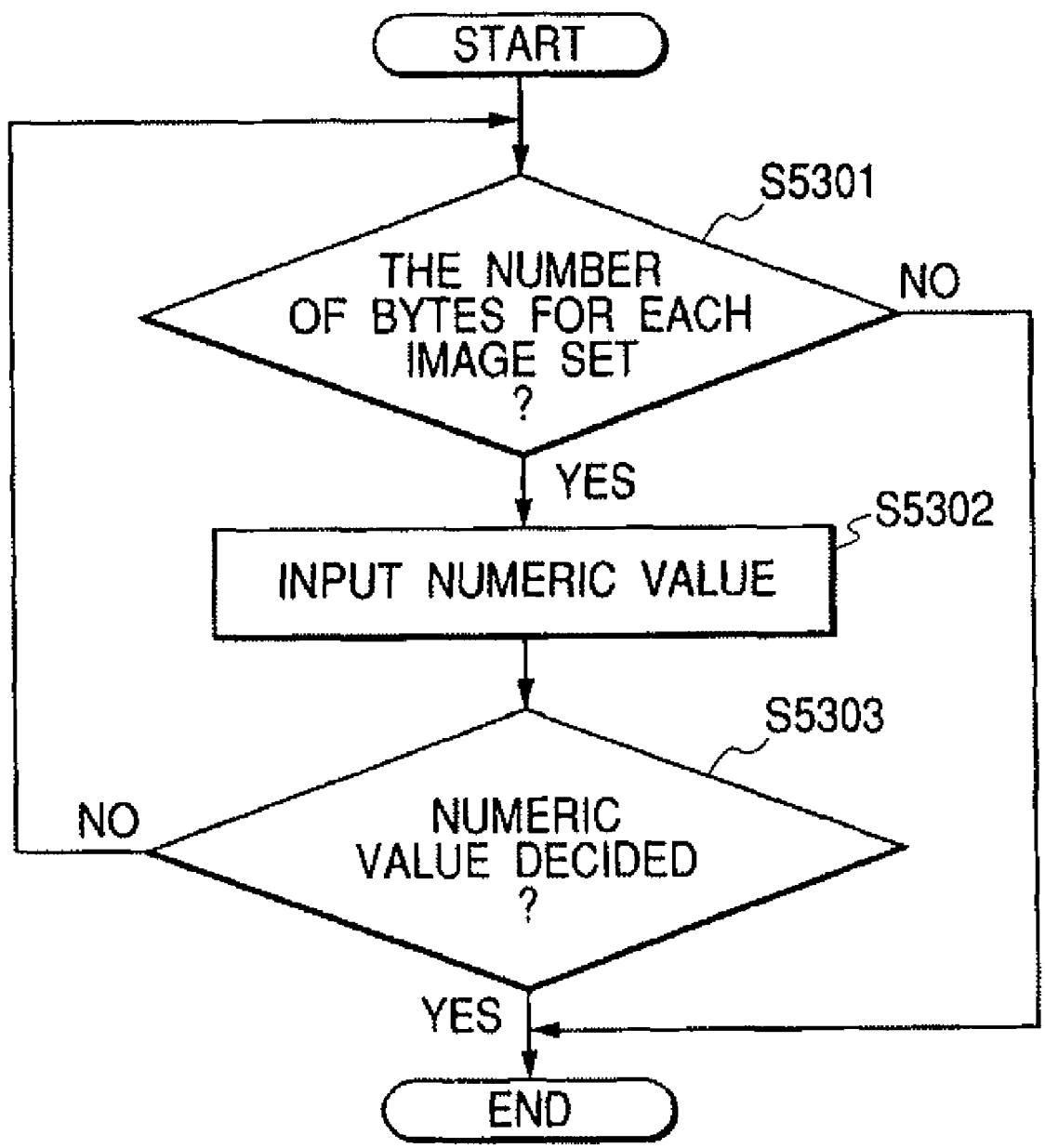
FIG. 40 is a flow chart showing an example of a fourth control process procedure by the image processing apparatus according to the present invention.

FIG. 40 is the flow chart showing an example of a fourth control process procedure by the image processing apparatus according to the present invention, and this flow chart corresponds to the example of the process procedure to set the number of bytes necessary for counting up the number of outside-transmitted images by one. Here, it is assumed that the process in this flow chart is performed by the CPU 112 shown in FIG. 4 based on the program stored in the ROM 114 or other storage medium, and symbols S5301 to S5303 denote respective steps.

First, when a not-shown button to set the number of bytes for count-up by one is depressed in the administrator mode, it is confirmed whether or not to really perform the setting on a not-shown confirmation screen displayed on the LCD unit 3002 of FIG. 11 in the step S5301. When the setting process is cancelled by a not-shown cancel button, the process ends as it is. On the contrary, when the setting process is performed, the flow advances to the step S5302 to input a numeric value through a not-shown numeric value input unit. If any problem does not occur based on the input value, the numeric value is decided in the step S5303. On the contrary, when the numeric value is not decided in the step S5303 and thus the numeric value is again input, the flow returns to the step S5302 to input again the numeric value. As well as the byte number information of the fraction which is less than the number of bytes necessary for count-up by one, the again input value is stored in the nonvolatile memory of the SRAM 136 or the HD 162 shown in FIG. 4. Incidentally, a medium which stores the value may be a storage medium of any type capable of holding it even if the power supply is turned off.

In any case, when the number of bytes for count-up by one is performed from the PC's 180 and 190, the confirmation screen and the numeric value input screen both mentioned above are displayed on the monitors of the PC's 180 and 190.

As described above, according to the present embodiment, in the case where the plural image processing modes are provided, the counter information representing the process amount of the image (also called original data, print data, or job) used in the control of the image processing mode (including control concerning whether or not to permit execution of the mode in question, display control in case of displaying the mode operation screen, and the like) such as the copy mode, the print mode, the box mode or the like is controlled by the CPU 112 so as to be able to generate, store, administrate, update and display it in unit of the number of images (in unit of the number of pages). On one hand, as in the processes of FIGS. 39 and 40, the counter information representing the process amount of the image (also called original data, print data, or job) used in the control of the transmission mode (including control concerning whether or not to permit execution of the mode in question, display control in case of displaying the mode operation screen, and the like) in the plural image processing modes of the image processing apparatus is controlled by the CPU 112 so as to be able to generate, store, administrate, update and display it in unit of data amount such as the number of bytes or the like (in unit of the number of bytes).

Incidentally, the reason why the above control should be performed is to basically solve the above-described conventional problems. More specifically, when an environment to execute the transmission mode is assumed, there is a specific restriction in an external apparatus such as a computer, a server or the like being the transmission destination or a predetermined communication medium (network) for transmitting the data to the external apparatus. In this case, the transmission destination side operates according to the administration, the restriction and the rule based on the data amount (e.g., the transmission cannot be performed for the data exceeding a predetermined data amount), but the own apparatus (the image processing apparatus according to the present embodiment) side operates based on the administration of the number of images by following the administration method of other image forming mode such as the copy mode or the like. Thus, there are the gaps of the rule and the administration method between the own apparatus side and the transmission destination side, whereby the various problems occur due to the gaps. For example, it is difficult for the user to know and understand how to use the transmission mode, operability decreases, and an unnecessary transmission error occurs. Thus, the above control is to cope with these problems, eliminate the gaps and inconsistency of the rule and the administration method between the own apparatus side and the transmission destination side, improve the operability suitable for the environment, and achieve excellent administration and use.

Incidentally, the display unit (operation display unit including operations buttons and the like to cause the user to set various setting parameters such as original size, original read size, original type, image quality, resolution and the like) is used by the user to set the various processing conditions for the transmission mode on the operation screen for the transmission mode. The operation display unit should be displayed distinctively from the display area, and the counter information is displayed on the counter information display unit for displaying the counter information concerning the transmission mode. Here, the control method of the counter information may be controlled to be the same as the display method (i.e., in unit of copies (pages)) of the counter information in other image processing mode (i.e., the number display method by which the information concerning the number of processed pages can be apparently discriminated by the user). In this case, it can be controlled by the CPU 112 to display the counter information concerning the transmission mode on the counter information display unit of the operation screen for the transmission mode, in the display method different from the display method (in unit of the number of copies) of the counter information for other image processing mode. For example, the counter information is displayed in unit of data amount such as the number of bytes or the like (i.e., data amount display method by which the information concerning the data amount of processed pages can be apparently discriminated by the user). Incidentally, the plural kinds of display methods of the counter information of the transmission mode are provided, the mode to display the counter information of the transmission mode in the display method (page number display) same as that for other image processing mode is provided, and the mode to display the counter information of the transmission mode in the display method (byte number display) different from that for other image processing mode is provided. In such an environment, it is possible to cause the user (administrator in this case) to select the mode in the desired display method according to a not-shown administrator mode or the like. Of course, it is possible to provide only the former mode (i.e., the mode to display the counter information of the transmission mode in the display method (page number display) same as that for other image processing mode), and it is also possible to provide only the latter mode (i.e., the mode to display the counter information of the transmission mode in the display method (byte number display) different from that for other image processing mode). Thus, the image processing apparatus according to the present embodiment may be used in an administration system suitable for the user.

In regard to the latter mode, the upper limit value in the transmission mode in a data amount form such as the number of bytes can be displayed and notified on the operation screen of the operation unit concerning the transmission mode, as a first notification for enabling the user to discriminate the upper limit value allocated to the target section ID in the process (including, e.g., the scan process and the transmission process by the reader unit 200) necessary for the transmission mode. For example, even if the upper limit value is set in unit of the number of images (copies), the number of images is changed into the number of bytes and then displayed. Moreover, as a second notification for enabling the user to discriminate the total amount (sum) of the job process amount concerning how many images have been processed up to now in the process (including, e.g., the scan process and the transmission process by the reader unit 200) necessary for the transmission mode, the total amount value can be displayed and notified on the operation screen of the operation unit concerning the transmission mode in a data amount form such as the number of bytes. For example, even if the total amount is calculated in unit of the number of images (copies), the number of images is changed into the number of bytes and then displayed. Moreover, in a case where the upper limit value does not exceed the upper limit value allocated to the section in question in the process concerning the transmission mode, as a third notification for enabling the user to discriminate the value of the remaining number of processible images concerning how many remaining images can be processed in the transmission mode under the section ID, the value of the remaining number can be displayed and notified on the operation screen of the operation unit concerning the transmission mode in a data amount form such as the number of bytes. For example, even if the remaining number of processible images is calculated in unit of the number of images (copies), the number of images is changed into the number of bytes and then displayed. Moreover, at any of plural kinds of transmission timing including timing at least immediately before and further before the original data is actually transmitted to the external apparatus in the transmission mode, timing just while the data is actually being transmitted to the external apparatus in the transmission mode, and timing immediately after the original data was actually transmitted to the external apparatus in the transmission mode, as a fourth notification for enabling the user to discriminate the process amount (the number of original pages included in the job in question) of the original data being the processing target to be processed in the selected transmission mode, the job process amount can be displayed and notified on the operation screen of the operation unit 150 in a data amount form such as the number of bytes. For example, even if the job process amount is calculated in unit of the number of images (copies), the number of images is changed into the number of bytes and then displayed. As described above, the various display controls are performed by the CPU 112. Incidentally, it may be controlled by the CPU 112 to be able to execute at least any of the above first to fourth notifications, to display all of these notifications on the same screen, and to be able to selectively display any of these notifications.

As explained above, the notification method of the counter information to the user is distinctively controlled between the transmission mode and the non-transmission mode (including local copy mode, reception print mode, box output mode, etc.) both included in the plural image processing modes. Thus, it is controlled to be able to notify the user of the counter information (scanner counter information) acting as the administration information concerning the process (e.g., scan process) necessary in the transmission mode, in the notification form (data amount display form) different from the notification form (image number display form) in case of notifying the user of the counter information (print counter information) acting as the administration information concerning the process (e.g., print process in copy mode, reception print mode, etc.) necessary in the non-transmission mode.

In the present embodiment, it is mainly explained that the counter information is displayed on, as an example of notification unit, the display unit of the operation unit in the image processing apparatus or the display unit of the operation unit in the external apparatus including the host computer such as the PC 180 or the CP 190, and the notification process of the counter information is thus performed to the user. However, the present embodiment is not limited to this. The notification process concerning the counter information may be performed to the user by controlling a not-shown voice unit (not-shown voice output unit of the image processing apparatus, not-shown output unit of the host computer, or the like) being another example of the notification unit to generate the counter information as a voice output. For example, when the counter information concerning the process necessary for the transmission mode is notified, it is controlled to read out the counter information by the voice unit in a form by which the data amount such as the number of bytes of the processing data can be clearly understood by the user. Besides, when the counter information concerning the process necessary for the non-transmission mode is notified to the user, it is controlled to read out the counter information by the voice unit in a form by which the number of processed pages of the processing data can be clearly understood by the user. In any case, it may be controlled to be able to notify the user, who wants the counter information, of desired counter information in a notification form suitable for a desired image processing mode. Of course, in regard to the notification control of the counter information concerning the transmission mode, the control is discriminatively and independently performed according to whether the original data of the processing target is processed as monochrome data or color data.

In the present embodiment, the copy function, the box function, the transmission function and the print function are explained as the functions of the MFP. However, the present invention also includes other functions which can be controlled and administrated by the combinations of the counters respectively administrating the upper limit values of the number of read originals, the number of images output by the own apparatus, the number of outside-transmitted images, the number of externally received output images.

As explained above, in the present embodiment, the plural kinds of number-of-image information (counter) respectively representing the number of originals read by the reader unit 200, the number of images output by the printer unit 300 of the own apparatus, the number of output images received from other apparatus on the network, and the number of images transmitted to other apparatus on the network are administrated independently by the administration apparatus 171 in regard to each user ID by which the user administrated by the administration apparatus 171 can be specified. Then, as shown in FIG. 30, the upper limit values of the plural kinds of number-of-image information respectively representing the number of read originals, the number of images output by the own apparatus, the number of outside-transmitted images, and the number of externally received output images are set in regard to each user ID. Subsequently, as shown in FIG. 32, until the counter reaches the upper limit value, any of the plural kinds of number-of-image information and its corresponding upper limit value information are selected from the plural counters belonging to the same administration section and the current counter value and the upper limit value are displayed on the operation unit. Then, when the counter reaches the upper limit value, it is controlled by the CPU 112 to notify with an alert the user of impossibility of process continuation, thereby enabling the user to easily recognize the counter information. Moreover, in regard to the number of images transmitted outside, as shown in FIG. 39, the weight count (e.g., count of the number of bytes) is performed to make the guide of count-up clear and impartial, thereby removing user's dissatisfied element and reducing the number of developer's steps in development processes.

Moreover, as described above, the administration (control) apparatus in the present embodiment has the plural functions and modes, whereby the process number information obtained as the processing conditions of the originals or the pages processed in the respective functions and modes is administrated and controlled discriminatively in regard to each function (each image processing mode).

In the various image processing modes such as the local copy mode that the job (original data) scan-processed by the scanner of the own apparatus is printed by the printer of the own apparatus, the box (storage) mode that the job input from the scanner of the own apparatus or the external apparatus is stored in the box of the HD in the own apparatus, the box (print or output) mode that the job stored in the box of the HD in the own apparatus is printed by the printer of the own apparatus, the remote copy mode that the job received from the external apparatus (e.g., other copy machine, host computer, or facsimile machine) is printed by the printer of the own apparatus, the reception print mode, and the like, the control apparatus of the present embodiment controls the administration information concerning the process amount of the original (or page) being the process target in unit of number-of-image data (in unit of page), so that the administration information can be generated, stored, administrated, updated, called and displayed. Here, it should be noted that the number-of-image data is the data which representing the number of images. Then, when the administration information concerning these image processing modes is requested by the administrator or a general user in the form of command data input through the various interfaces including the operation unit according to the present embodiment, the control apparatus of the present embodiment controls the administration information concerning the process amount of the processed originals (pages), so that the administration information can be displayed on an appropriate display area (e.g., the display portion 4808 on the operation screen of FIG. 34, a display portion 14908 shown in FIG. 44, a display portion 5510 shown in FIG. 48, a display portion 5901 shown in FIG. 52, or the like) on the appropriate operation screen (e.g., UI's shown in FIGS. 34, 44, 48, 52, or the like) in unit of the number of images (in unit of page), thereby enabling to notify the administrator or the general user of the administration information of these image processing modes in unit of the number of processed images.

Furthermore, the control apparatus in the present embodiment controls the administration information independently in the case where the original data is processed with color data (color mode) and in the case where the original data is processed with monochrome data (monochrome mode, or black-and-white mode), so that the administration information can be generated, stored, administrated, updated, called and displayed.

Furthermore, in distinction from the above administration and the control in the image processing mode, in the transmission mode to transmit the job (original data) scan-processed by the scanner of the own apparatus to the external apparatus (including at least any of computer, server, facsimile machine, and other image processing apparatus), the control apparatus in the present embodiment controls the administration information concerning the process amount of the original (or page) of the process target in an administration form (e.g., in unit (form) of predetermined data amount such as the number of bytes or the like) different from the above number-of-image data (in unit of page), so that the administration information can be generated, stored, administrated, updated, called and displayed. Then, when the administration information concerning the above transmission mode is requested by the administrator or the general user in the form of command data input through the various interfaces including the operation unit according to the present embodiment, the control apparatus of the present embodiment controls the administration information concerning the process amount of the processed originals (pages), so that the administration information can be displayed on the appropriate display area (different from the display areas for various mode setting in the transmission mode (e.g., display area for displaying set parameters and statuses)) on the appropriate operation screen (e.g., the setting screen of the transmission mode) in expression form (e.g., in unit of predetermined data amount such as the number of bytes or the like) different from the number-of-image form, thereby enabling to notify the administrator or the general user of the administration information of these image processing modes in unit of the data amount.

Thus, it is possible to solve the above-cited conventional problems. Moreover, in a case where the environment which executes the transmission mode is assumed, there is the gap of the administration method between the own apparatus side and the transmission destination side. For example, it is thought that the transmission mode is executed on the transmission destination side according to the administration, the restriction and the rule based on the data amount (e.g., the data of a predetermined data amount or more cannot be transmitted on the transmission destination side) due to the unique restriction or the like in the external apparatus such as the computer, the server, or the like being the transmission destination or in the predetermined communication medium (network) for transmitting the data to the external apparatus, while the own apparatus (the image processing apparatus according to the present embodiment) side operates based on the administration of the number of images by following the administration method of other image forming mode such as the copy mode or the like. However, according to the present embodiment, it is possible to solve the various problems which occur due to the above gap, for example, it is difficult for the user to know and understand how to use the transmission mode, the operability decreases, and the unnecessary transmission error occurs. Therefore, it is possible to eliminate the gap, the inconsistency and unnaturalness in the administration method, the restriction and the rule between the own apparatus side and the transmission destination side, improve the operability suitable for the environment, and achieve excellent administration and use.

Incidentally, as the method of notifying (i.e., displaying) the user of the data amount, it is possible to indicate the data amount by numeric values (e.g., in unit of predetermined byte number such as 2 MB) different from the number-of-image indication or by a bar form such as a bar graph or the like. Moreover, it may be controlled that the administration information concerning the transmission mode can be generated, stored, administrated, updated, called and displayed as the number-of-image data. Besides, it may be controlled that the administration information concerning the transmission mode is generated, administrated and updated in unit of data amount, but can be notified (displayed) to the user in the form of the number of images calculated based on the data amount (in unit of page). In any way, it only has to be able to achieve the administration use method which is in line with user's needs and optimum for the user.

Moreover, the control apparatus in the present embodiment controls the administration information independently in the case where the original data is processed with color data (color mode) and in the case where the original data is processed with monochrome data (monochrome mode), so that the administration information can be generated, stored, administrated, updated, called and displayed.

As described above, according to the present embodiment, it is possible to solve the conventional problems, and also it is possible to eliminate beforehand the various problems that, for example, it is difficult for the administrator to administrate the transmission mode, and the operability decreases. Therefore, it is possible to construct and provide the environment which can be easily administrated and used by the user, thereby dealing with various needs from the user.

Second Embodiment

In the first embodiment, merely in the case where any of the counters that the remaining number is necessary for the setting mode reaches the upper limit value, the alert which indicates that the process in the mode in question cannot be performed is notified to the user. Therefore, even if the counter does not reach the upper limit value at a time when the process starts, the counter then reaches the upper limit value according to the user's setting while the process is being performed, whereby there is a fear that the process cannot be continued. On one hand, it is assumed in the present embodiment that a user set a mode and a numeric value by which he intends to perform input and output operations. In this case, in a case where there is a fear that the counter exceeds the upper limit value if the process starts with the setting (i.e., the set mode and numeric value) as it is, this fact is notified to the user beforehand. Hereinafter, the present embodiment will be explained.

<Explanation of Counter Upper Limit Value Setting Process>

Figure 41:
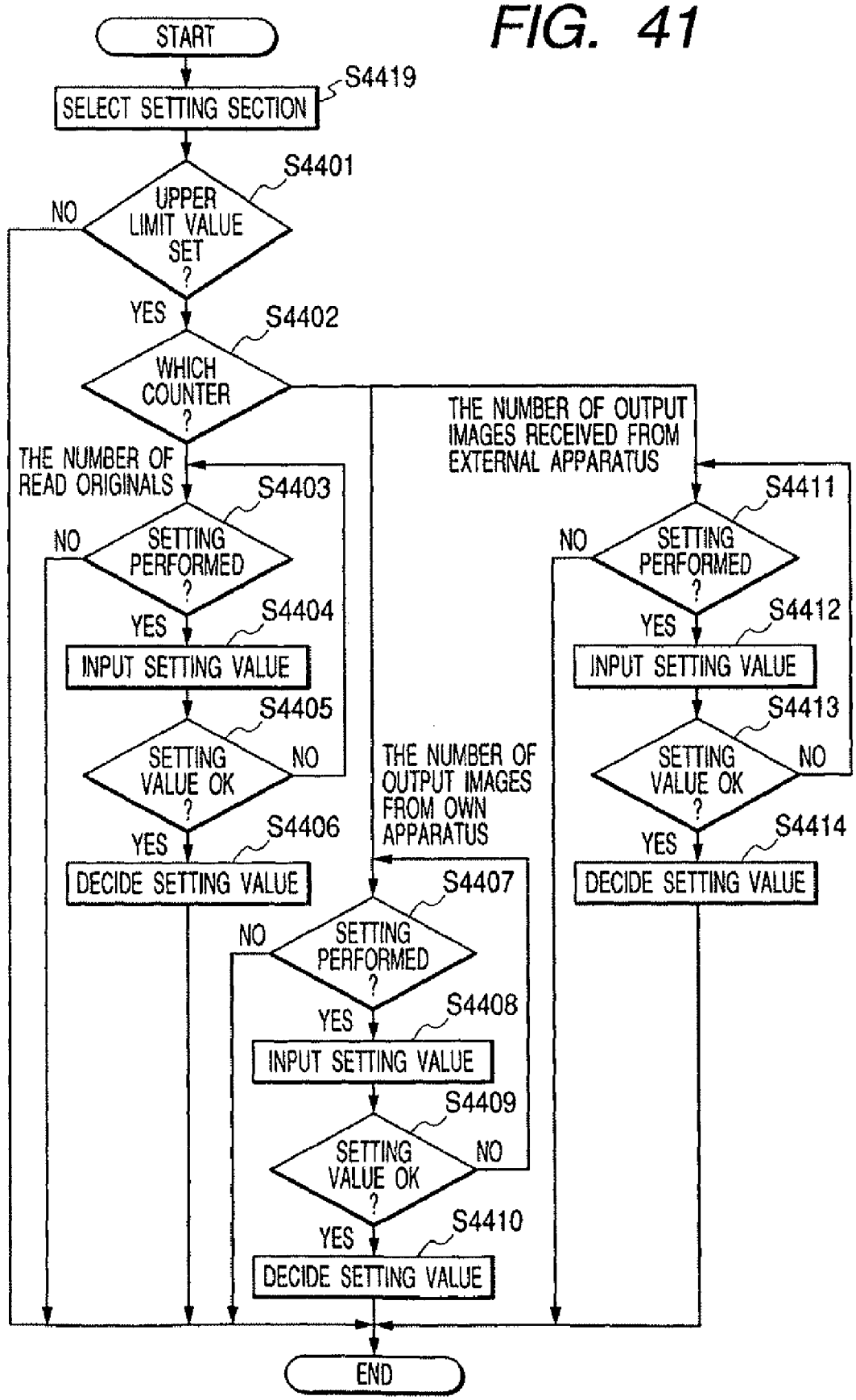
FIG. 41 is a flow chart showing an example of a fifth control process procedure by the image processing apparatus according to the present invention.

FIG. 41 is a flow chart showing an example of a fifth control process procedure by the image processing apparatus according to the present invention, and this flow chart corresponds to an example of a counter upper limit value setting process procedure in the second embodiment. Here, it is assumed that the process in this flow chart is performed by the CPU 112 shown in FIG. 4 based on the program stored in the ROM 114 or other storage medium, and symbols S4401 to S4414 and S4419 denote respective steps.

Here, in FIG. 41, the steps same as those in FIG. 30 are denoted respectively by the same steps numbers as shown in FIG. 30.

The image processing apparatus according to the present embodiment can perform a "(local) copy" process, a "box (storage)" process, a "box (output)" process, a "print (transmission)" process and a "print (reception)" process, and is equipped with a "the number of read originals" counter, a "the number of output images from own apparatus" counter and a "the number of output images received externally" counter. However, the image processing apparatus according to the present embodiment can of course perform other process and can be equipped with other counter. The process other than the above point is the same as the process shown in FIG. 30, whereby the detailed explanation of the flow chart will be omitted.

<Explanation of Counter Display Process>

Hereinafter, a counter display process in the image processing apparatus according to the second embodiment of the present invention will be explained with reference to FIGS. 42 and 43. Here, it should be noted that the copy main screen on which the counter is displayed is the same as that of the first embodiment shown in FIG. 31.

Figure 42:
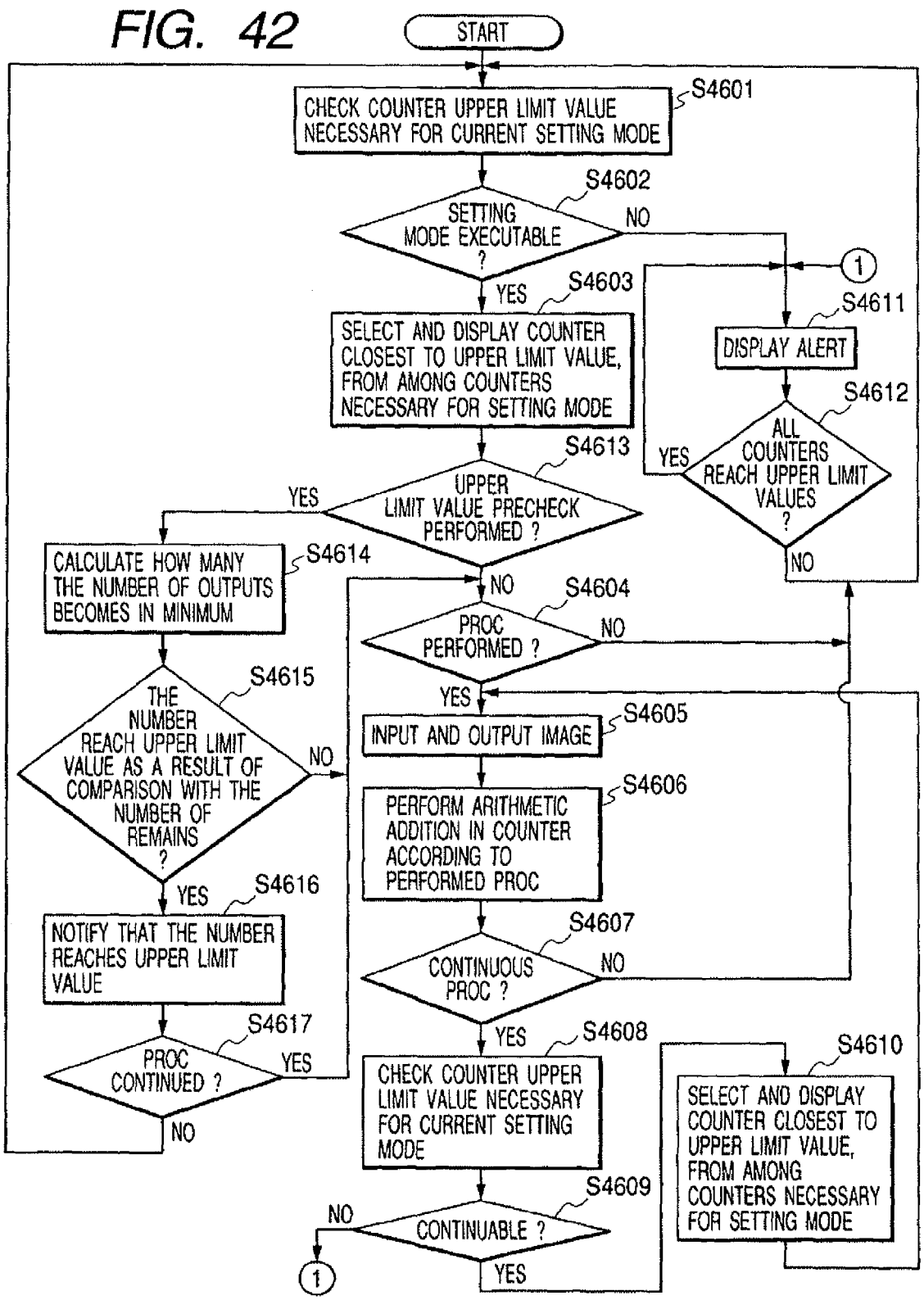
FIG. 42 is a flow chart showing an example of a sixth control process procedure by the image processing apparatus according to the present invention.

FIG. 42 is the flow chart showing an example of a sixth control process procedure by the image processing apparatus according to the present invention, and this flow chart corresponds to an example of a counter display process procedure in the second embodiment. Here, it is assumed that the process in this flow chart is performed by the CPU 112 shown in FIG. 4 based on the program stored in the ROM 114 or other storage medium, and symbols S4601 to S4617 denote respective steps. Here, in FIG. 42, the steps same as those in FIG. 30 are denoted respectively by the same steps numbers as shown in FIG. 30.

First, in the step S4601, the upper limit value of the counter that the remaining number is necessary for the current user ID and the setting mode is checked. The details concerning which counter is subjected to comparison in regard to which setting mode will be shown in FIG. 43.

As shown in FIG. 43, to perform the "(local) copy" process that the reading by the own apparatus and the output by the own apparatus are necessary, the "the number of read originals" counter (shown as a read original number counter in FIG. 43) and the "the number of output images from own apparatus" counter (shown as an own apparatus image output number counter in FIG. 43) only have not to reach the respective upper limit values. Further, to perform the "box (storage)" process that the image read by the own apparatus is stored in the memory, the "the number of read originals" counter only has not to reach the upper limit value. Furthermore, to perform the "box (output)" process that the image stored in the memory of the own apparatus is output by the own apparatus, the "the number of output images from own apparatus" counter only has not to reach the upper limit value. Furthermore, to perform the "print (transmission)" process that the image read by the own apparatus is transmitted to the external apparatus, the "the number of read originals" counter and the "the number of output (transmitted outside) images from own apparatus" counter only have not to reach the respective upper limit values. Furthermore, to perform the "print (reception)" process that the image received from the external apparatus is output by the own apparatus, the "the number of output images received externally" counter (shown as an externally received image output number counter in FIG. 43) only has not to reach the upper limit value.

Here, it is assumed that the "the number of read originals" counter, the "the number of output images from own apparatus" counter and the "the number of output images received externally" counter are stored in the administration apparatus 171 of FIG. 4 in regard to each user ID.

As above, after the upper limit value of the counter that the remaining number is necessary for the current setting mode is checked in the step S4601, when it is judged in the step S4602 that any of the counters that the remaining number is necessary for the current setting mode reaches the upper limit value, and thus the process in the setting mode cannot be performed, the flow advances to the step S4611 to notify with an alert the user of impossibility of process continuation, as well as the first embodiment shown in FIG. 32. Incidentally, the processes in the steps S4611 and S4612 are the same as those in the first embodiment, whereby the detailed explanation of these steps will be omitted.

On one hand, when it is judged in the step S4602 that the process in the setting mode can be performed, the flow advances to the step S4603 to select the counter closest to the upper limit value from among the counters that the remaining number is necessary for the current setting mode, and then display the selected counter on the operation unit, as well as the first embodiment (FIG. 31).

Figure 44:
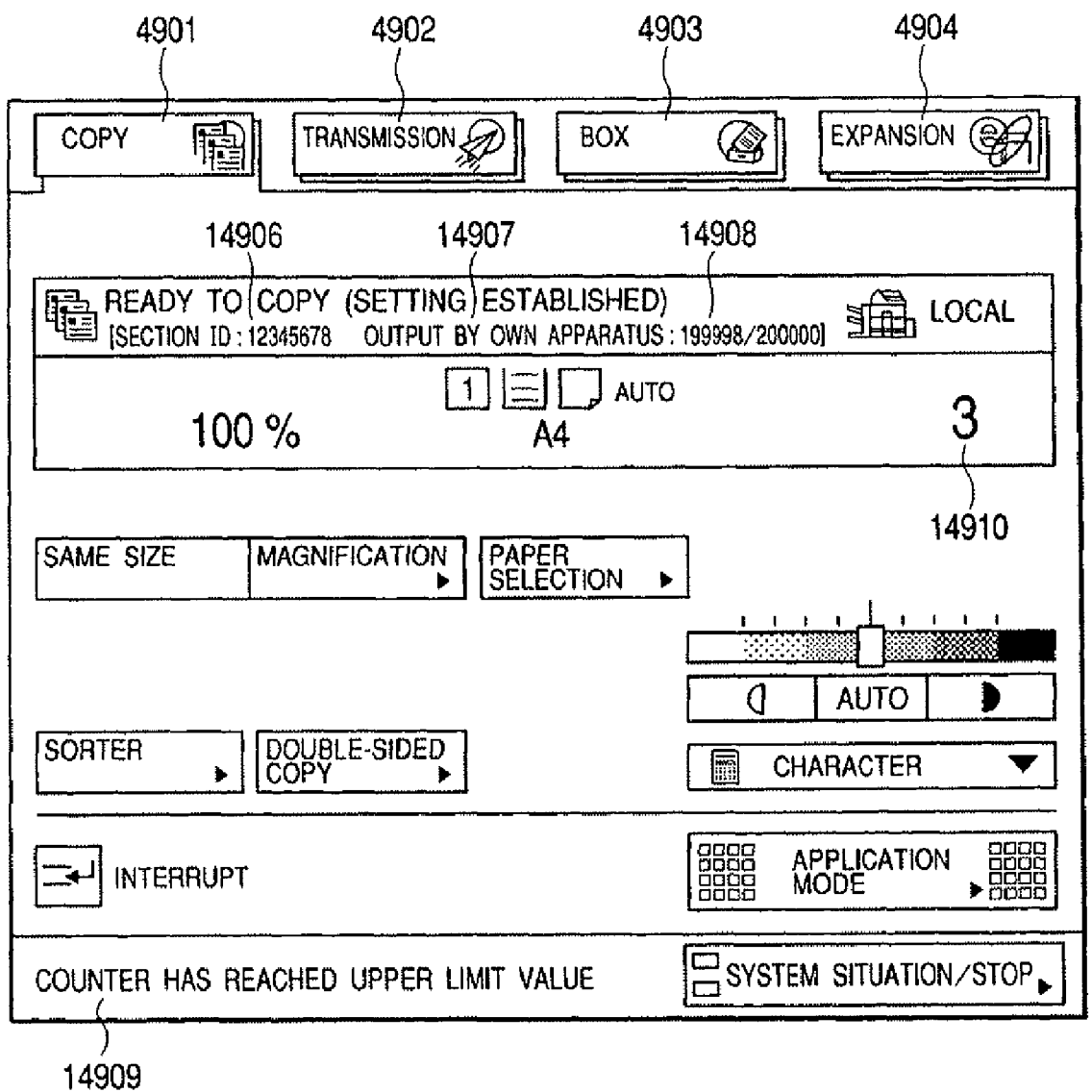
FIG. 44 is a pattern diagram showing an example of a screen when the counter reaches the upper limit value on the transmission screen displayed on the LCD unit shown in FIG. 11.

Next, it is judged in the step S4613 whether or not to check the upper limit value beforehand. Here, a recognition procedure concerning whether or not to perform the check will be described later. When it is judged to check the upper limit value, the flow advances to the step S4614 to calculate how many in minimum the number of input and output images becomes on the basis of the current setting mode or the numeric values. For example, in the local copy mode that the image read by the own apparatus is output by the own apparatus, it is assumed that the numeric value is set to "3" by using the numeric keys 3004 shown in FIG. 11 and the standard copy operation is performed. In such a case, the minimum necessary counter remaining number (i.e., the remaining number of the counter which is necessary to complete the copy operation) is considered. Since the original of "1" is read at the minimum and the output papers of "3" are obtained, the counter absolutely reaches the upper limit value during the operation if the remaining number of the "the number of read originals" counter is "1" or more and the remaining number of the "the number of output images from own apparatus" counter is "3" or more. That is, in this mode setting example, when it is judged in the step S4615 that the remaining number of the "the number of read originals" counter is "1" or more and the remaining number of the "the number of output images from own apparatus" counter is not "3" or more, the flow advances to the step S4616 to notify the user that the counter reaches the upper limit value. FIG. 44 shows an example of the notification screen in this case. In FIG. 44, as shown by numerals 14907 and 14908, although the remaining number of the image output counter of the own apparatus in the section indicated by a numeral 14906 is "200000−199998=2", the numeric value is set to "3", whereby a message 14909 to notify the user that the counter reaches the upper limit value is displayed at the lower portion of the operation unit.

Next, it is assumed that a double-sided to one-sided mode to output the images disposed on the front and back sides of the original are output on one-sided papers is set and the numeric value is set to "3". In this case, since the double-sided original of "1" (=images of "2") is read at the minimum, the counter absolutely reaches the upper limit value during the operation if the remaining number of the "the number of read originals" counter is "2" or more and the remaining number of the "the number of output images from own apparatus" counter is "2×3=6" or more.

Thus, when it is judged in the step S4615 that the counter absolutely reaches the upper limit value, the flow advances to the step S4616 to notify the user of such a fact, whereby the user can change the setting.

Here, when the setting is changed (i.e., it is judged in the step S4617 that the process is not continued), the flow returns to the step S4601 to check the upper limit value of the counter that the remaining number is again necessary for the changed mode.

On one hand, when the process is continued as it is by, e.g., depressing the start key 3006 shown in FIG. 11 based on the user's intention although the user knows that the counter reaches the upper limit value (i.e., it is judged in the step S4617 that the process is continued), the flow advances to the step S4604. Also, when it is judged in the step S4615 that the counter does not absolutely reach the upper limit value, the flow advances to the step S4604.

In this state, when the process is not performed (i.e., NO in the step S4604), the flow returns to the step S4601. On the other hand, when the process is performed by, e.g., depressing the start key 3006 shown in FIG. 11 (i.e., YES in the step S4604), the flow advances to the step S4605 to input and output the image in the designated mode. Then, the counter according to such a process is arithmetically added in the S4606.

Next, it is judged in the step S4607 whether or not the continuous process is performed. In the continuous process, for example, the plural number is set by using the numeric keys 3004 shown in FIG. 11, or the plural originals are put on the not-shown feeder, whereby the images are continuously read and output. In any case, as to whether or not the continuous process is set by the user, it can be confirmed at the stage that the calculation is performed in the step S4614 when the continuous process is set by the numeric value, whereby the upper limit value can be checked beforehand in consideration of the numeric value. However, when the plural originals are put on the not-shown feeder, it cannot be confirmed until the image input and output process is actually performed whether or not the continuous process is being set. That is, the continuous process cannot be confirmed at the stage that the calculation is performed in the step S4614. For this reason, the calculation is performed in the step S4614 always on the assumption that the original of the least number "1" has been put on. Thus, even if the remaining number of the counter that is necessary when only one original is put on is satisfied, any notification is not performed in the step S4616 when the plural originals are actually put on the not-shown feeder, whereby there is a fear that the upper limit value check is applied in the step S4607. Like this, the upper limit value of the counter that the remaining number is necessary for the setting mode in the step S4607 is checked every time one process is performed during the continuous processes, and the procedure of the check is the same as that explained in the step S4601.

As a result, when it is judged in the step S4609 that the mode being currently executed cannot be continued, the flow advances to the step S4611 to perform the alert display and interrupt the current process.

On the contrary, when it is judged in the step S4609 that the mode being currently executed can be further continued, the flow advances to the step S4610 to select the counter closest to the upper limit value from among the counters that the remaining number is necessary for the current setting mode, and display the selected counter on the operation unit, as well as the step S4603. Then, the flow returns to the step S4605 to perform next image input and output. After a series of the processes ended, when the currently executed job ends, it is judged in the step S4607 that the continuous process is not performed, and the flow returns to the step S4601.

Figure 45:
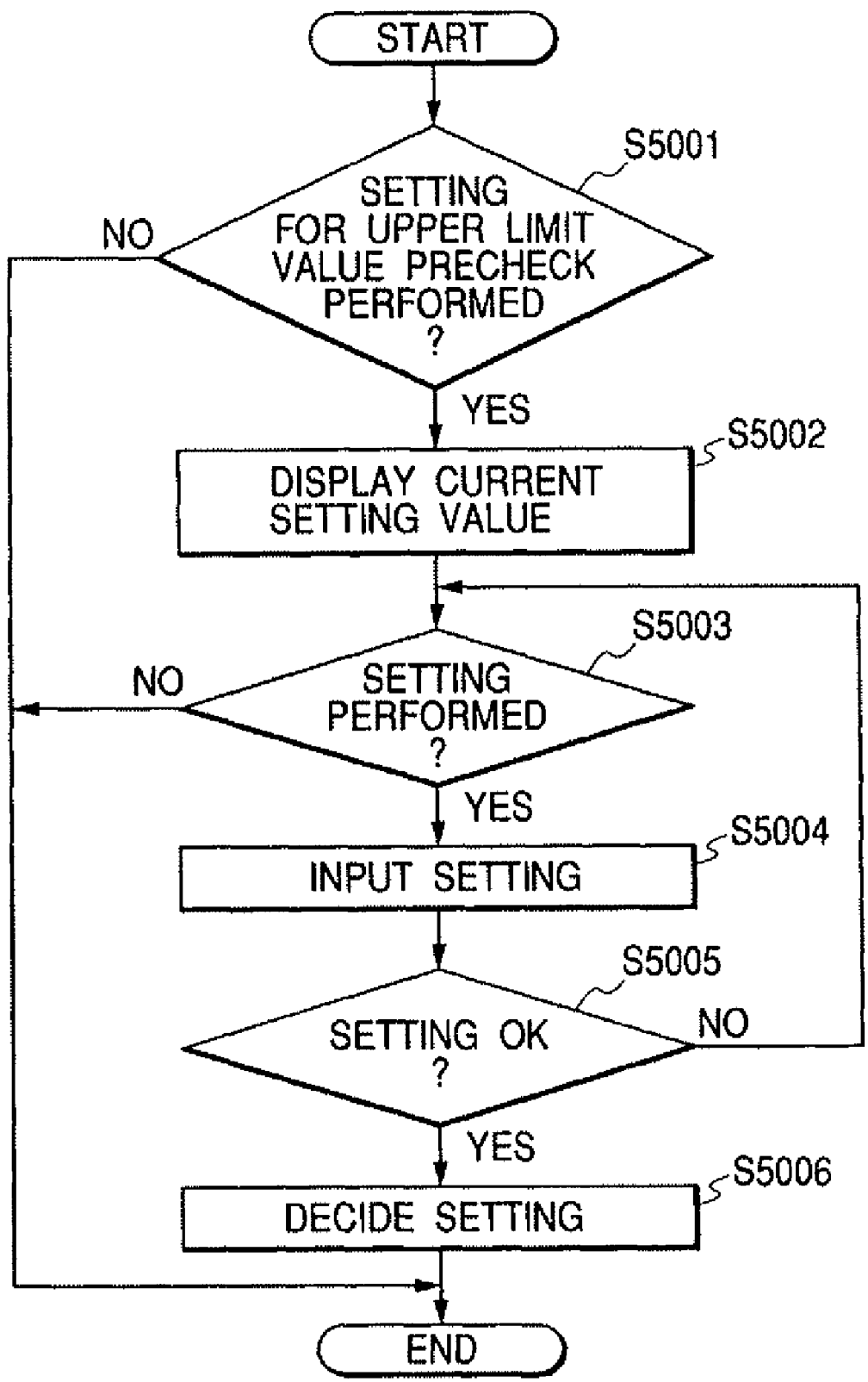
FIG. 45 is a flow chart showing an example of a seventh control process procedure by the image processing apparatus according to the present invention.

FIG. 45 is a flow chart showing an example of a seventh control process procedure by the image processing apparatus according to the present invention, and this flow chart corresponds to the example of the detailed process procedure in the step S4613 of FIG. 42 to judge whether or not to check the upper limit value beforehand. Here, it is assumed that the process in this flow chart is performed by the CPU 112 shown in FIG. 4 based on the program stored in the ROM 114 or other storage medium, and symbols S5001 to S5006 denote respective steps.

It is thought that a user who feels that it is annoying when a notification is issued every time the process though the counter does not reach the upper limit value exists, whereby it causes by this procedure the user to set whether or not the notification is performed.

First, it is judged in the step S5001 whether or not to set the previous upper limit value check. For example, the process in the step S5001 is set in a service mode which concerns the setting being inherent in the own apparatus and capable of being set only a service person. When the setting is not started, the process ends as it is.

On the other hand, when the setting is started in the step S5001, the flow advances to the step S5002 to display the current setting situation.

Next, it is judged in the step S5003 whether or not to change the current setting. When it is judged to change the current setting, the flow advances to the step S5004 to change the setting. Then, it is judged in the step S5005 whether or not the setting is acceptable for the user. When it is judged that the setting is acceptable, the flow advances to the step S5006 to decide the changed setting, and the process ends.

On the contrary, when it is judged in the step S5005 that the setting is not acceptable, the flow returns to the step S5003.

By the above process, the setting content (setting concerning notification and non-notification) is stored in the nonvolatile memory of the SRAM 136 or the HD 162 shown in FIG. 4 in regard to each user ID. Incidentally, a medium which stores the content may be a storage medium of any type capable of holding it even if the power supply is turned off.

In the present embodiment, the copy function, the box function and the print function are explained as the functions of the MFP. However, the present invention also includes other functions which can be controlled and administrated by the combinations of the counters respectively administrating the upper limit values of the number of read originals, the number of images output by the own apparatus, and the number of externally received output images.

As explained above, in the present embodiment, the plural kinds of number-of-image information (counter) respectively representing the number of originals read by the reader unit 200, the number of images output by the printer unit 300 of the own apparatus, the number of output images received from other apparatus on the network, and the number of images transmitted to other apparatus on the network are administrated independently by the administration apparatus 171 in regard to each user ID by which the user administrated by the administration apparatus 171 can be specified. Then, as shown in FIG. 30, the upper limit values of the plural kinds of number-of-image information respectively representing the number of read originals, the number of externally received output images, and the number of outside-transmitted images are set in regard to each user ID. Subsequently, as shown in FIG. 32, until the counter reaches the upper limit value, any of the plural kinds of number-of-image information and its corresponding upper limit value information are selected from the plural counters belonging to the same administration section and the current counter value and the upper limit value are displayed on the operation unit. Then, when the counter reaches the upper limit value, it is controlled by the CPU 112 to notify with an alert the user of impossibility of process continuation. In the image processing apparatus of performing such processes, at a time when the user sets the mode and the numeric value by which the user wishes to perform the input and output operations, the counter that the remaining number is necessary for the mode set by the user is specified from among the plural counters, the minimum value of the number of images which would be input and output is calculated from the set mode and the numeric value, and the calculated minimum value is compared with the remaining number of the specified counter. Then, if the counter value exceeds the upper limit value when the process starts as it is in that setting, it notifies the user of the compared result to urge him to change the setting, thereby causing the user to clearly recognize beforehand that the counter reaches the upper limit value while the process is performed and thus to change the setting based on the user's intention to beforehand prevent a restart itself complicated for the user. Moreover, it enables the user to beforehand consider the restart of the process even when the process is continued based on the user's intention although the user has known that the counter reaches the upper limit value, thereby reducing a user's load concerning the restart of the process after the counter reached the upper limit value while the processing is performed.

Third Embodiment

In the first and second embodiments, it is explained that only one counter which is closest to the upper limit value and selected according to the user ID and the setting mode is displayed on the display unit. However, it is possible to display all the counters which are necessary for the setting mode. For example, when the local copy is performed, since the two counters of the "the number of read originals" counter and the "the number of output images from own apparatus" counter are necessary in the process, these two counters are displayed on the display unit to notify the user of them. Incidentally, when the display space is insufficient, the plural necessary counters are subjected to comparison, whereby it is possible to display the counters in sequence from the counters closer to the upper limit value, by the number capable of being displayed.

Moreover, in the first and second embodiments, the counter which is discriminated by neither black and white (monochrome) nor color is used, and the image processing apparatus which is dedicated for black and white is used. However, the present invention is also applicable to a counter which is discriminated by black-and-color and color. The present embodiment will be explained hereinafter.

<Explanation of Counter Upper Limit Value Setting Process>

Hereinafter, the counter upper limit value setting process in the image processing apparatus according to the third embodiment of the present invention will be explained with reference to flow charts shown in FIGS. 46 and 47.

In the image processing apparatus according to the present embodiment is equipped with a "the number of read originals (black and white)" counter, a "the number of read originals (color)" counter, a "the number of output images from own apparatus (black and white)" counter, a "the number of output images from own apparatus (color)" counter, a "the number of output images received externally (black and white)" counter and a "the number of output images received externally (color)". However, the image processing apparatus according to the present embodiment can be of course equipped with other counters.

Figure 46:
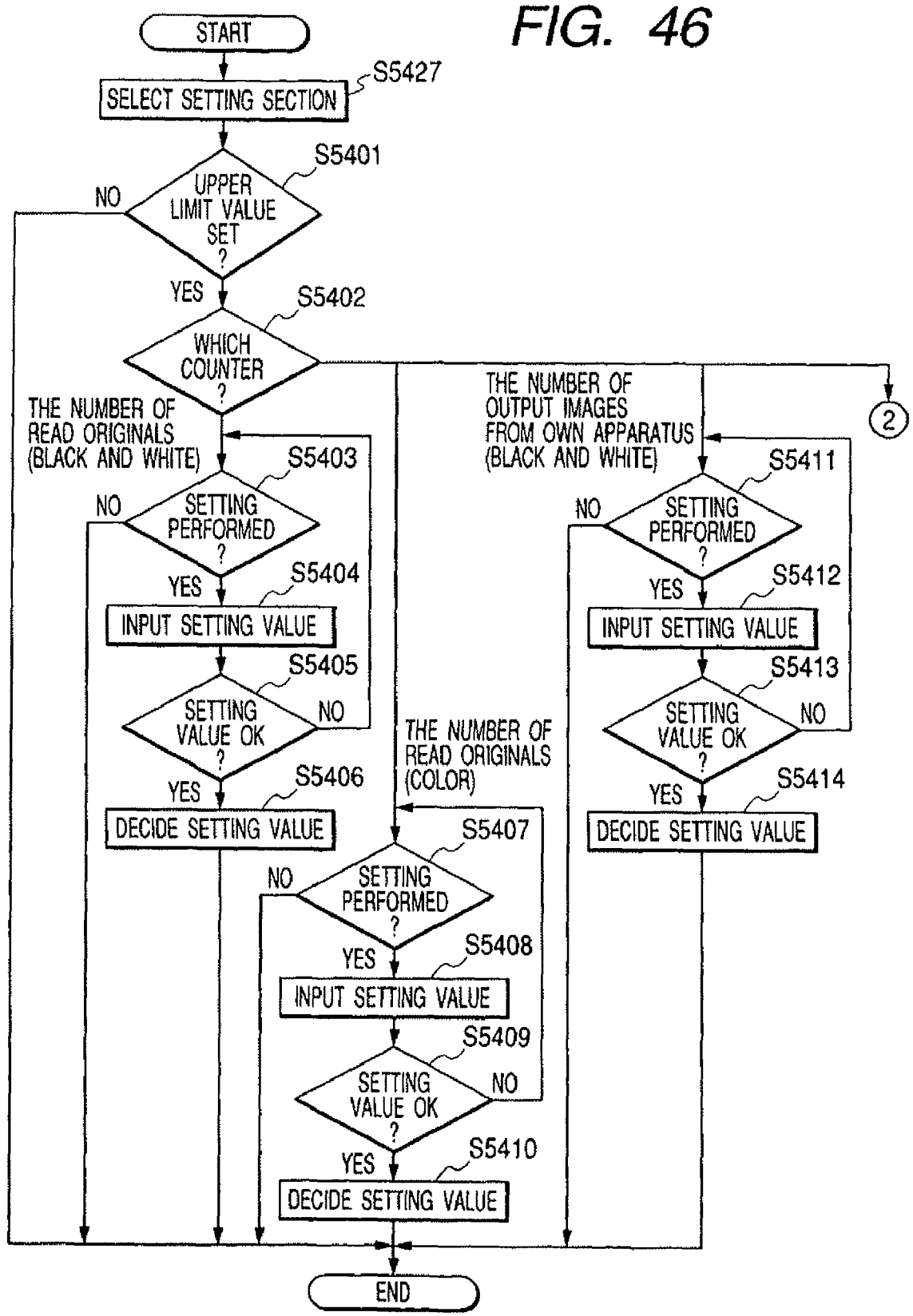
FIG. 46 is a flow chart showing an example of an eighth control process procedure by the image processing apparatus according to the present invention.
Figure 47:
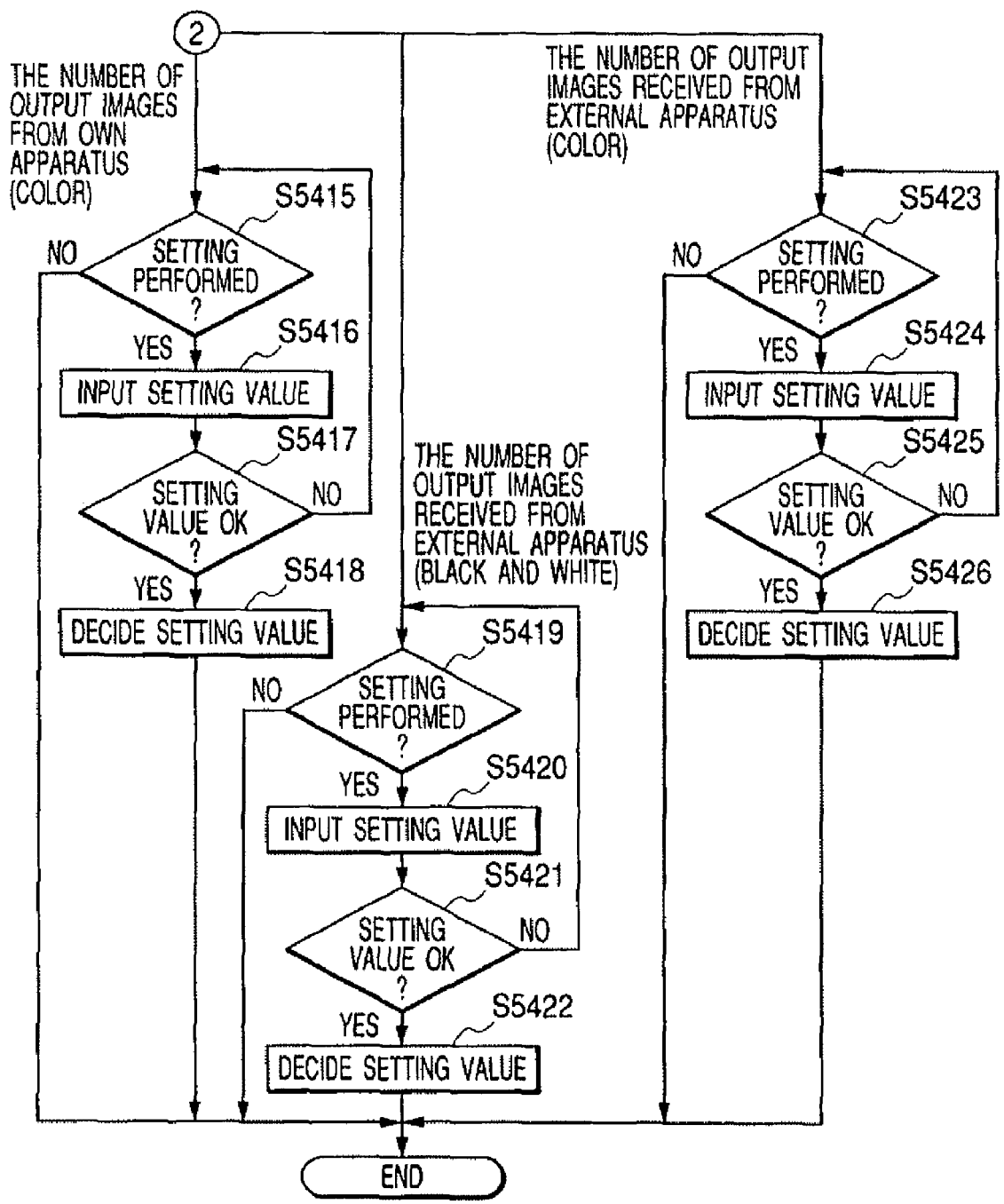
FIG. 47 is a flow chart showing the example of the eighth control process procedure by the image processing apparatus according to the present invention.

FIGS. 46 and 47 are flow charts showing an example of an eighth control process procedure by the image processing apparatus according to the present invention, and these flow charts correspond to the example of the counter upper limit value setting process procedure (i.e., the procedure to set the upper limit value of the counter when the count is performed discriminatively in black-and-white and color by the image processing apparatus capable of performing color input and output processes) in the third embodiment. Here, it is assumed that the process in the flow charts is performed by the CPU 112 shown in FIG. 4 based on the program stored in the ROM 114 or other storage medium, and symbols S5401 to S5427 denote respective steps.

First, in the step S5427, the section to which the user intends to set the upper limit value is selected on the section ID selection display portion 2601 of the section selection screen shown in FIG. 26. Then, it is judged in the step S5401 whether or not to set the upper limit value. For example, when it is detected that the cancel button 2603 shown in FIG. 26 is depressed by the user, it is judged that the upper limit value setting is not performed, and the process ends. On the contrary, when it is detected that the OK button 2602 shown in FIG. 26 is depressed, it is judged that the upper limit value setting is performed, and the flow advances to the step S5402.

In the step S5402, the user selects the upper limit value of any of the "the number of read originals (black and white)" counter, the "the number of read originals (color)" counter, the "the number of images output by the own apparatus (black and white)" counter, the "the number of images output by the own apparatus (color)" counter, the "the number of outside-transmitted images (black and white)" counter, the "the number of outside-transmitted images (color)" counter, and the "the number of externally received output images (black and white)" counter and the "the number of externally received output images (color)" counter (the counter selection display portion 2701, and the OK button 2702).

When the upper limit value of the "the number of read originals (black and white)" counter is selected and designated, the flow advances to the step S5403 to display the confirmation screen shown in FIG. 28 on the operation unit, whereby it is confirmed by the user whether or not the setting is really performed. When the setting is not performed (when it is detected that the cancel button 2802 shown in FIG. 28 is depressed), the process ends as it is. On one hand, when the setting is performed (when it is detected that the OK button 2801 shown in FIG. 28 is depressed), the flow advances to the step S5404.

In the step S5404, the upper limit value (i.e., the setting value of the upper limit value of the number of the read originals) is actually input by the user with use of the numeric keys 3004 of the operation unit shown in FIG. 29, whereby the value of the counter upper limit value setting portion 2901 is set. Then, in response to the depression of the OK key 2902, when any problem does not occur in the input value (YES in the step S5405), the value of the counter upper limit value setting portion 2901 shown in FIG. 29 is decided (S5406). On the contrary, when a problem occurs in the input value (NO in the step S5405), the flow returns to the step S5403.

On one hand, when the upper limit value of the "the number of read originals (color)" counter is selected and designated, the flow advances to the step S5407 to display the confirmation screen shown in FIG. 28 on the operation unit, whereby it is confirmed by the user whether or not the setting is really performed. When the setting is not performed (when it is detected that the cancel button 2802 shown in FIG. 28 is depressed), the process ends as it is. However, when the setting is performed (when it is detected that the OK button 2801 shown in FIG. 28 is depressed), the flow advances to the step S5408.

In the step S5408, the upper limit value (i.e., the setting value of the upper limit value of the number of the read originals) is actually input by the user with use of the numeric keys 3004 of the operation unit shown in FIG. 29, whereby the value of the counter upper limit value setting portion 2901 is set. Then, in response to the depression of the OK key 2902, when any problem does not occur in the input value (YES in the step S5409), the value of the counter upper limit value setting portion 2901 shown in FIG. 29 is decided (S5410). On the contrary, when a problem occurs in the input value (NO in the step S5409), the flow returns to the step S5407.

Besides, in the step S5402, when the upper limit value of the "the number of images output by the own apparatus (black and white)" counter is selected and designated by the user, the flow advances to the step S5411 to display the confirmation screen shown in FIG. 28 on the operation unit, whereby it is confirmed by the user whether or not the setting is really performed. Then, when the setting is not performed (when it is detected that the cancel button 2802 shown in FIG. 28 is depressed), the process ends as it is. On the contrary, when the setting is performed (when it is detected that the OK button 2801 shown in FIG. 28 is depressed), the flow advances to the step S5412.

In the step S5412, the counter upper limit value setting portion 2901 is selected, the upper limit value (i.e., the setting value of the upper limit value of the number of the images output by the own apparatus) is actually input by the user with use of the numeric keys 3004, and then the OK key 2902 is depressed. Then, when any problem does not occur in the input value (YES in the step S5413), the value of the counter upper limit value setting portion 2901 shown in FIG. 29 is decided (S5414). On the contrary, when a problem occurs in the input value (NO in the step S5413), the flow returns to the step S5411.

On one hand, in the step S5402, when the upper limit value of the "the number of images output by the own apparatus (color)" counter is selected and designated by the user, the flow advances to the step S5415 to display the confirmation screen shown in FIG. 28 on the operation unit, whereby it is confirmed by the user whether or not the setting is really performed. Then, when the setting is not performed (when it is detected that the cancel button 2802 shown in FIG. 28 is depressed), the process ends as it is. On the contrary, when the setting is performed (when it is detected that the OK button 2801 shown in FIG. 28 is depressed), the flow advances to the step S5416.

In the step S5416, the counter upper limit value setting portion 2901 is selected, the upper limit value (i.e., the setting value of the upper limit value of the number of the images output by the own apparatus) is actually input by the user with use of the numeric keys 3004, and then the OK key 2902 is depressed. Then, when any problem does not occur in the input value (YES in the step S5417), the value of the counter upper limit value setting portion 2901 shown in FIG. 29 is decided (S5418). On the contrary, when a problem occurs in the input value (NO in the step S5417), the flow returns to the step S5415.

Besides, in the step S5402, when the upper limit value of the "the number of externally received output images (black and white)" counter is selected and designated, the flow advances to the step S5419 to display the confirmation screen shown in FIG. 28 on the operation unit, whereby it is confirmed by the user whether or not the setting is really performed. Then, when the setting is not performed (when it is detected that the cancel button 2802 shown in FIG. 28 is depressed), the process ends as it is. On the contrary, when the setting is performed (when it is detected that the OK button 2801 shown in FIG. 28 is depressed), the flow advances to the step S5420.

In the step S5420, the upper limit value (i.e., the setting value of the upper limit value of the number of the output images externally received) is actually input by the user with use of the numeric keys 3004 of the operation unit shown in FIG. 29, whereby the value of the counter upper limit value setting portion 2901 is set. Then, in response to the depression of the OK key 2902, when any problem does not occur in the input value (YES in the step S5421), the value of the counter upper limit value setting portion 2901 shown in FIG. 29 is decided (S5422). On the contrary, when a problem occurs in the input value (NO in the step S5421), the flow returns to the step S5419.

Besides, in the step S5402, when the upper limit value of the "the number of externally received output images (color)" counter is selected and designated, the flow advances to the step S5423 to display the confirmation screen shown in FIG. 28 on the operation unit, whereby it is confirmed by the user whether or not the setting is really performed. Then, when the setting is not performed (when it is detected that the cancel button 2802 shown in FIG. 28 is depressed), the process ends as it is. On the contrary, when the setting is performed (when it is detected that the OK button 2801 shown in FIG. 28 is depressed), the flow advances to the step S5424.

In the step S5424, the upper limit value (i.e., the setting value of the upper limit value of the number of the output images externally received) is actually input by the user with use of the numeric keys 3004 of the operation unit shown in FIG. 29, whereby the value of the counter upper limit value setting portion 2901 is set. Then, in response to the depression of the OK key 2902, when any problem does not occur in the input value (YES in the step S5425), the value of the counter upper limit value setting portion 2901 is decided (S5426). On the contrary, when a problem occurs in the input value (NO in the step S5425), the flow returns to the step S5423.

Incidentally, it is assumed that the upper limit values decided in the steps S5406, S5410, S5414, S5418, S5422 and S5426 are stored, in regard to each user ID, in the nonvolatile memory of the SRAM 136 or the HD 162 shown in FIG. 4. A medium which stores the upper limit values may be a storage medium of any type capable of holding these values even if a power supply is turned off.

<Explanation of Counter Display Process>

Hereinafter, the counter display process in the image processing apparatus according to the third embodiment of the present invention will be explained with reference to FIGS. 48 to 51.

Figure 48:
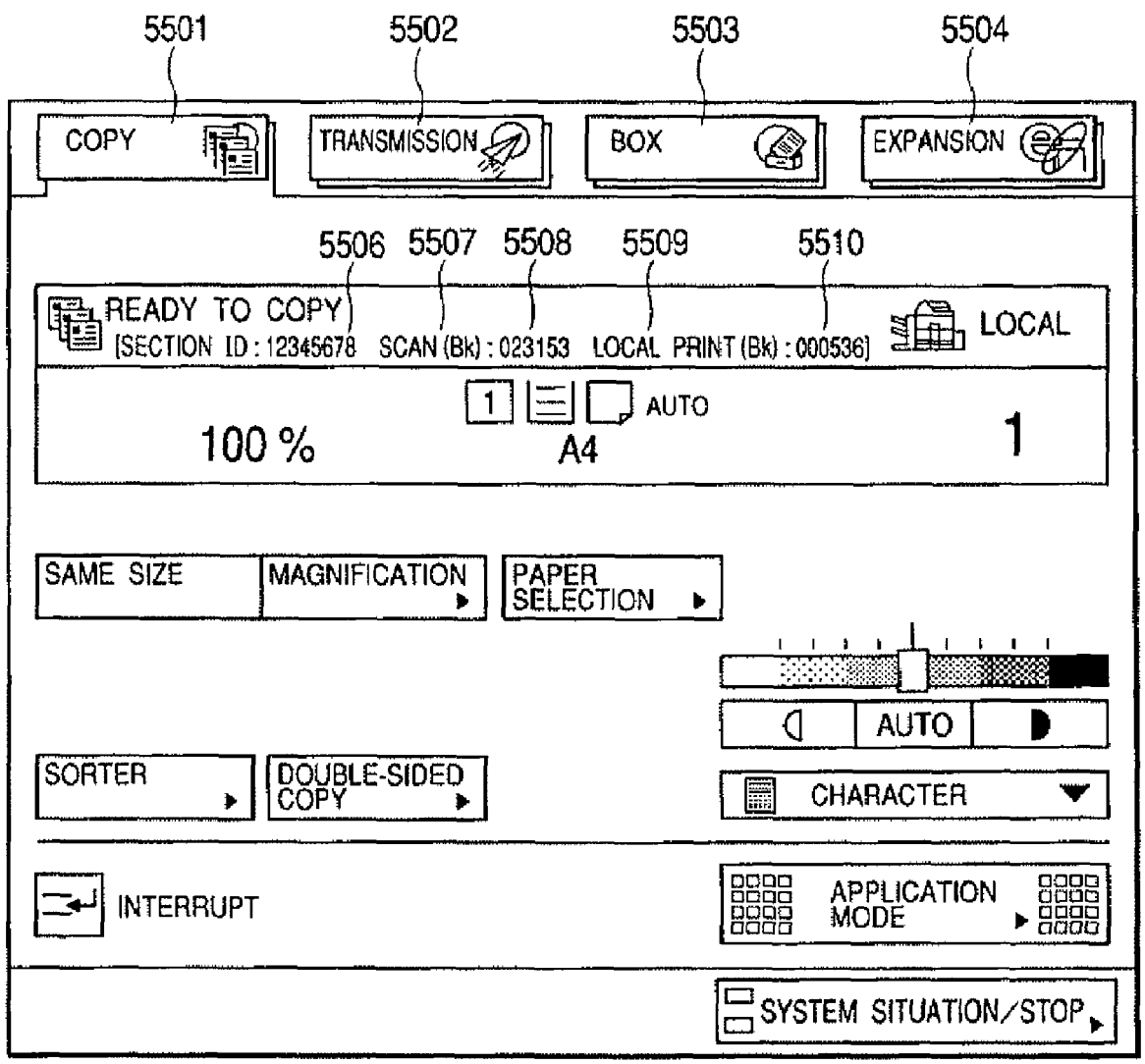
FIG. 48 is a pattern diagram showing an example of the copy main screen on which the counter is displayed, in the image processing apparatus according to the third embodiment of the present invention.

FIG. 48 is a pattern diagram showing an example of the copy main screen on which the counter is displayed, in the image processing apparatus according to the third embodiment of the present invention.

In FIG. 48, numeral 5506 denotes a section number. That is, the section number read by the card reader 155 shown in FIG. 1 and stored in the magnetic card or the IC card, the section number input through the ID key 3005, or the section number corresponding to the user ID is displayed as the section number 5506.

Numerals 5507 and 5509 denote discrimination symbols. The symbols 5507 and 5509 represent that any of the "the number of read originals (black and white)" counter, the "the number of read originals (color)" counter, the "the number of images output by the own apparatus (black and white)" counter, the "the number of images output by the own apparatus (color)" counter, the "the number of outside-transmitted images (black and white)" counter, and the "the number of outside-transmitted images (color)" counter is currently displayed.

Incidentally, it is assumed to select and the display the counter which is closest to the upper limit value from among the counters that the remaining number is necessary for the current setting mode.

Numerals 5508 and 5510 denote portions on the screen on where the remaining number up to the upper limit value of the currently selected counter is displayed.

Figure 49:
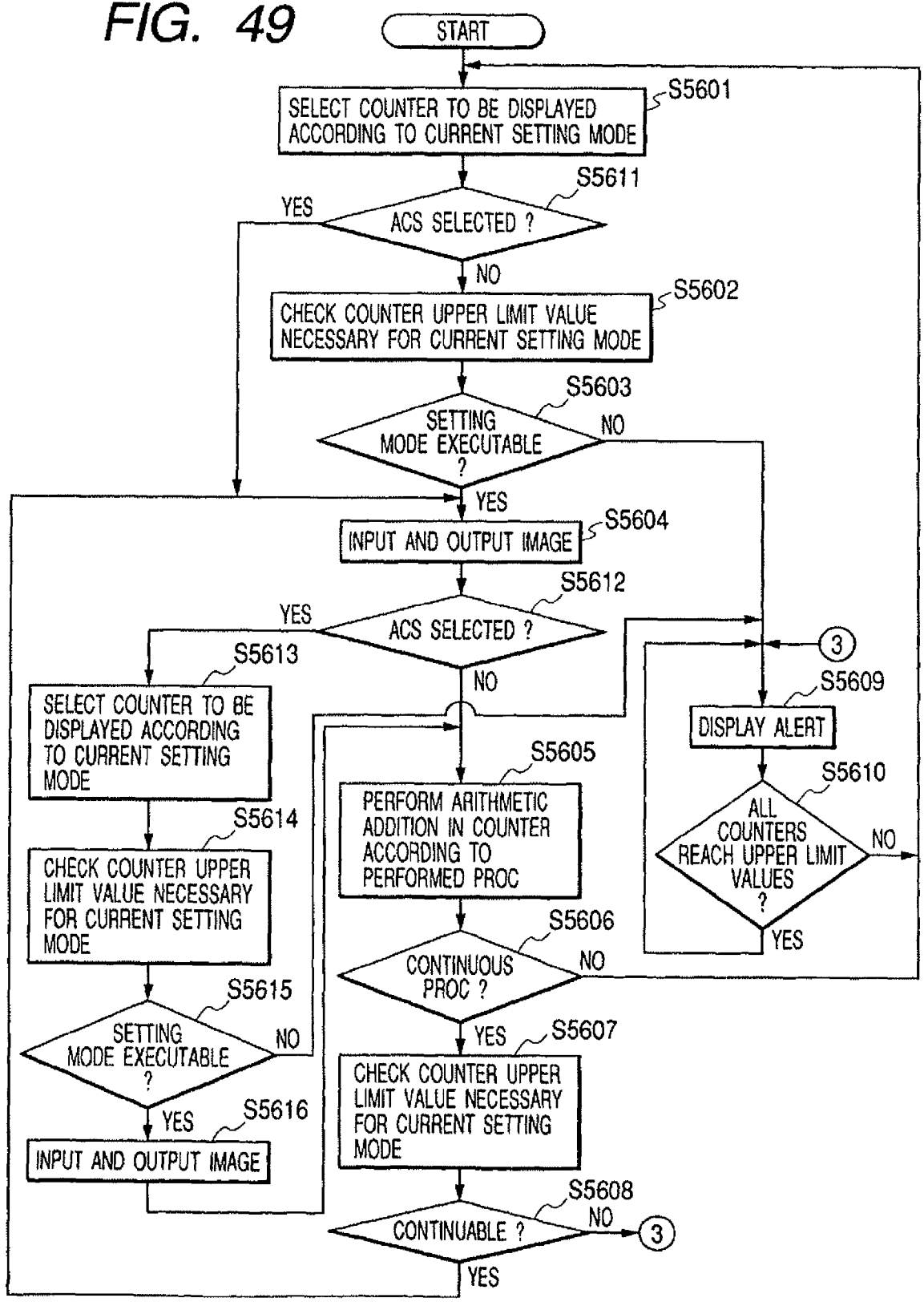
FIG. 49 is a flow chart showing an example of a ninth control process procedure by the image processing apparatus according to the present invention.

FIG. 49 is a flow chart showing an example of a ninth control process procedure by the image processing apparatus according to the present invention, and this flow chart corresponds to the example of the counter display process procedure in the third embodiment. Here, it is assumed that the process in this flow chart is performed by the CPU 112 shown in FIG. 4 based on the program stored in the ROM 114 or other storage medium, and symbols S5601 to S5616 denote respective steps.

First, in the step S5601, the counter according to the current setting mode is selected. Here, the details concerning which counter is displayed in regard to which setting mode are shown in FIG. 50.

As shown in FIG. 50, when the local copy (black and white) mode is set, the path to read the original and output the read image by the own apparatus is used, the "the number of read originals (black and white)" counter (shown as a read original number counter (black and white) in FIG. 50) and the "the number of images output by the own apparatus (black and white)" counter (shown as an own apparatus image output number counter (black and white) in FIG. 50) are selected and displayed on the operation unit. Further, when the local copy (color) mode is set, the path to read the original and output the read image by the own apparatus is used, the "the number of read originals (color)" counter (shown as a read original number counter (color) in FIG. 50) and the "the number of images output by the own apparatus (color)" counter (shown as an own apparatus image output number counter (color) in FIG. 50) are selected and displayed on the operation unit. Furthermore, when the local copy (color undecided) mode (e.g., ACS (auto color select) mode) is set, the color mode is undecided until the original is once scanned, whereby the "the number of read originals (close to the upper limit value in black-and-white and color)" counter and the "the number of images output by the own apparatus (close to the upper limit value in black-and-white and color)" counter are selected and displayed on the operation unit by default.

Moreover, when the box (storage) mode is set, it is controlled only to read the original, whereby the "the number of read originals (black and white)" counter and the "the number of read originals (color)" counter are selected and displayed on the operation unit. Moreover, when the box (output) mode is set, it is controlled only to output the image by the own apparatus, whereby the "the number of images output by the own apparatus (black and white)" counter and the "the number of images output by the own apparatus (color)" counter are selected and displayed on the operation unit.

Besides, when the print (reception) mode is set, it is controlled only to output the image externally received, whereby the "the number of externally received output images (black and white)" counter (shown as an externally received image output number counter (black and white) in FIG. 50) and the "the number of externally received output images (color)" counter (shown as an externally received image output number counter (color) in FIG. 50) are selected and displayed on the operation unit. Moreover, when the print (transmission) mode is set, it is controlled only to read the original, whereby the "the number of read originals (black and white)" counter and the "the number of read originals (color)" counter are selected and displayed on the operation unit. Here, it is assumed that the above counters are stored, in regard to each user ID, in the administration apparatus 171 of FIG. 4.

Next, it is judged in the step S5611 whether or not the ACS is selected. When it is judged that the ACS is not selected (i.e., color mode is decided), the flow advances to the step S5602 to perform the upper limit value comparison (check). On the contrary, when it is judged that the ACS is selected, since the upper limit value comparison cannot be performed until the color mode is decided by performing original pre-scan, the flow advances to the step S5604.

In the step S5602, the upper limit value of the counter that the remaining number is necessary for the current setting mode is checked. The details of the check are shown in FIG. 51.

As shown in FIG. 51, to execute the local copy (black and white) mode that the original read by the own apparatus and the image output by the own apparatus are necessary, the "the number of read originals (black and white)" counter and the "the number of images output by the own apparatus (black and white)" counter only have not to reach the respective upper limit values. Further, to execute the local copy (color) mode that the original read by the own apparatus and the image output by the own apparatus are necessary, the "the number of read originals (color)" counter and the "the number of images output by the own apparatus (color)" counter only have not to reach the respective upper limit values.

Furthermore, to execute the box (storage, black and white) mode that the image read by the own apparatus is stored in the memory, the "the number of images output by the own apparatus (black and white)" counter only has not reach the upper limit value. Moreover, to execute the box (storage, color) mode that the image read by the own apparatus is stored in the memory, the "the number of read originals (color)" counter only has not to reach the upper limit value. Moreover, to execute the box (output, black and white) mode that the image stored in the memory of the own apparatus is output by the own apparatus, the "the number of images output by the own apparatus (black and white)" counter only has not to reach the upper limit value. Moreover, to execute the box (output, color) mode that the image stored in the memory of the own apparatus is output by the own apparatus, the "the number of images output by the own apparatus (color)" counter only has not to reach the upper limit value.

Besides, to execute the print (reception, black and white) mode that the image received from the external apparatus is output by the own apparatus, the "the number of externally received output images (black and white)" counter only has not to reach the upper limit value. Further, to execute the print (reception, color) mode that the image received from the external apparatus is output by the own apparatus, the "the number of externally received output images (color)" counter only has not to reach the upper limit value. Furthermore, to execute the print (transmission, black and white) mode that the image read by the own apparatus is transmitted to the external apparatus, the "the number of read originals (black and white)" counter only has not to reach the upper limit value. Furthermore, to execute the print (transmission, color) mode that the image read by the own apparatus is transmitted to the external apparatus, the "the number of read originals (color)" counter only has not to reach the upper limit value.

Like this, as a result of the upper limit value check of the counter that the remaining number is necessary for the current setting mode in the step S5602, when it is judged in the step S5603 that the any of the counters that the remaining number is necessary for the current setting mode reaches the upper limit value and thus the process in the setting mode cannot be performed, the flow advances to the step S5609 to notify with an alert the user of impossibility of process continuation. An example of the notification screen is shown in FIG. 52.

Figure 52:
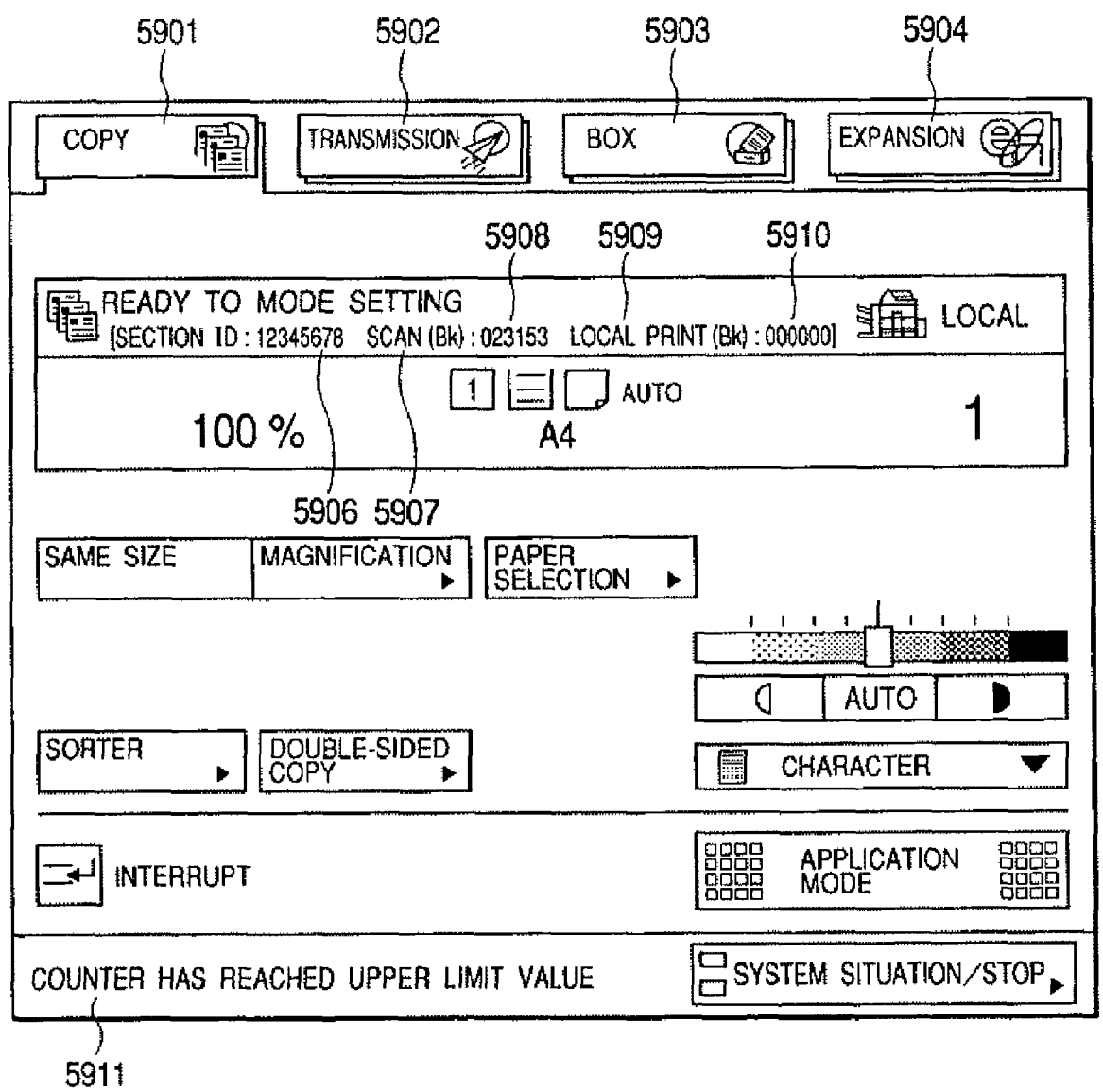
FIG. 52 is a pattern diagram showing an example of the operation unit screen when a counter in the image forming apparatus capable of performing color input and output reaches the upper limit value.

In FIG. 52, the local copy (black and white) mode is set, whereby the "the number of read originals (black and white)" counter and the "the number of images output by the own apparatus (black and white)" counter which are the counters that the remaining number is necessary for the local copy (black and white) are displayed as indicated by items 5907 to 5910.

In these counters, since the remaining number of the "the number of images output by the own apparatus (black and white)" counter is "0" as indicated by the item 5910, a message 5911 is displayed to notify the user of impossibility of process continuation.

Next, when it is judged in the step S5610 of FIG. 49 that all the counters reach the respective upper limit values, the alert display in the step S5609 is repeated to inhibit other process until the upper limit value is changed or the current count value is cleared.

On the contrary, when it is judged in the step S5610 that the counter which does not reach the upper limit value exists (i.e., NO in step S5610), the flow returns to the step S5601 to check the upper limit value of the counter that the remaining number is necessary for the current setting mode, because the process can be still performed according to the setting mode.

On one hand, when it is judged in the step S5603 that the process can be performed, the flow advances to the step S5604. Then, when the process is performed by, e.g., depressing the start key 3006 shown in FIG. 1, the flow advances to input and output the image in the designated mode.

Next, it is judged in the step S5612 whether or not the ACS (auto color select) is set. When it is judged that the ACS is not set, the process is performed as it is, and the counter according to the counter is added (step S5605).

On the contrary, when it is judged in the step S5612 that the ACS is set, the flow advances to the step S5613 to select the counter according to the current setting mode in regard to the color mode decided by the original pre-scan initially performed in the image input and output process (S5604). Then, in the step S5614, the upper limit value of the counter that the remaining number is necessary for the current setting mode is checked.

Next, based on the result of the upper limit value check in the step S5614, it is judged in the step S5615 whether or not the process in the setting mode can be performed. When it is judged that the process in the setting mode cannot be performed, the flow advances to the step S5609 to notify the user that the process cannot be performed.

On the contrary, when it is judged in the step S5615 that the process in the setting mode can be performed as the result of the upper limit value check in the step S5614, the flow advances to the step S5616 to perform the image input and output process. Then, the flow further advances to the step S5605 to add the counter according to the process.

Next, it is judged in the step S5606 whether or not the continuous process is performed. In the continuous process, for example, the plural number is set by using the numeric keys 3004 shown in FIG. 11, or the plural originals are put on the not-shown feeder, whereby the images are continuously read and output. When it is judged that the continuous process is performed, the upper limit value of the counter that the remaining number is necessary for the current setting mode is checked in the step S5607 every time one process is performed. In this case, the procedure of the check is the same as that explained in the step S5602. As a result, when it is judged in the step S5608 that the mode being currently executed cannot be continued, the flow advances to the step S5609 to perform the alert display and interrupt the current process.

On the contrary, when it is judged in the step S5608 that the mode being currently executed can be further continued, the flow advances to the step S5604 to perform the image input and output process. After a series of the processes ended, when the currently executed job ends, it is judged in the step S5606 that the continuous process is not performed, and the flow returns to the step S5601.

In the present embodiment, the black-and-white/color copy function, the black-and-white/color box function and the black-and-white/color print function are explained as the functions of the MFP. However, the present invention also includes other functions which can be controlled and administrated by the combinations of the counters respectively administrating the upper limit values of the number of read originals, the number of images output by the own apparatus, and the number of externally received output images in black-and-white and color.

As explained above, according to the present embodiment, in the image processing apparatus capable of performing the color input and output process, the plural kinds of number-of-image information representing the number of read originals and the number of output images, and their respective upper limit values or the remaining numbers are displayed on the operation unit. That is, in black-and-white and color, the plural kinds of number-of-image information representing the number of read originals, the number of output images by the own apparatus and the number of actual output images externally received, and their respective upper limit values, or (for simplification) the values respectively obtained by subtracting the current numbers from the upper limit values (the remaining number of images capable of being read and output) are displayed according to the mode setting performed by the user for the image output. In other words, (1) it is judged which of the black-and-white mode, the color mode and the color mode undecided is set, (2) it is judged which of the plural counters is used in the setting mode, and the combination of the plural counters is selected and displayed. Alternatively, when the color mode is undecided, either one of the counters in black-and-white and color closer to the upper limit value is displayed. Besides, in the case where the color mode is undecided, the display is changed to correspond to the decided mode at the time when the color mode is decided. Thus, the user can easily recognize the counter information.

Besides, in the case where any of the counters reaches the upper limit value, the alert (notification of process impossibility) is issued to the user when he intends to execute the mode incapable of being achieved only by the counters which do not reach the upper limit values. On the contrary, when the process can be achieved only by the counters which do not reach the upper limit values, it enables the user to perform the process in question, thereby making easy to restart the process in the case where any of the counters reaches the upper limit value.

Fourth Embodiment

In the first embodiment, it is explained that, from among the counters that the remaining number is necessary for the current setting mode, the counter closest to the upper limit value is selected and displayed. However, it is possible to select and display the counter closest to the upper limit value from among the plural counters belonging to the same administration section. Hereinafter, the present embodiment concerning such a process will be explained.

<Explanation of Counter Display Process>

Hereinafter, the counter display process in the image processing apparatus according to the fourth embodiment of the present invention will be explained with reference to FIGS. 53 and 54.

Figure 53:
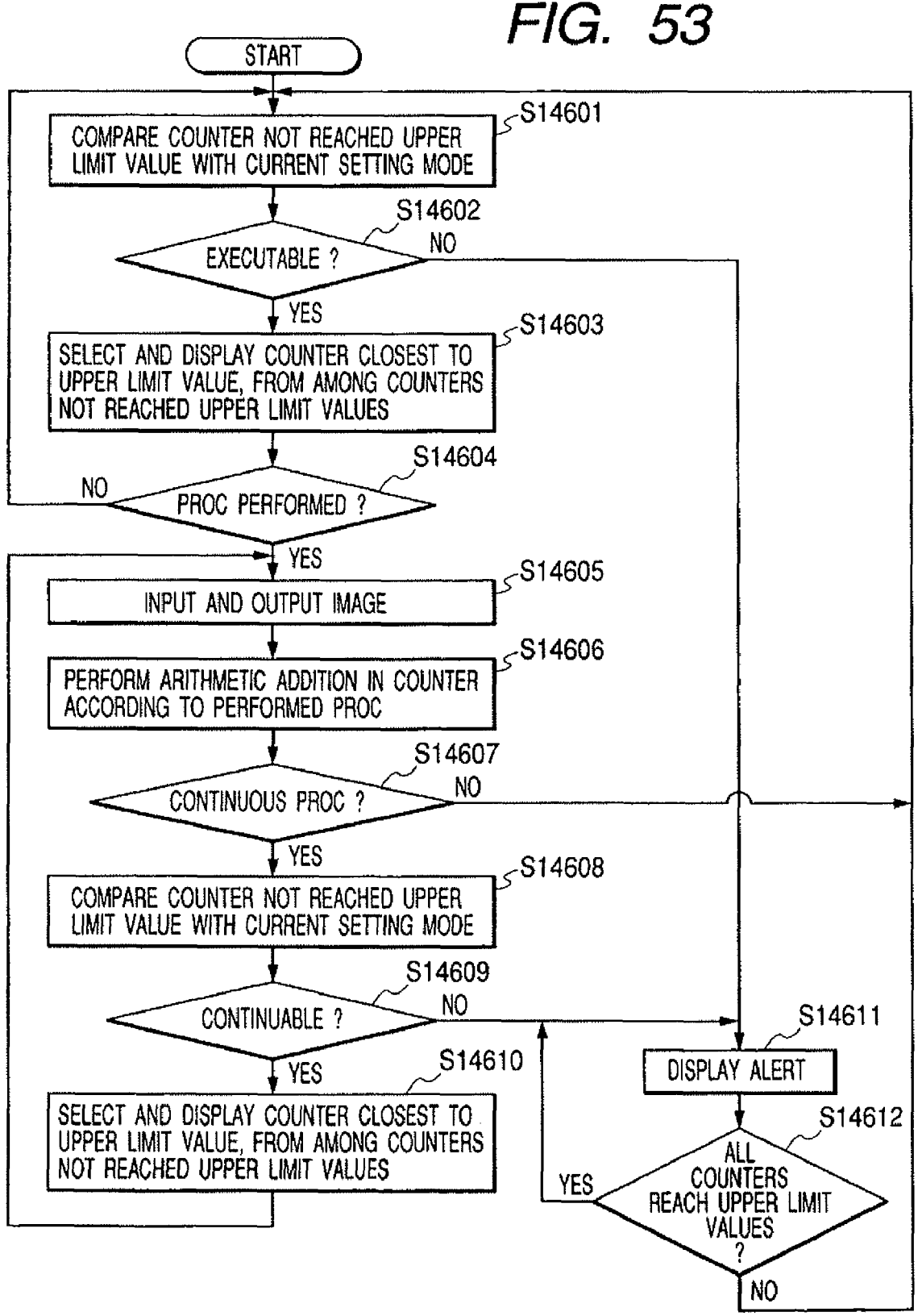
FIG. 53 is a flow chart showing an example of a tenth control process procedure by the image processing apparatus according to the present invention.

FIG. 53 is a flow chart showing an example of a tenth control process procedure by the image processing apparatus according to the present invention, and this flow chart corresponds to an example of a counter display process procedure in the fourth embodiment. Here, it is assumed that the process in this flow chart is performed by the CPU 112 shown in FIG. 4 based on the program stored in the ROM 114 or other storage medium, and symbols S14601 to S14612 denote respective steps.

First, in the step S14601, the counter which belongs to the same administration section corresponding to the current user ID and does not reach the upper limit value is compared with the current setting mode. The details of the comparison are shown in FIG. 54. Here, in FIG. 54, symbol "x" represents that the counter has reached the upper limit value, and a blank represents that the counter does not reach the upper limit value.

As shown in FIG. 53, when none of the "the number of read originals" counter (shown as a read original number counter in FIG. 54), the "the number of output images from own apparatus" counter (shown as an own apparatus image output number counter in FIG. 54) and the "the number of output images received externally" counter (shown as an externally received image output number counter in FIG. 54) reach the respective upper limit values, any process of the local copy (copy) process that the original read by the own apparatus and the image output by the own apparatus are necessary, the box (storage) process that the image read by the own apparatus is stored in the memory, the box (output) process that the image stored in the memory of the own apparatus is output by the own apparatus, the print (transmission) process that the image read by the own apparatus is transmitted to the external apparatus, and the print (reception) process that the image received from the external apparatus is output by the own apparatus can be performed.

Besides, when only the "the number of read originals" counter reaches the upper limit value, only the box (output) process that the image stored in the memory of the own apparatus is output by the own apparatus and the print (reception) process that the image received from the external apparatus is output by the own apparatus can be performed.

Moreover, when only the "the number of images output by the own apparatus" counter reaches the upper limit value, only the box (storage) process that the image read by the own apparatus is stored in the memory, the print (transmission) process that the image read by the own apparatus is transmitted to the external apparatus, and the print (reception) process that the image received from the external apparatus is output by the own apparatus can be performed.

Moreover, when only the "the number of read originals" counter and the "the number of images output by the own apparatus" counter reach the respective upper limit values, only the print (reception) process that the image received from the external apparatus is output by the own apparatus can be performed.

Moreover, when only the "the number of externally received output images" counter reaches the upper limit value, only the local copy (copy) process that the original read by the own apparatus and the image output by the own apparatus are necessary, the box (storage) process that the image read by the own apparatus is stored in the memory, the box (output) process that the image stored in the memory of the own apparatus is output by the own apparatus, and the print (transmission) process that the image read by the own apparatus is transmitted to the external apparatus can be performed.

Moreover, when only the "the number of read originals" counter and the "the number of externally received output images" counter reach the respective upper limit values, only the box (output) process that the image stored in the memory of the own apparatus is output by the own apparatus can be performed.

Moreover, when only the "the number of images output by the own apparatus" counter and the "the number of externally received output images" counter reach the respective upper limit values, only the box (storage) process that the image read by the own apparatus is stored in the memory, and the print (transmission) process that the image read by the own apparatus is transmitted to the external apparatus can be performed.

Moreover, when the "the number of read originals" counter, the "the number of images output by the own apparatus" counter and the "the number of externally received output images" counter all reach the respective upper limit values, of course any process cannot be performed. Here, it is assumed that the above counters are stored, in regard to each user ID, in the administration apparatus 171 of FIG. 4.

Then, based on the comparison process in the step S14601 that the counter which does not reach the upper limit value is compared with the current setting mode, it is then judged in the step S14602 whether or not the process in the setting mode can be performed. When it is judged that the setting mode cannot be executed, the flow advances to the step S14611 of displaying an alert to notify the user of impossibility of mode execution. An example of such a notification screen is the same as that of the first embodiment shown in FIG. 34.

Next, when it is judged in the step S14612 of FIG. 53 that all the counters have reached the respective upper limit values, the alert display in the step S14611 is repeated, so that other process cannot be performed until the upper limit value is changed or the current counted value is cleared.

On the contrary, when it is judged in the step S14612 of FIG. 53 that there is the counter which does not reach the upper limit value (i.e., NO in the step S14612), the flow returns to the step S14601 to again compare the counter which does not reach the upper limit value with the current setting mode, because the process can be still performed according to the setting mode.

Incidentally, when it is judged in the step S14602 that the process in the setting mode in question can be performed (executed), the flow advances to the step S14603 to select the counter closest to the upper limit value from among the counters which belong to the same administration section corresponding to the current user ID and do not yet reach the respective upper limit values, and display the selected counter on the operation unit (same as FIG. 31 of the first embodiment).

In this state, when the process is not performed (NO in the step S14604), the flow returns to the step S14601. On the contrary, when the process is performed by, e.g., depressing the start key 3006 shown in FIG. 11 (YES in the step S14604), the flow advances to the step S14605 to input and output the image in the designated mode. Then, the counter (i.e., the value of the counter) according to the process in question is arithmetically added (step S14606).

Next, it is judged in the step S14607 whether or not a continuous process is performed. In the continuous process, for example, plural number is set by using the numeric keys 3004 shown in FIG. 11, or plural originals are put on a not-shown feeder, whereby the images are continuously read and output. In any case, when it is judged that the continuous process is performed, in the step S14608, the upper limit value of the counter which does not reach the upper limit value is compared with the current setting mode. In this case, the procedure in the step S14608 is the same as that in the step S14601. As a result, when it is judged in the step S14609 that the mode being currently executed cannot be continued, the flow advances to the step S14611 to perform the alert display and interrupt the current process.

On the contrary, when it is judged in the step S14609 that the mode being currently executed can be further continued, the flow advances to the step S14610 to select the counter closest to the upper limit value from among the counters which belong to the same administration section corresponding to the current user ID and do not yet reach the respective upper limit values, and display the selected counter on the operation unit, as well as the step S14603. Then, the flow returns to the step S14605 to perform next image input and output. After a series of the processes ended, when the currently executed job ends, it is judged in the step S14607 that the continuous process is not performed, and the flow returns to the step S14601.

In the present embodiment, the copy function, the box function and the print function are explained as the functions of the MFP. However, the present invention also includes other functions which cannot be controlled and administrated by the combinations of the counters respectively administrating the upper limit values of the number of read originals, the number of images output by the own apparatus, and the number of externally received output images.

As explained above, according to the present embodiment, the counter closest to the upper limit value is selected from among the counters which belong to the same administration section and the selected counter is displayed on the operation unit, whereby it is easy for the user to confirm the counter information. Besides, in the case where any of the counters reaches the upper limit value, the alert (notification of process impossibility) is issued to the user when he intends to execute the mode incapable of being achieved only by the counters which do not reach the respective upper limit values. Moreover, to enable the user to easily execute the mode capable of being achieved only by the counters which do not reach the respective upper limit values, the counters closer to the upper limit value are selected in sequence from among the counters which do not reach the respective upper limit values and the selected counters are displayed on the operation unit. Thus, the user can easily restart the process in the case where any of the counters reached the upper limit value.

In the above embodiments, the current counter value and the upper limit value are displayed on the operation unit. However, a remaining number which is obtained by subtracting the current counter value from the upper limit value may be displayed as the information based on the current counter value and the upper limit value.

Incidentally, the structure obtained by appropriately combining the structures of the above first to fourth embodiments is also included in the present invention. Moreover, for example, under the condition that inconsistency does not occur, an image processing apparatus, an image processing system, an image processing method, an image processing program, and a storage medium of storing the program which can achieve all of the above embodiments may be provided. Although it is not explicitly described in the second to fourth embodiments, the structural components which can be handled to be the same as those explained in detail in the first embodiment are respectively included in the second to fourth embodiments. Moreover, for example, an image processing apparatus, an image processing system, an image processing method, an image processing program, and a storage medium of storing the program which extract the structural components of the characteristic portions from among the structural components of the above embodiments may be provided, and the structural components other than the extracted structural components may be applied to, e.g., an external or other image processing apparatus, an external or other image processing system, an external or other image processing method, an external or other image processing program, and an external or other storage medium of storing the program. In any case, it only has to be able to provide easy-to-use and optimum administration use environments for operators, administrators and users.

Incidentally, a form which can be commonly used in the first to fourth embodiments will be explained with reference to FIGS. 55A and 55B. FIGS. 55A and 55B are the diagrams showing an example of administration tables capable of being administrated by the CPU 112 of the image processing apparatus and the external apparatuses such as the PC's 180 and 190, according to the present invention. For example, the administration tables are stored and held in the memory of the control apparatus 110. More specifically, FIG. 55A shows an example of an upper limit value administration table which is used by the user (administrator) through the operation screens shown in FIGS. 26 to 29 to register and update the upper limit value information every time the upper limit value is registered. According to the process procedures shown in FIGS. 30 and 41 or the like, the CPU 112 writes and registers the setting data of the upper limit value to the item to be updated on the table shown in FIG. 55A, on the basis of the upper limit value setting information sent from the operation unit. Thus, the CPU 112 correlates the section names, the section ID's, the upper limit values of the respective processes with others and administrates them according to user's administration information, and then stores the upper limit value information of the counter in the memory in the form of table in regard to each section (ID).

Moreover, FIG. 55B shows an example of a counter total amount data administration table which is used to be able to administrate the total amount (i.e., the total number of counting times by the counter) of the images already processed up to now discriminatively in regard to each process. The CPU 112 controls to count up the value of the counter corresponding to the process concerning the image processing mode every time the mode is executed in the image processing apparatus, write and update the information concerning the counted value in the table, and reflect the process conditions up to now in the table. Like this, the administration by using the table as shown in FIG. 55B can be administrated so that the counter information representing how many images have been processed up to now in the image processing apparatus can be administrated in regard to each of the plural processes included in the image processing apparatus.

As above, the CPU 112 can perform the control in the above first to fourth embodiments, by using the administration tables as shown in FIGS. 55A and 55B.

Here, as explained in the above embodiments, it is controlled by the CPU 112 that the administration information shown in FIGS. 55A and 55B is displayed together with the operation screen when this operation screen of the image processing mode to be executed is displayed on the operation unit 150. However, the present invention is not limited to this. That is, it may be controlled by the CPU 112 to be able to display the information in a user's desired display form when the user requires it.

For example, when command data including an administration information acquisition request is input through the operation unit, the CPU 112 causes the operation unit to display the input data. Incidentally, it is determined, based on a user's request input through the operation unit, which of the administration table information shown in FIG. 55A and the administration table information shown in FIG. 55B should be displayed for the user. For example, the administration table information shown in FIG. 55B is referred by the CPU 112 and displayed on the operation unit in a first display mode by which the user can specify the counter information independently in regard to each of the items (items 1 to 8). Besides, for example, the administration table information shown in FIG. 55B is displayed on the operation unit in a second display mode by which the user can specify the counter information in regard to each of the classifications (A, B and C classifications). In this case, the counter values of the items included in one classification are counted up, and the obtained value is displayed for the user (e.g., displaying the counter information of A classification, the counter information of B classification, and the counter information of C classification on the same screen). Besides, for example, the administration table information shown in FIG. 55B is displayed on the operation unit in a second display mode by which the user can specify the counter information in regard to each of the classifications (A, B and C classifications). In this case, the counter values of the items included in one classification are counted up, and the obtained value is displayed for the user (e.g., displaying the counter information of A classification, the counter information of B classification, and the counter information of C classification discriminatively on the same screen). Besides, for example, the administration table information shown in FIG. 55B is displayed on the operation unit in a third display mode by which the user can specify the counter information discriminatively in black-and-white and color. In this case, the counter values of all of the black-and-white items 1, 3, 5 and 7 included in the items 1 to 8 are counted up, and the counter values of all of the color items 2, 4, 6 and 8 are counted up, and then the black-and-white counter information and the color counter information are displayed for the user (e.g., displaying the black-and-white counter information and the color counter information discriminatively on the same screen). Besides, for example, the administration table information shown in FIG. 55B is displayed on the operation unit in a fourth display mode by which the user selects any of the plural classifications (A to C) and the black-and-white counter information and the color counter information within the classification desirably selected by the user are displayed. More specifically, when the A classification is selected by the user, it is controlled by the CPU 112 that the counter information of the item 1 and the counter information of the item 2 are displayed discriminatively on the same operation screen. Besides, for example, the administration table information shown in FIG. 55B is displayed on the operation unit in a fifth display mode by which the plural kinds of counter information displayed independently in regard to the respective items are compiled in unit of classification and then displayed to the user. More specifically, in a state that the counter information of the item 1 of the A classification and the counter information of the item 2 of the A classification are being displayed discriminatively on the same operation screen in the fourth display mode, when the fifth display mode is selected by the user, it is controlled by the CPU 112 to change the display mode to the fifth display mode, count up the counter information of the item 1 and the counter information of the item 2 of the A classification, and then display the counted-up value as one counter information on the operation screen. Moreover, it may be controlled by the CPU 112 to provide these plural display modes and to be able to display (or present) the counter information to the user in the display mode selected by the user. Moreover, it may be controlled by the CPU 112 to provide at least any of these plural display modes. As described above, in accordance with the user's request, it is controlled by the CPU 112 to be able to present, to the user, the counter information of the administration table in the display mode desired by the user. Here, it should be noted that the display unit of the operation unit is described as an example of the notification unit. That is, as described above, it may be structured to be able to notify the user of the counter information by voice-outputting the administration information of FIGS. 55A and 55B in a user's desired form by using the voice output unit. Incidentally, of course, it is structured that the process of registering and writing the administration information in the administration table of FIG. 55A can be performed from the operation unit of the external apparatus such as the PC 180, the PC 190 or the like, and it is also structured that an inspection display process of the information in the administration table of FIG. 55B and the like can be performed from the operation unit of the external apparatus such as the PC 180, the PC 190 or the like by exchanging a status request command and status information.

Hereinafter, the architectures of data processing programs which can be read by the image processing apparatus according to the present invention will be explained with reference to a memory map shown in FIG. 56.

FIG. 56 is the pattern diagram for explaining the memory map of the storage medium storing various data processing programs capable of being read by the image processing apparatus according to the present invention.

Incidentally, although it is not illustrated specifically, information (including version information, creator information, etc.) for administrating the program groups stored in the storage medium is also stored in the storage medium, and information (including icon information for discriminatively displaying a program, etc.) depending on an OS or the like on the program reading side is occasionally stored in the storage medium.

Moreover, the data depending on the various programs are administrated by the directory shown in FIG. 56. Besides, programs or the like to uncompress installed programs and data are occasionally stored when the installed programs and data have been compressed.

Moreover, the functions of the above embodiments shown in FIGS. 30, 32, 39, 40, 41, 42, 45, 46, 47, 49 and 53 may be executed by the host computer based on externally installed programs. In this case, the present invention is applicable even in a case where an information group including programs is supplied from a storage medium (such as a CD-ROM, a flash memory, or an FD) or an external storage medium through a network to an output apparatus.

Moreover, it is needless to say that the object of the present invention can be achieved in a case where the storage medium storing the program codes of software to realize the functions of the above embodiments is supplied to a system or an apparatus and then a computer (or CPU or MPU) in the system or the apparatus reads and executes the program codes stored in the storage medium.

In this case, the program codes themselves read from the storage medium realize the new functions of the present invention, whereby the storage medium storing these program codes constitutes the present invention.

As the storage medium for supplying the program codes, for example, a flexible disk, a hard disk, an optical disk, a magnetooptical disk, a CD-ROM, a CD-R, a DVD-ROM, a magnetic tape, a nonvolatile memory card, a ROM, an EEPROM, a silicon disk or the like can be used.

Moreover, it is needless to say that the present invention includes not only a case where the functions of the above embodiments are realized by executing the program codes read by the computer, but also a case where an OS (operating system) or the like functioning on the computer executes a part or all of the actual process according to instructions of the program codes, whereby the functions of the above embodiments are achieved by that process.

Moreover, the functions of the above embodiments can be achieved in a case where the program read from the storage medium is once written in a memory provided in a function expansion board inserted in the computer or a function expansion unit connected to the computer, and then a CPU or the like provided in the function expansion board or the function expansion unit executes a part or all of the actual process according to the instructions of the program.

Moreover, the present invention may be applied to a system consisting of plural apparatuses or to a single-body apparatus. Besides, it is needless to say that the present invention is applicable to a case where the program is supplied to the system or the apparatus to achieve the functions of the above embodiments. In this case, when the storage medium which stores the programs represented by software to achieve the above embodiments of the present invention is read by the system or the apparatus, the system or the apparatus in question can obtain the effects of the present invention.

Moreover, when the program represented by software to achieve the above embodiments of the present invention is downloaded and read from a database on a network according to a communication program, the system or the apparatus in question can obtain the effects of the present invention.

As explained above, according to the embodiments, the counter that the remaining number is necessary for the setting mode is selected from among the plural counters administrated in regard to each user ID, the selected counter is displayed on the operation unit, and the impossibility of process continuation is notified to the user with an alert when the counter reaches the upper limit value. Therefore, even when the plural image input and output processes performed by using the plural input and output paths are administrated by the plural kinds of counter information, the user can easily recognize the notification of the plural kinds of counter information.

Moreover, the weight count (e.g., count of the number of bytes) is performed in regard to the number of outside-transmitted images to make the guide of the count-up clear and impartial, thereby removing the user's dissatisfied element and reducing the number of developer's steps in development processes.

Moreover, when the user sets the desired input or output mode and the numeric values, the counter that the remaining number is necessary in regard to the mode set by the user is specified from among the plural counters, the minimum value of the number of images which would be input or output is calculated from the set mode and the numeric values, the calculated minimum value is compared with the remaining count number of the specified counter, and the user is notified of the compared result to urge him to change the setting if the counter value exceeds the upper limit value when the process starts as it is in that setting, thereby causing the user to clearly recognize beforehand that the counter reaches the upper limit value while the process is performed and thus to change the setting based on the user's intention to beforehand prevent the restart itself complicated for the user.

Moreover, even when the process is continued based on the user's intention although the user has known that the counter reaches the upper limit value, the user can consider beforehand the restart of the process, thereby reducing the user's load concerning the restart of the process after the counter reached the upper limit value while the processing is performed.

Moreover, the counters to be displayed by the number capable of being displayed on the operation unit are selected according to the mode set by the user from among the plural counters administrated in regard to each user ID, and the counters are displayed in sequence from the counter closer to the upper limit value when the counter is selected from the plural candidates, whereby the user can easily recognize the counter information.

Moreover, when the any of the counters reaches the upper limit value, it notifies the user with the alert of impossibility of process continuation when the user intends to execute the mode which cannot be achieved by the remaining counters which do not yet reach the respective upper limit values. On one hand, when the process can be achieved only by the remaining counters which do not yet reach the respective upper limit values, the user performs the process in question. Thus, the restart of the process can be easily performed when any of the counters reaches the upper limit value.

Moreover, the counter information can be recognized with the user by displaying on the operation unit only the counter closest to the upper limit value from among the plural counters classified in regard to each user ID, and the user can be notified with the alert of impossibility of process continuation when the user intends to execute the mode which cannot be achieved by only the remaining counters which do not yet reach the respective upper limit values in the case where any of the counter reaches the upper limit value. Further, on the operation unit, the counter closest to the upper limit value is displayed from among the remaining counters which do not yet reach the respective upper limit values so as to easily execute the mode which can be achieved only by the counters which do not yet reach the respective upper limit value, thereby making the process after any of the counters reaches the upper limit value easy.

As described above, according to the above embodiments of the present invention, it is possible to prevent that the problems in the conventional art occur. Moreover, even when the plural image input and output processes performed by using the plural input and output paths are administrated by the plural kinds of counter information, it is possible for the user to easily recognize the notification of the plural kinds of counter information. Therefore, it is possible to beforehand prevent occurrence of the problems that administration is rather difficult and operability rather degrades for the user because the various functions and modes are provided. Thus, it is possible to construct and provide the environment which can be easily administrated and used by the user, thereby dealing with various needs from the user.

What is claimed is:

1. An image processing apparatus, which includes a reading unit configured to read an image on an original and generate image data based on the read image, a first output unit configured to output an image based on the image data, and a second output unit configured to output the image based on the image data in an output manner different from that of the first output unit, comprising:
   a control unit configured to execute either a first image processing mode of outputting by the first output unit the image based on the image data generated by the reading unit or a second image processing mode of outputting by the second output unit the image based on the image data generated by the reading unit;
   a managing unit configured to manage a first counter value indicating the number of originals read by the reading unit, a second counter value indicating the number of images output by the first output unit, and a third counter value indicating the number of images output by the second output unit; and
   an upper limit value setting unit configured to set a first upper limit value, a second upper limit value and a third upper limit value respectively corresponding to the first counter value, the second counter value and the third counter value,
   wherein the managing unit counts up the first counter value and the second counter value according to the execution of the first image processing mode, and counts up the first counter value and the third counter value according to the execution of the second image processing mode,
   in case of executing the first image processing mode, the control unit permits the execution of the first image processing mode in a case where the first counter value is smaller than the first upper limit value and the second counter value is smaller than the second upper limit value, and inhibits the execution of the first image processing mode in a case where the first counter value is larger than the first upper limit value or the second counter value is larger than the second upper limit value, and
   in case of executing the second image processing mode, the control unit permits the execution of the second image processing mode in a case where the first counter value is smaller than the first upper limit value and the third counter value is smaller than the third upper limit value, and inhibits the execution of the second image processing mode in a case where the first counter value is larger than the first upper limit value or the third counter value is larger than the third upper limit value.

2. An image processing apparatus according to claim 1, wherein the first output unit includes an image forming unit configured to form on a recording medium the image based on the image data, and the second output unit includes a transmission unit configured to transmit the image data to another apparatus.

3. An image processing apparatus according to claim 1, further comprising a display unit configured to display the first counter value, the second counter value, the third counter value, the first upper limit value, the second upper limit value, and the third upper limit value.

4. An image processing apparatus according to claim 3,
   wherein, in case of executing the first image processing mode, the display unit displays the first counter value and the second counter value, and
   wherein, in case of executing the second image processing mode, the display unit displays the first counter value and the third counter value.

5. A control method for an image processing apparatus which includes a reading unit configured to read an image on an original and generate image data based on the read image, a first output unit configured to output an image based on the image data, and a second output unit configured to output the image based on the image data in an output manner different from that of the first output unit, the control method comprising:
   a control step of controlling to execute either a first image processing mode of outputting by the first output unit the image based on the image data generated by the reading unit or a second image processing mode of outputting by the second output unit the image based on the image data generated by the reading unit;
   a management step of managing a first counter value indicating the number of originals read by the reading unit, a second counter value indicating the number of images output by the first output unit, and a third counter value indicating the number of images output by the second output unit; and an upper limit value setting step configured to set a first upper limit value, a second upper limit value and a third upper limit value respectively corresponding to the first counter value, the second counter value and the third counter value, wherein, the managing step counts up the first counter value and the second counter value according to the execution of the first image processing mode, and counts up the first counter value and the third counter value according to the execution of the second image processing mode, in case of executing the first image processing mode, the control step permits the execution of the first image processing mode in a case where the first counter value is smaller than the first upper limit value and the second counter value is smaller than the second upper limit value, and inhibits the execution of the first image processing mode in a case where the first counter value is larger than the first upper limit value or the second counter value is larger than the second upper limit value, and in case of executing the second image processing mode, the control step permits the execution of the second image processing mode in a case where the first counter value is smaller than the first upper limit value and the third counter value is smaller than the third upper limit value, and inhibits the execution of the second image processing mode in a case where the first counter value is larger than the first upper limit value or the third counter value is larger than the third upper limit value.

6. A computer-readable storage medium which stores therein a program for causing a computer to perform a control method for an image processing apparatus which includes a reading unit configured to read an image on an original and generate image data based on the read image, a first output unit configured to output an image based on the image data, and a second output unit configured to output the image based on the image data in an output manner different from that of the first output unit, the control method comprising:

a control step of controlling to execute either a first image processing mode of outputting by the first output unit the image based on the image data generated by the reading unit or a second image processing mode of outputting by the second output unit the image based on the image data generated by the reading unit;

a management step of managing a first counter value indicating the number of originals read by the reading unit, a second counter value indicating the number of images output by the first output unit, and a third counter value indicating the number of images output by the second output unit and an upper limit value setting step configured to set a first upper limit value, a second upper limit value and a third upper limit value respectively corresponding to the first counter value, the second counter value and the third counter value, wherein the managing step counts up the first counter value and the second counter value according to the execution of the first image processing mode, and counts up the first counter value and the third counter value according to the execution of the second image processing mode, in case of executing the first image processing mode, the control step permits the execution of the first image processing mode in a case where the first counter value is smaller than the first upper limit value and the second counter value is smaller than the second upper limit value, and inhibits the execution of the first image processing mode in a case where the first counter value is larger than the first upper limit value or the second counter value is larger than the second upper limit value, and in case of executing the second image processing mode, the control step permits the execution of the second image processing mode in a case where the first counter value is smaller than the first upper limit value and the third counter value is smaller than the third upper limit value, and inhibits the execution of the second image processing mode in a case where the first counter value is larger than the first upper limit value or the third counter value is larger than the third upper limit value.

* * * * *